(12) United States Patent
Kim et al.

(10) Patent No.: US 12,634,993 B2
(45) Date of Patent: May 19, 2026

(54) METHOD AND APPARATUS FOR DATA TRANSMISSION FOR COVERAGE EXTENSION

(71) Applicant: ELECTRONICS AND TELECOMMUNICATIONS RESEARCH INSTITUTE, Daejeon (KR)

(72) Inventors: Cheul Soon Kim, Daejeon (KR); Sung Hyun Moon, Daejeon (KR); Jung Hoon Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 562 days.

(21) Appl. No.: 18/174,098

(22) Filed: Feb. 24, 2023

(65) Prior Publication Data

US 2023/0276504 A1 Aug. 31, 2023

(30) Foreign Application Priority Data

| | | |
|---|---|---|
| Feb. 25, 2022 | (KR) | 10-2022-0025419 |
| Mar. 25, 2022 | (KR) | 10-2022-0037488 |
| Jun. 30, 2022 | (KR) | 10-2022-0080425 |
| Aug. 5, 2022 | (KR) | 10-2022-0098003 |
| Aug. 12, 2022 | (KR) | 10-2022-0101339 |
| Sep. 27, 2022 | (KR) | 10-2022-0122494 |
| Oct. 14, 2022 | (KR) | 10-2022-0132336 |
| Nov. 7, 2022 | (KR) | 10-2022-0147074 |
| Jan. 13, 2023 | (KR) | 10-2023-0005725 |
| Feb. 23, 2023 | (KR) | 10-2023-0024431 |

(51) Int. Cl.
*H04W 74/0833* (2024.01)
*H04W 74/0836* (2024.01)
*H04W 74/0838* (2024.01)

(52) U.S. Cl.
CPC .... *H04W 74/0833* (2013.01); *H04W 74/0836* (2024.01); *H04W 74/0838* (2024.01)

(58) Field of Classification Search
CPC ......... H04W 74/0833; H04W 74/0836; H04W 74/0838; H04W 74/006; H04L 27/2692
See application file for complete search history.

(56) References Cited

U.S. PATENT DOCUMENTS

| | | | |
|---|---|---|---|
| 2017/0141833 A1* | 5/2017 | Kim | H04W 24/08 |
| 2020/0304229 A1 | 9/2020 | Akkarakaran et al. | |
| 2021/0058971 A1* | 2/2021 | MolavianJazi | H04L 1/189 |
| 2021/0392679 A1 | 12/2021 | Kim et al. | |
| 2021/0392699 A1 | 12/2021 | Park | |

(Continued)

FOREIGN PATENT DOCUMENTS

WO 2018221882 A1 12/2018

*Primary Examiner* — Thai Nguyen
(74) *Attorney, Agent, or Firm* — Rabin & Berdo, P.C.

(57) ABSTRACT

A method of a terminal may comprise: receiving system information from a base station; identifying a threshold set including one or more threshold values from the system information; comparing a measurement result of a synchronization signal block (SSB) received from the base station with one threshold value of the threshold set; determining a repetition factor based on a result of comparison between the measurement result and the one threshold value; and repeatedly transmitting a random access (RA) preamble to the base station based on the repetition factor.

16 Claims, 19 Drawing Sheets

(56) References Cited

U.S. PATENT DOCUMENTS

| | | |
|---|---|---|
| 2022/0007414 A1 | 1/2022 | Kim et al. |
| 2022/0046724 A1 | 2/2022 | Maso et al. |
| 2022/0078840 A1 | 3/2022 | Park et al. |
| 2022/0085959 A1 | 3/2022 | Larsson et al. |
| 2022/0095372 A1 | 3/2022 | Cozzo et al. |
| 2023/0007702 A1* | 1/2023 | Park ................. H04W 74/0833 |

* cited by examiner

PRACH slot 0

| 0 | 1 | 2 | 3 | 4 | 5 | start RO for RO group (4)

start RO for RO group (2)

beam group (beam group derived for SS/PBCH block)

beam grid second axis

Tx beam first axis

METHOD AND APPARATUS FOR DATA TRANSMISSION FOR COVERAGE EXTENSION

CROSS-REFERENCE TO RELATED APPLICATIONS

This application claims priority to Korean Patent Applications No. 10-2022-0025419, filed on Feb. 25, 2022, No. 10-2022-0037488, filed on Mar. 25, 2022, No. 10-2022-0080425, filed on Jun. 30, 2022, No. 10-2022-0098003, filed on Aug. 5, 2022, No. 10-2022-0101339, field on Aug. 12, 2022, No. 10-2022-0122494, field on Sep. 27, 2022, No. 10-2022-0132336, field on Oct. 14, 2022, No. 10-2022-0147074, field on Nov. 7, 2022, No. 10-2023-0005725, field on Jan. 13, 2023, and No. 10-2023-0024431, filed on Feb. 23, 2023, with the Korean Intellectual Property Office (KIPO), the entire contents of which are hereby incorporated by reference.

BACKGROUND

1. Technical Field

Exemplary embodiments of the present disclosure relate to a communication technique, and more specifically, to a data transmission technique for coverage extension.

2. Related Art

With the development of information and communication technology, various wireless communication technologies have been developed. Typical wireless communication technologies include long term evolution (LTE) and new radio (NR), which are defined in the 3rd generation partnership project (3GPP) standards. The LTE may be one of 4th generation (4G) wireless communication technologies, and the NR may be one of 5th generation (5G) wireless communication technologies.

The 5G communication system (e.g., communication system supporting the NR) using a higher frequency band (e.g., frequency band of 6 GHz or above) than a frequency band (e.g., frequency band of 6 GHz or below) of the 4G communication system is being considered for processing of wireless data soaring after commercialization of the 4G communication system (e.g., communication system supporting the LTE). The 5G communication system can support enhanced mobile broadband (eMBB), ultra-reliable low-latency communication (URLLC), massive machine type communication (mMTC), and the like. Discussion on a sixth generation (6G) communication system after the 5G communication system is in progress.

Meanwhile, when a terminal is located in an edge of a coverage of a base station, communication quality between the terminal and the base station may be degraded. In particular, the terminal may fail an initial access procedure (e.g., random access procedure) with the base station. In this case, the terminal may not be able to communicate with the base station. Methods for solving the above problem are needed.

SUMMARY

Exemplary embodiments of the present disclosure are directed to providing a method and an apparatus for data transmission for coverage extension in a communication system.

According to a first exemplary embodiment of the present disclosure, a method of a terminal may comprise: receiving system information from a base station; identifying a threshold set including one or more threshold values from the system information; comparing a measurement result of a synchronization signal block (SSB) received from the base station with one threshold value of the threshold set; determining a repetition factor based on a result of comparison between the measurement result and the one threshold value; and repeatedly transmitting a random access (RA) preamble to the base station based on the repetition factor.

The method may further comprise obtaining, from the base station, information of a first random access channel (RACH) occasion (RO) group corresponding to a first value of the repetition factor and information of a second RO group corresponding to a second value of the repetition factor, wherein the first value and the second value are different natural numbers.

The first RO group may be a group of ROs in which repeated transmission of the RA preamble is performed, and the second RO group may be a group of ROs in which repeated transmission of the RA preamble is not performed.

Each of the first RO group and the second group may include ROs belonging to a same physical random access channel (PRACH) association period.

The method may further comprise: when the repetition factor is the first value, identifying the first RO group corresponding to the first value among RO groups configured by the base station; and selecting ROs corresponding to the first value from the first RO group, wherein the RA preamble is repeatedly transmitted in the ROs.

The method may further comprise receiving, from the base station, a random access response (RAR) for the RA preamble, wherein the RAR is associated with one RO among the ROs.

The system information may include a PRACH configuration index 1 indicating a first resource in which repeated transmission of the RA preamble is performed and a PRACH configuration index 2 indicating a second resource in repeated transmission of the RA preamble is not performed, and the RA preamble may be repeatedly transmitted in the first resource indicated by the PRACH configuration index 1.

The terminal may select different beams or a same beam as beam(s) used for transmission of the RA preamble according to at least capability of the terminal, and the RA preamble may be transmitted using the selected beam(s).

The system information may include information on a RA preamble set for repeated transmission of the RA preamble, and the RA preamble may be selected from the RA preamble set.

The method may further comprise: obtaining a PRACH mask index from the base station; and identifying a first RO for transmission of the RA preamble based on the PRACH mask index, wherein the RA preamble is repeatedly transmitted in the first RO and one or more ROs after the first RO.

According to a second exemplary embodiment of the present disclosure, a method of a base station may comprise: generating system information including a threshold set including one or more threshold values for repeated transmission of a random access (RA) preamble, information on a first random access channel (RACH) occasion (RO) group corresponding to a first repetition factor, and information on a second RO group corresponding to a second repetition factor; transmitting the system information; and performing an operation for receiving RA preambles repeated based on the first repetition factor in ROs belonging to the first RO group.

The first RO group may be a group of ROs in which repeated transmission of the RA preamble is performed, and the second RO group may be a group of ROs in which repeated transmission of the RA preamble is not performed.

Each of the first RO group and the second group may include ROs belonging to a same physical random access channel (PRACH) association period.

When a measurement result of a synchronization signal block (SSB) transmitted by the base station is less than one threshold value of the threshold set, the first RO group may be used for repeated transmission of the RA preamble, and when the measurement result of the SSB transmitted by the base station is greater than or equal to the one threshold value, the second RO group may be used for non-repetitive transmission of the RA preamble.

The method may further comprise transmitting a random access response (RAR) associated with one of the ROs in which the repeated RA preambles are received.

The system information may further include information on a physical random access channel (PRACH) mask index, and a first RO among the ROs in which the repeated RA preambles are received may be indicated by the PRACH mask index.

According to a third exemplary embodiment of the present disclosure, a terminal may comprise a processor, wherein the processor may cause the terminal to perform: receiving system information from a base station; identifying a threshold set including one or more threshold values from the system information; comparing a measurement result of a synchronization signal block (SSB) received from the base station with one threshold value of the threshold set; determining a repetition factor based on a result of comparison between the measurement result and the one threshold value; and repeatedly transmitting a random access (RA) preamble to the base station based on the repetition factor.

The processor may further cause the terminal to perform: obtaining, from the base station, information of a first random access channel (RACH) occasion (RO) group corresponding to a first value of the repetition factor and information of a second RO group corresponding to a second value of the repetition factor from, wherein the first value and the second value are different natural numbers, the first RO group may be a group of ROs in which repeated transmission of the RA preamble is performed, and the second RO group may be a group of ROs in which repeated transmission of the RA preamble is not performed.

The processor may further cause the terminal to perform: when the repetition factor is the first value, identifying the first RO group corresponding to the first value among RO groups configured by the base station; and selecting ROs corresponding to the first value from the first RO group, wherein the RA preamble is repeatedly transmitted in the ROs.

The processor may further cause the terminal to perform: obtaining a PRACH mask index from the base station; and identifying a first RO for transmission of the RA preamble based on the PRACH mask index, wherein the RA preamble is repeatedly transmitted in the first RO and one or more ROs after the first RO.

According to the present disclosure, a terminal may determine a repetition factor based on a comparison result of a synchronization signal block (SSB) measurement result and a threshold, and based on the repetition factor, the terminal may repeatedly transmit a random access (RA)

preamble. Accordingly, a coverage of the RA preamble (e.g., Msg1 or MsgA) can be increased, and the performance of the communication system can be improved.

BRIEF DESCRIPTION OF DRAWINGS

FIG. 29 is a conceptual diagram illustrating a third exemplary embodiment of a method for transmitting a UL signal/channel.

FIG. 30 is a conceptual diagram illustrating a fourth exemplary embodiment of a method for transmitting a UL signal/channel.

DETAILED DESCRIPTION OF THE EMBODIMENTS

Figure 1:
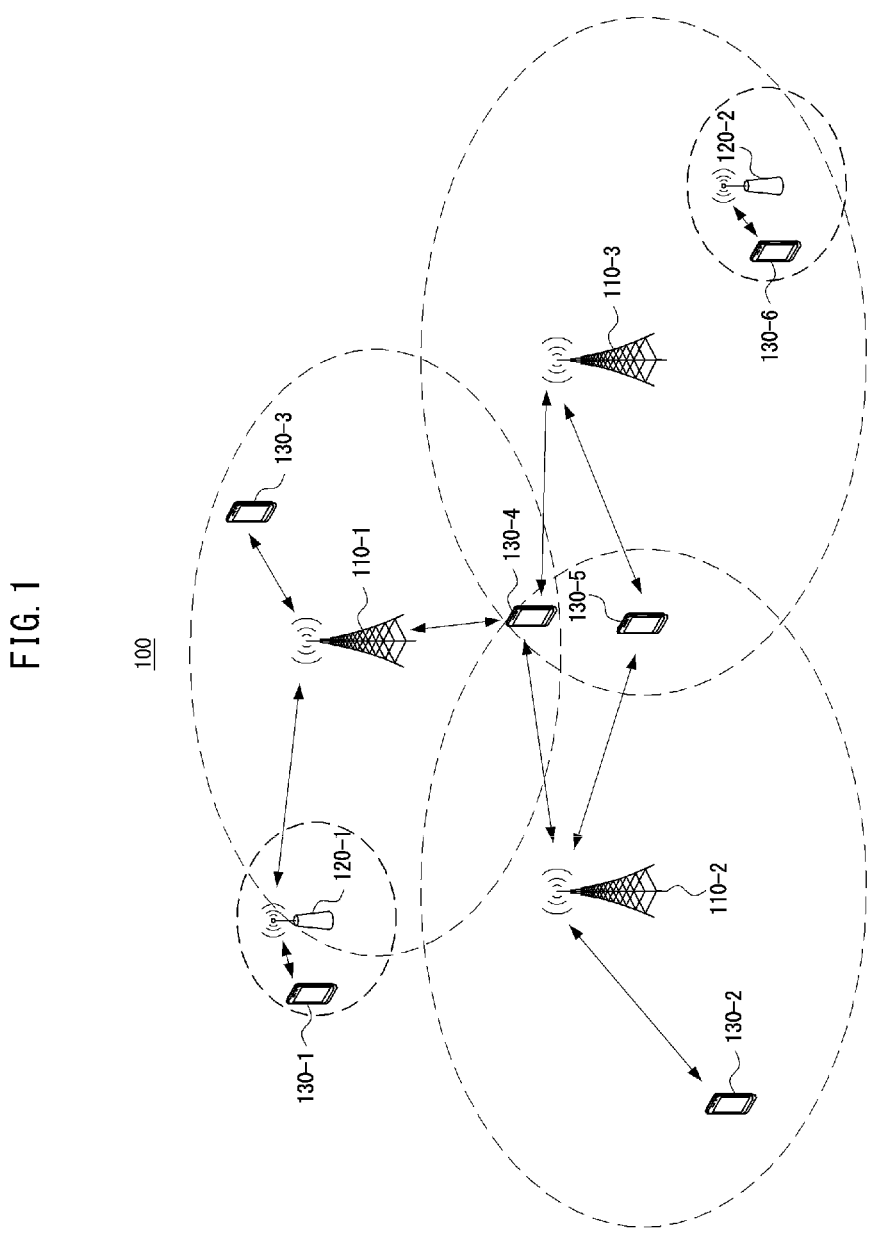
FIG. 1 is a conceptual diagram illustrating a first exemplary embodiment of a communication system.

Exemplary embodiments of the present disclosure are disclosed herein. However, specific structural and functional details disclosed herein are merely representative for purposes of describing exemplary embodiments of the present disclosure. Thus, exemplary embodiments of the present disclosure may be embodied in many alternate forms and should not be construed as limited to exemplary embodiments of the present disclosure set forth herein.

Accordingly, while the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may be used in the same sense as a communication network.

In exemplary embodiments, 'configuration of an operation (e.g., transmission operation)' may mean 'signaling of configuration information (e.g., information element(s), parameter(s)) for the operation' and/or 'signaling of information indicating performing of the operation'. 'Configuration of information element(s) (e.g., parameter(s))' may mean that the corresponding information element(s) are signaled. The signaling may be at least one of system information (SI) signaling (e.g., transmission of system information block (SIB) and/or master information block (MIB)), RRC signaling (e.g., transmission of RRC message(s), RRC parameter(s) and/or higher layer parameter(s)), MAC control element (CE) signaling (e.g., transmission of a MAC message and/or MAC CE), PHY signaling (e.g., transmission of downlink control information (DCI), uplink control information (UCI), and/or sidelink control information (SCI)), or a combination thereof.

FIG. 1 is a conceptual diagram illustrating a first exemplary embodiment of a communication system.

Referring to FIG. 1, a communication system 100 may include a plurality of communication nodes 110-1, 110-2, 110-3, 120-1, 120-2, 130-1, 130-2, 130-3, 130-4, 130-5, and 130-6. In addition, the communication system 100 may further include a core network (e.g., serving-gateway (S-GW), packet data network (PDN)-gateway (P-GW), and mobility management entity (MME)). When the communication system 100 is the 5G communication system (e.g., NR system), the core network may include an access and mobility management function (AMF), a user plane function (UPF), a session management function (SMF), and the like.

The plurality of communication nodes 110 to 130 may support the communication protocols (e.g., LTE communication protocol, LTE-A communication protocol, NR communication protocol, etc.) defined by technical specifications of 3rd generation partnership project (3GPP). The plurality of communication nodes 110 to 130 may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, a cyclic prefix OFDM (CP-OFDM) based communication protocol, a discrete Fourier transform spread OFDM (DFT-s-OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, or the like. Each of the plurality of communication nodes may have the following structure.

Figure 2:
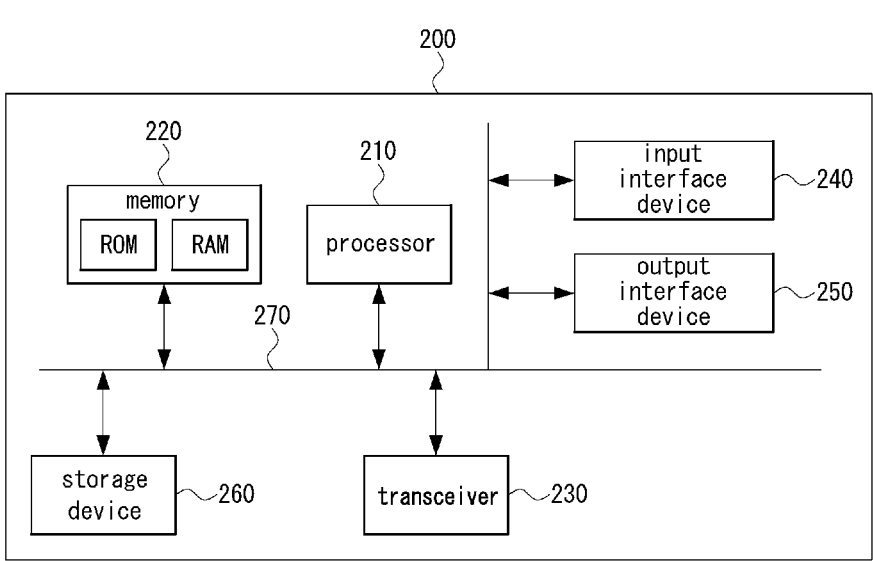
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. The respective components included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, an evolved Node-B (eNB), an advanced base station (BTS), a high reliability-base station (HR-BS), a base transceiver station (BTS), a radio base station, a radio transceiver, an access point, an access node, a radio access station (RAS), a mobile multi-hop relay base station (MMR-BS), a relay station (RS), an advanced relay station (ARS), a high reliability-relay station (HR-RS), a home NodeB (HNB), a home eNodeB (HeNB), a roadside unit (RSU), a radio remote head (RRH), a transmission point (TP), a transmission and reception point (TRP), or the like.

Each of the plurality of terminals 130-1, 130-2, 130-3, 130-4, 130-5, and 130-6 may refer to a user equipment (UE), a terminal equipment (TE), an advanced mobile station (AMS), a high reliability-mobile station (HR-MS), a terminal, an access terminal, a mobile terminal, a station, a subscriber station, a mobile station, a portable subscriber station, a node, a device, an on board unit (OBU), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, each of the plurality of base stations 110-1, 110-2, 110-3, 120-1, and 120-2 may support a multi-input multi-output (MIMO) transmission (e.g., a single-user MIMO (SU-MIMO), a multi-user MIMO (MU-MIMO), a massive MIMO, or the like), a coordinated multipoint (CoMP) transmission, a carrier aggregation (CA) transmission, a transmission in unlicensed band, device-to-device (D2D) communication (or, proximity services (ProSe)), Internet of Things (IoT) communications, dual connectivity (DC), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2). For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the COMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, operation methods of a communication node in a communication system will be described. Even when a method (e.g., transmission or reception of a data packet) performed at a first communication node among communication nodes is described, the corresponding second communication node may perform a method (e.g., reception or transmission of the data packet) corresponding to the method performed at the first communication node. That is, when an operation of the terminal is described, the corresponding base station may perform an operation corresponding to the operation of the terminal. Conversely, when an operation of the base station is described, the corresponding terminal may perform an operation corresponding to the operation of the base station.

Chapter 1 Introduction

Scenarios to which communication is applied may be an Enhanced Mobile BroadBand (eMBB) scenario, a Massive Machine-Type Communication (mMTC) scenario, an Ultra-Reliable and Low-Latency Communication (URLLC) scenario, and/or Time Sensitive Communication (TSC) scenario. The mMTC scenario, URLLC scenario, and/or TSC scenario may be applied in Internet of Things (IoT) communication. One communication network (e.g., one communication system) may support all of the scenarios described above or some of the scenarios described above. In a communication network supporting the mMTC scenario, IMT-2020 requirements can be satisfied by using narrowband (NB)-IoT and LTE-MTC. A lot of discussion may be needed to satisfy the requirements in a communication system that supports the URLLC scenario.

In order to reduce an error rate of data, a low modulation and coding scheme (MCS) level (or, low MCS index) may be applied. In order not to increase a size of a field indicated by downlink control information (DCI), frequently used MCS(s) may be selected. In order to apply a lower MCS, a repeated transmission operation may be supported. In case of applying a quadrature phase shift keying (QPSK) which is the lowest modulation rate, an effect of further reducing the code rate may occur. In particular, since a transmit power is limited in uplink (UL) transmission, the repeated transmission operation may be performed in the time domain rather than in the frequency domain.

In the case of eMBB traffic and URLLC traffic, a lower MCS may be used for different purposes, respectively. For example, for eMBB traffic, a lower MCS may be required to extend a coverage. On the other hand, for URLLC traffic, a lower MCS may be required to reduce a latency and achieve a lower error rate. Since the requirements are different, the eMBB traffic may be repeatedly transmitted even when a relatively large latency occurs. The URLLC traffic may be transmitted using new MCSs (e.g., low MCS) rather than the repeated transmission. The new MCS may be configured by an RRC message and/or DCI.

In order to support repeated transmissions for the eMBB traffic in the time domain, a physical uplink shared channel (PUSCH) repetition (e.g., PUSCH repetition type A) may be introduced. In this case, a PUSCH allocated on a slot basis may be repeatedly transmitted. To extend a coverage, a time resource may be allocated over a plurality of slots. When the PUSCH repetition type A is used, the time resource may be configured by an RRC message and/or a DCI. The number of repetitions of the PUSCH may be indicated by the RRC message, and a time resource for transmitting the PUSCH in the first slot may be indicated by the DCI (e.g., in case of type 2 configured grant (CG) or dynamic grant) or the RRC message (e.g., in case of type 1 CG). In the present disclosure, the number of repetitions may mean the number of repeated transmissions or the number of transmissions.

In order to support URLLC traffic, it may be preferable for the terminal to perform frequent reception operations in downlink (DL) resources and/or frequent transmission operations in uplink (UL) resources. In a time division duplex (TDD) system, the terminal may operate based on a half-duplex scheme. Accordingly, a time of supporting DL traffic and/or UL traffic may increase according to a slot pattern. On the other hand, in a frequency division duplex (FDD) system, the terminal may utilize DL resources and UL resources at the same time. Accordingly, the above-described problem in the TDD system may not occur in the FDD system. The FDD system may use two or more carriers. When two or more serving cells are configured to the terminal in the TDD system, the terminal may utilize DL resources and UL resources.

In a communication system including at least one carrier to which FDD is applied (hereinafter referred to as 'FDD carrier'), there may be no problem regarding a delay time of the terminal. In a communication system including only carrier(s) to which TDD is applied (hereinafter, referred to as 'TDD carrier(s)'), a problem regarding a delay time of the terminal may exist. In order to solve the above-described problem, slots in the TDD carriers may be configured according to different patterns.

Transmission of eMBB traffic and/or URLLC traffic may be supported in at least one of a licensed band or an unlicensed band. Carrier(s) belonging to a licensed band may be used alone. Carrier(s) belonging to an unlicensed band may be used alone. Alternatively, carrier(s) belonging to a licensed band and carrier(s) belonging to an unlicensed band may all be used based on a carrier aggregation scheme according to configuration of the base station.

In the present disclosure, transmission of a channel may mean transmission of a message, data, signal, and/or information on the channel, and reception of a channel may mean reception of a messages, data, signal, and/or information on the channel. The channel may be a physical downlink control channel (PDCCH), physical downlink shared channel (PDSCH), physical uplink control channel (PUCCH), physical uplink shared channel (PUSCH), physical random access channel (PRACH), physical sidelink control channel (PSCCH), physical sidelink shared channel (PSSCH), and/or physical sidelink feedback channel (PSFCH).

In the present disclosure, a four-step random access (RA) procedure will be mainly described. The 4-step RA procedure described in the present disclosure may be applied to a 2-step RA procedure. For example, a MsgA may be transmitted/received in the same or similar manner as a Msg1, and a MsgB may be transmitted/received in the same or similar manner as a Msg2.

Chapter 2 PRACH Sweeping

A terminal may perform a 4-step access procedure (e.g., 4-step RA procedure) to perform initial access. In the first step, the terminal may transmit a PRACH (e.g., RA preamble, PRACH preamble, or Msg1) to a base station, and the base station may receive the PRACH from the terminal. In the second step, the base station may transmit a PDSCH (e.g., random access response (RAR) or Msg2) to the terminal, and the terminal may receive the PDSCH from the base station. In the third step, the terminal may transmit a PUSCH (e.g., Msg3) to the base station, and the base station may receive the PUSCH from the terminal. In the fourth step, the base station may transmit a PDCCH and/or PDSCH (e.g., Msg4) to the terminal, the terminal may receive the PDCCH and/or PDSCH from the base station, and the terminal may transmit a hybrid automatic repeat request (HARD)-acknowledgement (AK) for the PDSCH to the base station, and the base station may receive the HARQ-ACK from the terminal.

The channel(s) in each of the above steps may include a message defined in a higher layer. the message in the first step may be a Msg1, the message in the second step may be a Msg2, the message in the third step may be a Msg3, and the message in the fourth step may be a Msg4. When the above steps are completed, a contention resolution procedure in the base station may be completed, and a radio resource control (RRC) connection between the terminal and the base station may be established.

The base station may transmit system information including at least one of time resource information, frequency resource information, or sequence resource information for PRACH. In the present disclosure, the system information may include at least one of a master information block (MIB) or system information block (SIB). The terminal may receive system information from the base station and may obtain the time resource information, the frequency resource information, and/or the sequence resource information for PRACH included in the system information. After transmitting the PRACH, the terminal may perform a monitoring operation for receiving a PDCCH from the base station (hereinafter referred to as 'PDCCH monitoring operation'). The PDCCH monitoring operation may be performed on a resource (e.g., time period) configured by a search space and a control resource set (CORESET). The terminal may perform the monitoring operation in slot(s) (e.g., monitoring occasion) belonging to an RAR window in order to receive an RAR (e.g., Msg2) from the base station.

The RAR may be generated in a medium access control (MAC) layer of the base station. The base station may transmit a PDSCH including the RAR to the terminal. In other words, the RAR may be transmitted on the PDSCH. The terminal may receive the PDSCH including the RAR from the base station. The terminal may identify information element(s) included in the RAR. The terminal may check whether a random access preamble identifier (RAPID) included in the RAR is the same as an RAPID of the Msg1 transmitted by the terminal. When the RAPID included in the RAR is the same as the RAPID of the Msg1 transmitted by the terminal, the terminal may perform the third step (e.g., Msg3 transmission). When an RAR including the same RAPID as the RAPID of the Msg1 transmitted by the terminal is not received within the RAR window, the terminal may determine that contention has not been resolved. In this case, the terminal may retransmit a PRACH.

The RAR may include a backoff indicator (BI) field. The terminal may identify the BI indicated by the RAR, and may derive an upper limit value of a backoff time using the BI and an appropriate scaling factor. The terminal may select an arbitrary value between 0 and the upper limit value, and may start again from the first step of the RA procedure by regarding the selected value as a backoff time. When a PRACH is retransmitted, the terminal may increase a retransmission counter and increase power for retransmission of the PRACH.

A PRACH format (e.g., preamble format) may be classified into a PRACH short format (e.g., A1, A2, A3, B1, B2, B3) and a PRACH long format according to the number of OFDM symbols to which a PRACH preamble (e.g., RA preamble) is mapped. Types of the PRACH short format may be subdivided according to the length of a cyclic prefix (CP), the length of a sequence, and/or the length of a guard time (GT). The GT may mean a guard period (GP).

The terminal may derive a resource location of a RACH occasion (RO) in the time domain using a PRACH configuration index. The PRACH configuration index may be interpreted according to a frequency band and a duplex scheme in which the PRACH is transmitted. For example, a PRACH configuration index in a frequency division duplexing (FDD) system (e.g., FDD system supporting FR1) may be interpreted differently from a PRACH configuration index in a time division duplexing (TDD) system (e.g., TDD system supporting FR1). A PRACH configuration index in FR1 may be interpreted differently from a PRACH configuration index in FR2. Table 1 below may represent a part of PRACH configuration indexes in a communication system supporting FR1.

TABLE 1

| PRACH configuration index | Preamble format | $n_f$ mod x = y | | Subframe number | Start symbol | Number of PRACH slots within a subframe | Number of time-domain PRACH occasions within a PRACH slot $(N_t^{RA,slot})$ | PRACH duration $(N_{dur}^{RA})$ |
|---|---|---|---|---|---|---|---|---|
| | | x | y | | | | | |
| 106 | A1 | 1 | 0 | 0, 1, 2, 3, 4, 5, 6, 7, 8, 9 | 0 | 2 | 6 | 2 |
| 114 | A1/B1 | 1 | 0 | 7 | 0 | 2 | 7 | 2 |

Table 2 below may represent a part of PRACH configuration indexes in a communication system supporting FR2.

TABLE 2

| PRACH configuration index | Preamble format | $n_f$ mod x = y | | Subframe number | Start symbol | Number of PRACH slots within a subframe | Number of time-domain PRACH occasions within a PRACH slot $(N_t^{RA,slot})$ | PRACH duration $(N_{dur}^{RA})$ |
|---|---|---|---|---|---|---|---|---|
| | | x | y | | | | | |
| 11 | A1 | 2 | 1 | 3, 7, 11, 15, 19, 23, 27, 31, 35, 39 | 0 | 1 | 6 | 2 |
| 202 | A1/B1 | 16 | 1 | 4, 9, 14, 19, 24, 29, 34, 39 | 2 | 1 | 6 | 2 |

Since the PRACH configuration index is received through system information, terminals performing random access procedures (e.g., initial access procedures) may interpret the PRACH configuration index in common. The base station may indicate one or two PRACH formats to the terminal. The two PRACH formats may coexist. For coexistence of two PRACH formats, the two PRACH formats may include CPs having different lengths and/or GTs having different lengths. Here, the lengths of PRACH preambles in the two PRACH formats may be the same.

According to Table 1, when the PRACH configuration index is indicated as 106 and a result of (system frame number (SFN) mod 1) is 0, the terminal may select a subframe having subframe indexes 0 to 9. In Tables 1 and 2, of may be an SFN. In other words, the terminal may transmit the PRACH in all subframes. One subframe may correspond to two PRACH slots. 6 PRACH occasions may exist within one PRACH slot. The PRACH occasion may mean an RACH occasion (RO). The terminal may transmit the PRACH at 6 locations (e.g., 6 PRACH occasions) within one PRACH slot. The PRACH having the preamble format A1 may be transmitted, and a duration of the PRACH may correspond to 2 symbols.

When the PRACH configuration index is indicated as 114, the terminal may use the preamble format A1 or the preamble format B1. The number of locations (e.g., PRACH occasions) in which the PRACH can be transmitted within a PRACH slot may be 7.

The base station may indicate or configure an association pattern period to the terminal. The association pattern period may include one or more association periods. One association pattern period including ROs may be repeated within 160 milliseconds (ms). 160 ms may be related to a transmission period of an SIB1.

When an association period is used for requesting system information (SI), the base station may indicate an association period index to the terminal. The minimum value of an integer multiple of a pattern including all ROs corresponding to all synchronization signal blocks (SSBs) may be determined (e.g., derived) using the number of SSBs (e.g., ssb-PositionsInBurst) indicated to the terminal by RRC signaling. Derivable value (e.g., minimum value) may be defined in technical specifications and may be expressed as shown in Table 3 below.

TABLE 3

| PRACH configuration period (ms) | Association period (Number of PRACH association periods) |
|---|---|
| 10 | {1, 2, 4, 8, 16} |
| 20 | {1, 2, 4, 8} |
| 40 | {1, 2, 4} |
| 80 | {1, 2} |
| 160 | {1} |

For example, a PRACH configuration period may be derived based on the PRACH configuration index indicated to the terminal. In Table 2, when the PRACH configuration index is indicated as 11, since x is 2, the length of the PRACH configuration period may be considered to be 20 ms. Then, a time required to map all the SSB(s) to the RO(s) may be derived according to the number of SSBs. In Table 3, one of {1, 2, 4, 8} may be selected. When 4 is selected from Table 3, the length of the period including four association periods may be interpreted as 80 ms. Here, the length of each of the four association periods may be 20 ms. The association pattern period may be repeated twice.

One SSB may be mapped to a plurality of ROs. Alternatively, a plurality of SSBs may be mapped to one RO. The base station may indicate mapping information between SSB(s) and RO(s) to the terminal using RRC signaling. The mapping information between SSB(s) and RO(s) may be ssb-perRACH-OccasionAndCB-PreamblesPerSSB. The terminal may derive (N, R) from ssb-perRACH-OccasionAndCB-PreamblesPerSSB. In (N, R), N may mean the number of SSBs mapped to one RO. In (N, R), R may mean the number of PRACH preambles. N may be 1 or more. If N>1, a plurality of SSBs may be mapped to one RO. Alternatively, N may be less than 1. If N<1, one SSB may be mapped to a plurality of ROs.

2.1 PRACH Repetition Factor

The terminal may repeatedly transmit a PRACH. System information (e.g., SIB) may indicate that repeated PRACH transmission is allowed. The number of PRACH repetitions may vary according to a coverage level.

The number of Msg3 (e.g., PUCCH) repetitions may be indicated by a value (e.g., partial value) of a field included in a UL grant of an RAR. The value of the field included in the UL grant may be reused to indicate the number of Msg3 repetitions. The base station may identify the number of repetitions based on the PRACH received from the terminal. The terminal may estimate a distance between the terminal and the base station based on a reference signal received power (RSRP) threshold. When the distance between the terminal and the base station is long, the terminal may use a PRACH preamble belonging to a specific PRACH preamble set. The specific PRACH preamble set may be configured to the terminal for repeated PRACH preamble transmission. In the present disclosure, a reference signal received quality (RSRQ) and/or received signal strength indicator (RSSI) may be used instead of the RSRP.

The terminal may independently perform PRACH sweeping/repeated transmission and repeated Msg3 transmission. The PRACH sweeping/repeated transmission may include at least one of PRACH sweeping and repeated PRACH transmission. Even when the PRACH sweeping/repeated transmission is performed, the base station may instruct the terminal to perform non-repetitive transmission of Msg3. In the present disclosure, the non-repetitive transmission may mean one-time transmission. Alternatively, even when PRACH sweeping/repeated transmission is not performed, the base station may instruct the terminal to perform repeated Msg3 transmission.

According to a proposed method, the base station may indicate or configure an RSRP threshold for PRACH sweeping/repeated transmission to the terminal. The terminal may measure an RSRP of an SSB received from the base station, compare the measured RSRP (e.g., measurement result) with the RSRP threshold, and based on a result of the comparison, the terminal may determine whether to perform PRACH sweeping/repeated transmission and/or the number of PRACH repetitions. Information broadcasted by the base station may include one or more boundary values (e.g., one or more threshold values). The one or more threshold values may mean a threshold set. In other words, the threshold set may include the one or more threshold values. In the present disclosure, a boundary value may mean a threshold value. One or more boundary values may be boundary value(s) for RSRP. Information on ranges (e.g., RSRP ranges) may be derived based on one or more boundary values. The terminal may determine the number of PRACH repetitions based on a range to which the RSRP measured by the terminal belongs. For example, when the measured RSRP belongs to a first range, the terminal may determine the number of PRACH repetitions (e.g., the number of transmissions) as n. When the measured RSRP belongs to a second range, the terminal may determine the number of PRACH repetitions (e.g., the number of transmissions) as m. Each of n and m may be a natural number.

System information (e.g., SIB1) may include one or more boundary values. The terminal may receive the system information from the base station and may derive one or more boundary values ($\gamma_0$, $\gamma_1$, $\gamma_2$, . . . ) from the system information. The terminal may derive information on the ranges based on the boundary value(s). The terminal may interpret the information on the ranges as $\{x|\gamma_{n+1} \leq x < \gamma_n\}$ or $\{x|\gamma_n \leq x < \gamma_{n+1}\}$. When only one boundary value is configured or indicated to the terminal, the terminal may interpret the information on the ranges as $\{x|-\infty \leq x < \gamma_n\}$ or $\{x|\gamma_n \leq x < \infty\}$. The information on the ranges may be properly interpreted according to a unit of the measurement value of RSRP. The terminal may derive an RSRP for an SSB by performing a monitoring operation (e.g., measurement operation) on the SSB, and may determine a range to which the measured RSRP belongs. The terminal may derive the number of PRACH repetitions according to the range to which the measured RSRP belongs.

Figure 3:
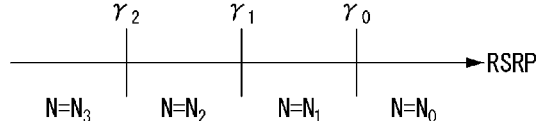
FIG. 3 is a conceptual diagram illustrating a first exemplary embodiment of boundary values for deriving the number of PRACH repetitions.

FIG. 3 is a conceptual diagram illustrating a first exemplary embodiment of boundary values for deriving the number of PRACH repetitions.

Referring to FIG. 3, each of $\gamma_0$, $\gamma_1$, and $\gamma_2$ may be a boundary value (e.g., threshold value), and N may be the number of PRACH repetitions. If the RSRP measured by the terminal is greater than or equal to $\gamma_0$, the terminal may determine the number N of PRACH repetitions as $N_0$. If the RSRP measured by the terminal is greater than or equal to $\gamma_1$ and less than $\gamma_0$, the terminal may determine the number N of PRACH repetitions as $N_1$. If the RSRP measured by the terminal is greater than or equal to $\gamma_2$ and less than $\gamma_1$, the terminal may determine the number N of PRACH repetitions N as $N_2$. If the RSRP measured by the terminal is less than $\gamma_2$, the terminal may determine the number N of PRACH repetitions as $N_3$. Each of $N_0$, $N_1$, $N_2$, and $N_3$ may be a different natural number. They may be defined as $[N_0 < N_1 < N_2 < N_3]$.

The existing terminal (e.g., legacy terminal) may not be able to interpret the boundary value(s). Therefore, the legacy terminal can transmit the PRACH only once. Value(s) indicated to the terminal for other purposes may be used as the boundary value(s) for deriving the number of PRACH repetitions. For example, the terminal may derive the number of PRACH repetitions by reusing boundary value(s) for deriving the number of Msg3 repetitions. For another example, the terminal may derive the number of PRACH repetitions by reusing a value for distinguishing between a Type2 RACH (e.g., 2-step RACH) and a Type1 RACH (e.g., 4-step RACH).

The base station may independently indicate to the terminal boundary value(s) for deriving the number of PRACH repetitions and value(s) (e.g., boundary value) for other purposes. For example, regardless of the boundary value(s) for deriving the number of Msg3 repetitions and/or the value for distinguishing between Type2 RACH and Type1 RACH, the base station may indicate the boundary value(s) for deriving the number of PRACH repetitions to the terminal. In this case, the terminal may perform repeated PRACH transmission, but may not perform repeated Msg3 transmission.

When transmission (Tx) beam(s) as well as the number of PRACH repetitions are considered, RSRP ratio(s) as well as the RSRP threshold(s) may be considered. The terminal may select an SSB having the largest RSRP, and may derive a minimum RSRP that the terminal can consider based on an RSRP ratio. The terminal may additionally select SSB(s) having an RSRP greater than or equal to the minimum RSRP, and may determine Tx beam(s) of the PRACH by utilizing the selected SSB(s). The SSB(s) selected by the terminal may have RSRP(s) greater than or equal to the RSRP threshold (e.g., RSRP threshold indicated by the base station).

2.2 PRACH Preamble ID

The terminal may transmit a PRACH in an RO. Certain sequence(s) for a PRACH preamble may be restricted in the RO. The terminal may know sequence(s) restricted and/or allowed in the RO using information broadcasted from the base station. In a proposed method, the repeated PRACH preamble may be selected from a separate PRACH preamble set.

The base station may configure a PRACH preamble set to the terminal. The terminal may utilize some of at most 64 PRACH preambles for one RO in the random access procedure, and may utilize the remaining PRACH preambles for requesting system information (SI). Some of the PRACH preambles, which are used in the random access procedure, may be used for contention-free random access (CFRA), and the remaining PRACH preambles may be used for contention-based random access (CBRA).

Figure 4:
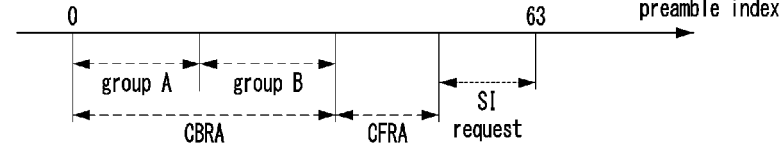
FIG. 4 is a conceptual diagram illustrating a first exemplary embodiment for partitioning PRACH preambles when one SSB corresponds to one RO.
Figure 5:
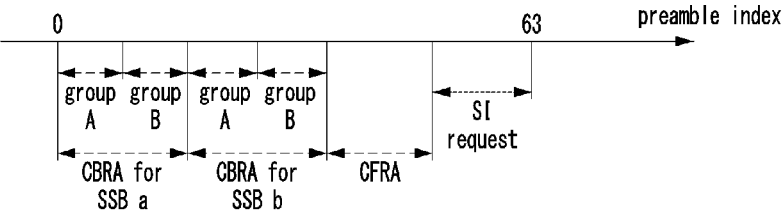
FIG. 5 is a conceptual diagram illustrating a first exemplary embodiment for partitioning PRACH preambles when two SSBs correspond to one RO.

FIG. 4 is a conceptual diagram illustrating a first exemplary embodiment for partitioning PRACH preambles when one SSB corresponds to one RO, and FIG. 5 is a conceptual diagram illustrating a first exemplary embodiment for partitioning PRACH preambles when two SSBs correspond to one RO.

Referring to FIGS. 4 and 5, PRACH preamble(s) used in CBRA may correspond to SSB(s) on a one-to-one basis based on an association ratio between SSB(s) and RO(s). In this case, all PRACH preambles may be utilized in CBRA. Alternatively, PRACH preamble(s) utilized in CBRA may be classified into a group A and a group B based on the association ratio between SSB(s) and RO(s).

The base station may detect all PRACH preambles allowed in the RO. It may be assumed that some PRACH preamble sequences are detected in one RO. Since other PRACH preamble sequences can be repeatedly transmitted, the base station may detect other PRACH preamble sequences in a plurality of ROs. In the present disclosure, a PRACH preamble sequence may mean a sequence for a PRACH preamble or a PRACH sequence.

The base station may differently manage PRACH preamble sequence(s) that can be transmitted once and PRACH preamble sequence(s) that can be repeatedly transmitted. In a proposed method, the base station may transmit system information (e.g., SIB1) including information on a PRACH preamble set including repeatedly-transmittable PRACH preamble sequence(s) to the terminal. The terminal may receive the system information (e.g., SIB1) from the base station, and may identify the PRACH preamble set based on the system information. The terminal may select a sequence applied to a PRACH preamble from within the PRACH preamble set. In other words, the terminal may select the PRACH preamble from the PRACH preamble set.

The base station may indicate an index of the PRACH preamble to the terminal. The terminal may repeatedly transmit a PRACH preamble having an index lower than the index indicated by the base station. The terminal may repeatedly transmit the PRACH preamble in adjacent ROs (e.g., consecutive ROs) or non-consecutive ROs. The PRACH preamble may include the PRACH sequence. The PRACH sequence may mean a sequence transmitted in one RO.

When the terminal performs repeated PRACH transmission, the PRACH sequence may be changed for each RO. The base station may detect the PRACH sequence for each RO. A detection performance when the PRACH sequence is changed for each RO may not differ from a detection performance when the PRACH sequence is maintained in the ROs. In the RAR transmission procedure, the base station may independently specify a PRACH sequence ID (e.g., PRACH preamble ID) for each RO. In other words, the base station may generate an RAR including an RAPID for each RO, and transmit the RAR for each RO to the terminal.

When the terminal transmits the same PRACH preamble (e.g., PRACH preamble sequence, PRACH sequence) in the ROs, the size of a payload for indicating the PRACH sequence ID in the RAR of the base station may be reduced. In a proposed method, the terminal may transmit the same PRACH preamble (e.g., PRACH preamble sequence, PRACH sequence) in the ROs. In other words, the PRACH preamble sequence may not be changed for each RO.

2.3 RO Group Configuration Method and RAR

Two or more ROs used in repeated PRACH transmission may be configured as an RO group. The base station may generate an RAR corresponding to an RO. When the terminal repeatedly transmits PRACH preamble(s) in two or more ROs (e.g., RO group), the base station may generate an RAR for each of the two or more ROs and transmit the two or more RARs to the terminal. The terminal may receive the two or more RARs from the base station. The two or more RARs may be included in one MAC control element (CE) or two or more MAC CEs. The MAC CE(s) including the RAR(s) may be broadcast on a PDSCH.

The terminal may calculate a random access-radio network temporary identifier (RA-RNTI) based on one RO belonging to the RO group.

In a proposed method, the RO group may correspond to an RAR on a one-to-one basis. When repeated PRACH transmission is performed, the terminal may receive the RAR for the RO group. In a proposed method, the terminal may receive an RAR for one RO belonging to the RO group. In other words, the RAR received by the terminal may be associated with one RO among ROs belonging to the RO group.

The terminal may select a specific RAPID for repeated PRACH transmission and may perform repeated PRACH transmission within the RO group. One PRACH preamble may be transmitted in one RO. Among the ROs belonging to the RO group, an RO with the lowest index or an RO with the highest index may be selected, and the RAR to be observed by the terminal may be derived based on the selected RO. Alternatively, among the ROs belonging to the RO group, the earliest RO or the latest RO in the time domain may be selected, and the RAR to be observed by the terminal may be derived based on the selected RO.

According to a proposed method, the number of PRACH repetitions may be implicitly derived based on the RAR.

If the RAPID is identify in the RAR observed by the terminal, the terminal may transmit a Msg3 according to a UL grant included in the RAR. The Msg3 may be transmitted on a PUSCH.

According to a proposed method, the ROs included in the RO group may be indicated by system information (e.g., SIB1). Based on an index of one RO belonging to the RO group, index(es) of RO(s) located in the same (or adjacent) frequency resource and the same (or adjacent) PRACH slot as the one RO may be derived. According to a proposed method, the ROs belonging to the RO group (e.g., the number of the ROs) may be derived based on the RO index(es), the number of ROs belonging to one PRACH slot, and the number of PRACH repetitions. A pattern of slots and/or a pattern of UL symbols may be further considered to determine the RO group in the TDD system.

The ROs may be indexed at least according to the order of frequency resources, and then indexed according to the order of time resources. In order to perform repeated PRACH transmission, one RO group may be preferably configured to include ROs having the same frequency resource.

The base station may signal information on the number of ROs (e.g., msg1-FDM) that are frequency-division-multiplexed (FDMed) in the same time period to the terminal. The terminal may identify the number of ROs FDMed in the same time period based on the signaling of the base station. A constant difference may exist between the indexes of the ROs belonging to the RO group. The difference may be the number of ROs FDMed in the same time period. For example, the number of ROs FDMed in the same time period may be one of 1, 2, 4, or 8.

According to a proposed method, an RO group may include ROs belonging to the same PRACH slot. For example, ROs corresponding to the number of PRACH repetitions may belong to the same PRACH slot. The terminal may assume that the maximum number of ROs allowed in the PRACH slot is smaller than the maximum number of PRACH repetitions.

Figure 6:
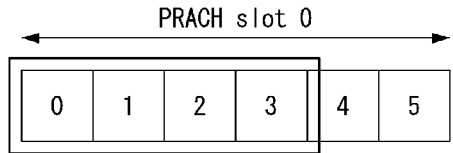
FIG. 6 is a conceptual diagram illustrating a first exemplary embodiment of repeated PRACH transmission using one PRACH slot.

FIG. 6 is a conceptual diagram illustrating a first exemplary embodiment of repeated PRACH transmission using one PRACH slot.

Referring to FIG. 6, 6 ROs may be time-division-multiplexed (TDMed) within one PRACH slot. In other words, 6 PRACH preambles may be TDMed within one PRACH slot. If the number of PRACH repetitions is 4 (e.g., PRACH repetition factor=4), the terminal may select the preceding 4 ROs within the PRACH slot. Indexes of the selected ROs may have a constant difference value (e.g., msg1-FDM).

In the TDD system, the number of valid ROs within the PRACH slot may be small. If the number of PRACH repetitions is large, the repeated PRACH transmission may not be completed within one PRACH slot. If the number of PRACH repetitions is large in the FDD system, the repeated PRACH transmission may not be completed within one PRACH slot. In this case, the terminal may derive an RO group using a time unit larger than a PRACH slot. According to a proposed method, an RO group may include ROs belonging to the same PRACH association period. The PRACH association period may be located within one or more PRACH slots.

The terminal may regard the RO group as including ROs arranged in the time domain. In other words, the terminal may regard the RO group as not including FDMed ROs. Here, msg-FDM may be set to 1. The ROs may be utilized for repeated PRACH transmission. The base station may configure the RO group to the terminal so that the number of ROs belonging to the RO group is not less than the number of PRACH repetitions.

Figure 7:
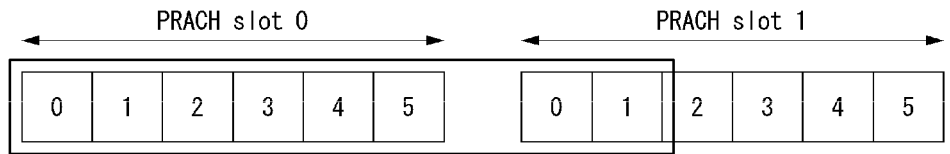
FIG. 7 is a conceptual diagram illustrating a first exemplary embodiment of repeated PRACH transmission using two PRACH slots.

FIG. 7 is a conceptual diagram illustrating a first exemplary embodiment of repeated PRACH transmission using two PRACH slots.

Referring to FIG. 7, 6 ROs may be TDMed in each PRACH slot. In other words, 12 PRACH preambles may be TDMed within 2 PRACH slots. If the number of PRACH repetitions is 8 (e.g., PRACH repetition factor=8), the terminal may select the preceding 8 ROs within the PRACH slots. Indexes of the selected ROs may have a constant difference value (e.g., msg1-FDM). The terminal may assume that 8 ROs are associated with the same SSB. A period including a PRACH slot 0 and a PRACH slot 1 may be a PRACH association period.

The PRACH slots (e.g., PRACH slots 0 and 1) may be adjacent in the time domain. Alternatively, the PRACH slots may not be adjacent in the time domain. For example, the PRACH slots may have an interval of 5 slots (e.g., 5 slots with respect to a subcarrier spacing (SCS) for an active bandwidth part (BWP)) according to a TDD slot pattern.

Parameters operating based on an RO may exist. For example, the parameter operating based on an RO may be a backoff indicator (BI). According to a proposed method, the parameters operating based on an RO may operate based on an RO group. For example, the BI may be interpreted based on an RO having the lowest index or an RO having the highest index among ROs belonging to the RO group. A preamble backoff may be interpreted based on RO(s) having a low index (e.g., lowest index) among ROs belonging to the RO group.

2.3.1 RO Groups for Different PRACH Repetition Factors

The terminal may perform repetitive transmission or non-repetitive transmission of PRACH. The terminal that does not support repeated PRACH transmission may not be able to interpret parameter(s) for repeated PRACH transmission included in system information received from the base station.

Repeated PRACH transmissions with different repetition numbers (e.g., different repetition factors) may be supported in different RO groups. A specific method for repeated PRACH transmission may vary according to the mapping relationship between SSB(s) and RO(s) (e.g., ssb-perRACH-OccasionAndCB-PreamblesPerSSB). Information on RO groups for different repetition factors may be included in system information (e.g., SIB1). For example, the base station may signal information of a first RO group for a first repetition factor and information of a second group for a second repetition factor to the terminal. The first RO group may be used for repeated PRACH transmission, and the second RO group may be used for non-repetitive PRACH transmission.

According to a proposed method, the base station may independently indicate resource(s) in which repeated PRACH transmission is performed and resource(s) in which non-repetitive PRACH transmission is performed using PRACH configuration index(es).

The system information (e.g., SIB1) may indicate one or more PRACH configuration indexes. When one PRACH configuration index is signaled to the terminal, the terminal may assume that repeated PRACH transmission is not performed. When two or more PRACH configuration indexes are signaled to the terminal, the terminal may assume that configuration for repeated PRACH transmission is to be separately signaled.

In order to support various PRACH repetition numbers (e.g., two or more PRACH repetition numbers), a PRACH configuration index may be independently indicated for each PRACH repetition number. In this case, the terminal may assume that different RO group(s) are used for each PRACH repetition number.

Even when the number of PRACH repetitions has any value, the PRACH configuration index may have one value. In other words, one PRACH configuration index may be shared in repeated PRACH transmission. In this case, the system information (e.g., SIB1) may include two PRACH configuration indexes. Accordingly, when repeated PRACH transmission is performed, the terminal may assume that RO group(s) (e.g., all RO groups) are shared.

According to another proposed method, the PRACH configuration index may be commonly applied, and the RO group may be distinguished by a separate method. The PRACH configuration index may include at least information on a time resource where the RO occurs. A time resource where the RO occurs may be determined in consideration of a TDD slot configuration. Accordingly, even when a plurality of PRACH configuration indexes are used in consideration of the number of PRACH repetitions, resources (e.g., time resources) of ROs may be similarly configured. When the resource(s) of the ROs are commonly configured, a method of deriving the resource(s) of the ROs may be differently indicated based on the RO group for each PRACH repetition number.

In a proposed method, the base station may differently indicate ROs (e.g., RO set or RO group) in which repeated PRACH transmission is not performed and ROs (e.g., RO set or RO group) in which repeated PRACH transmission is performed. Different PRACH configuration indexes, different PRACH association periods, and/or different PRACH association pattern periods may be signaled to the terminal, and the terminal may perform PRACH preamble transmission according to one of the signaling. Since the number of PRACH repetitions is different for each terminal, the RO group may be derived or indicated terminal-specifically.

In a proposed method, PRACH preambles detected by the base station in one RO may have the same number of PRACH repetitions. In this case, the terminal may transmit the PRACH preamble in a specific RO after deriving the number of PRACH repetitions. According to this method, since an RO group are allocated separately for each PRACH repetition number, many ROs may be required.

When PRACH preambles having different repetition numbers are transmitted in one RO, the number of ROs configured by the base station may decrease. The RO may be referred to as a shared RO. The RO group (k) may mean an RO group to which a repetition number (k) is applied. k may be a natural number. The RO group (k) may include k ROs, and the k ROs may have different time resources.

In a proposed method, an RO in which repeated PRACH transmission is not performed (hereinafter referred to as 'legacy RO') and an RO (e.g., RO group (k) and/or RO group (m)) in which repeated PRACH transmission is performed may be distinguished by time and/or frequency resources. The RO group (k) and RO group (m) may be distinguished by time and/or frequency resources. Each of k and m may be a natural number greater than or equal to 2, and k may be different from m. When various PRACH repetition numbers are supported, many radio resources may be consumed because the required ROs increases.

As another proposed method, time and/or frequency resources may be shared by the legacy RO and the RO group (k), time and/or frequency resources may be shared by the legacy RO and the RO group (m), and the RO group (k) and the RO group (m) may be distinguished by time and/or frequency resources. Each of k and m may be a natural number greater than or equal to 2, and k may be different from m. ROs belonging to both the RO group (k) and the RO group (m) may not exist.

Figure 8:
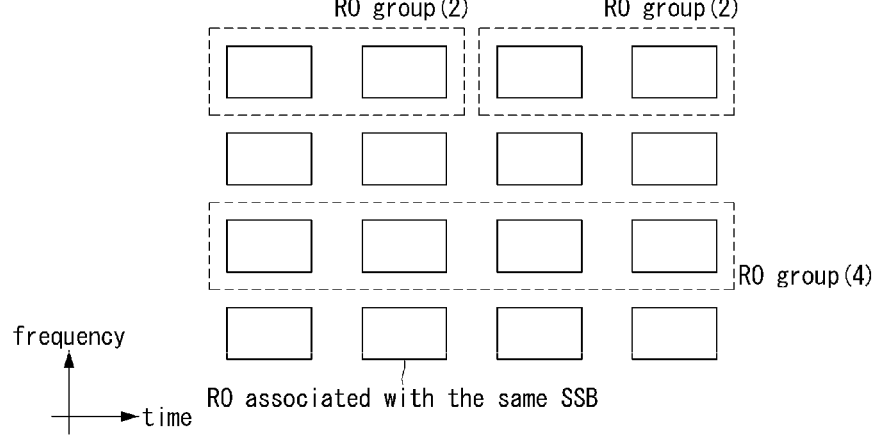
FIG. 8 is a conceptual diagram illustrating a first exemplary embodiment of an RO shared between a legacy RO and an RO group.

FIG. 8 is a conceptual diagram illustrating a first exemplary embodiment of an RO shared between a legacy RO and an RO group.

Referring to FIG. 8, 4 ROs may be FDMed, and 4 ROs may be TDMed. The terminal may transmit a PRACH preamble in each RO. Two RO groups (2) may not overlap with one RO group (4). The RO group may mean an RO set. It may be preferrable that a PRACH preamble set A and/or B used by the existing terminal (e.g., legacy terminal) is distinguished from a PRACH preamble set used by the terminal performing repeated PRACH transmission. The PRACH preamble set may mean a PRACH preamble group. ROs belonging to the same RO group may have the same frequency resource. The terminal may transmit the same PRACH preamble in ROs belonging to the same RO group.

The legacy RO and the RO group (k) may be distinguished from each other, and some ROs may be shared in the RO group (k) and the RO group (m). Each of k and m may be a natural number of 2 or greater. The base station may separately allocate an RO group according to the number of PRACH repetitions. When various PRACH repetition numbers are supported for terminal located in cell edge, many ROs may be required to allocate ROs (e.g., RO group) according to the number of PRACH repetitions. To solve this problem, some ROs may be configured to overlap in the RO group (k) and the RO group (m).

Figure 9:
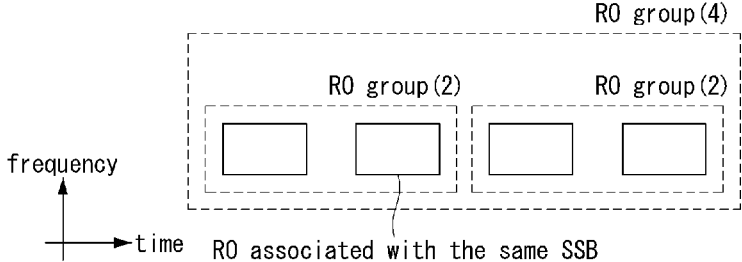
FIG. 9 is a conceptual diagram illustrating a first exemplary embodiment of RO groups having a nested structure.

FIG. 9 is a conceptual diagram illustrating a first exemplary embodiment of RO groups having a nested structure.

Referring to FIG. 9, an RO group (2) and an RO group (4) may be configured to overlap. The RO group (2) may be a subset of the RO group (4). When the RO groups have a nested structure, two ROs in the front part of the RO group (4) or two ROs in the rear part thereof may be interpreted as an RO group (2).

A terminal 1 may select and transmit a PRACH preamble a in an RO belonging to the RO group (4). A terminal 2 may select and transmit a PRACH preamble b in the first RO group (2). The PRACH preamble a and the PRACH preamble b may belong to different PRACH preamble sets. Next, a method for a terminal 3 to select a PRACH preamble in the second RO group (2) will be described. PRACH preamble index(es) detected by the base station may be expressed as a vector.

When the terminal 3 selects the PRACH preamble a (e.g., PRACH preamble a selected by the terminal 1), the base station may detect (a, a, a, a) in a process of searching for the RO group (4). Therefore, the base station may know the existence of the terminal 1. The base station may detect (a, a) in a process of searching for the second RO group (2). However, without performing a successive interference cancellation (SIC) operation on signals received in the RO group (2), the base station may not know whether the PRACH preamble received in the RO group (2) is the PRACH preamble of the terminal 1 or the PRACH preamble of the terminal 3.

When the base station performs the SIC operation, since the influence of the PRACH preamble(s) already detected by the base station should be removed from the received signal, complexity in the base station may increase. Therefore, it may be preferable that the terminal 1 and the terminal 3 use different PRACH preambles.

When the terminal 3 selects the PRACH preamble b (e.g., PRACH preamble b selected by the terminal 2), the base station may detect (b, b, b, b) as well as (a, a, a, a) in a process of searching for the RO group (4). Since the terminal 2 and the terminal 3 transmit the same PRACH preamble, signals (e.g., PRACH preambles) received in the RO group (4) may be regarded as signals of one terminal. Therefore, it may be preferable that the terminal 2 and the terminal 3 use different PRACH preambles.

The terminal 1, terminal 2, and terminal 3 may use different PRACH preambles. Preferably, fragmentation of the PRACH preamble set does not occur. It may be preferable not to use RO groups having a nested structure.

A starting RO of each of the RO groups may be different. In a proposed method, different PRACH preamble sets may be derived. The base station may signal parameter(s) for determining a PRACH preamble set to the terminal(s). The parameter(s) for determining a PRACH preamble set may include at least one of a start value of PRACH preamble index(es), an end value of PRACH preamble index(es), and the number of PRACH preambles. Even for different ROs, the same PRACH preamble set may be derived. In a proposed method, parameter(s) associated with an RO group, the first RO in the RO group, and/or the RO(s) may be introduced, and different PRACH preamble sets may be derived from different ROs based on the parameter(s).

In a proposed method, an offset (x) may be applied to a start value of PRACH preamble index(es) belonging to the PRACH preamble set. Application of the offset (x) may mean application of a hopping or shift to PRACH preamble index(es) belonging to the PRACH preamble set. According to a proposed method, the PRACH preamble set may be changed according to an index of a start RO. For example, the size of the PRACH preamble set may be maintained, but a start PRACH index (e.g., start value of PRACH preamble indexes) may be hopped.

Adjacent RO groups (k) may not overlap each other and may be non-consecutive in the time domain. When the PRACH preamble indexes usable in the first RO group (k) among the adjacent RO groups (k) are expressed as {q, q+1, q+2, . . . , mod(q+w−1, r)}, the PRACH preamble indexes usable in the second RO group (k) among the adjacent RO groups (k) may be expressed as x+{q, q+1, q+2, . . . , mod(q+w−1, r)}. x may be added to {q, q+1, q+2, . . . , mod(q+w−1, r)}, and an appropriate modulo operation may be further performed so that the PRACH preamble indexes belongs to the PRACH preamble set.

Figure 10:
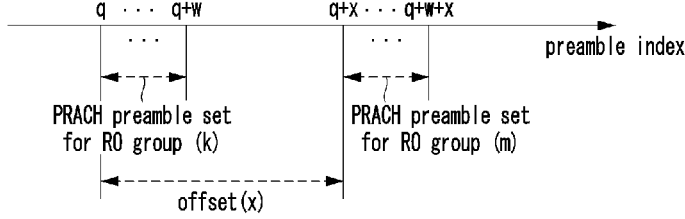
FIG. 10 is a conceptual diagram illustrating a first exemplary embodiment of a hopping method for PRACH preamble indexes included in a PRACH preamble set.

FIG. 10 is a conceptual diagram illustrating a first exemplary embodiment of a hopping method for PRACH preamble indexes included in a PRACH preamble set.

Referring to FIG. 10, PRACH preambles belonging to a set of PRACH preambles transmittable in an RO group (k) may be represented by w consecutive indexes. The PRACH preamble set (e.g., PRACH preamble indexes) transmittable in RO(s) belonging to the RO group (k) may be expressed as {q, q+1, q+w−1}. An RO group (m) distinct from the RO group (k) in the time domain may be considered. In this case, an offset (x) may be applied to the PRACH preamble set. It may be preferable that there is no intersection between a hopped PRACH preamble set (e.g., a PRACH preamble set to which the offset (x) is applied) and a non-hopped PRACH preamble set (e.g., a PRACH preamble set to which the offset (x) is not applied).

A PRACH preamble set capable of repeated transmission may be configured independently of a PRACH preamble set capable of one-time transmission. The PRACH preamble set capable of repeated transmission may be referred to as a separate PRACH preamble set.

In order to support use cases, a PRACH preamble set may be signaled to the terminal in an initial access procedure (e.g., RA procedure). The use cases may be defined variously. For example, the use cases may include repeated Msg3 transmission, indication of a RedCap UE, small data transmission (SDT), radio access network (RAN) slicing, and the like. Classification of the use cases may be necessary starting with transmission of a Msg1, which is an initial access procedure. The use cases may be defined in technical specifications.

Some use cases may share PRACH preambles supported by an RO. Each of the use cases may have some PRACH preambles. Some use cases may be supported in an RO according to priorities. Alternatively, some use cases may not be supported in an RO according to priorities.

The priorities (e.g., featurePriorities) of use cases for a specific RO may be defined. The priorities of use cases may be indicated by system information (e.g., SIB1). The terminal may support all or part of use cases according to its capability. It may be assumed that one use case with the highest priority is selected.

According to a proposed method, repeated PRACH transmission may be regarded as a separate use case, and a priority (e.g., featurePriorities) may be given to the use case.
2.3.2 Method of Extending Frequency Resources System information (e.g., SIB1) may include one PRACH configuration index, and two or more frequency resources may be distinguished. The base station may signal frequency resources of ROs to the terminal. Information on the frequency resources of ROs may include a start position (e.g., msg1-FrequencyStart) and/or the number (e.g., msg1-FDM) of the frequency resources. The terminal may derive frequency resources in units of physical resource blocks (PRBs), and may utilize the frequency resources for indexing (e.g., numbering) of ROs.

In a proposed method, if the number of PRACH repetitions >1, the base station may separately indicate frequency resources to the terminal. The system information (e.g., SIB1) may indicate a start position and/or number of the frequency resources.

In a proposed method, information on a start position of a frequency resource for each number of PRACH repetitions may be included in the system information (e.g., SIB1). The number of frequency resources may be signaled to the terminal as a separate value. Alternatively, the number of frequency resources may be interpreted as a fixed number (e.g., 1). When various numbers of PRACH repetitions are supported, the number of parameters (e.g., RRC parameters) representing the frequency resources may increase. The parameters representing frequency resources may be signaled in form of a list.

In another proposed method, if the number of PRACH repetitions >1, ROs having the same frequency resources may be shared. Regardless of the number of PRACH repetitions, a start position and/or number of frequency resources may be indicated by the system information (e.g., SIB1). Even when various numbers of PRACH repetitions are supported, frequency resources of ROs may not be distinguished. ROs included in an RO group may be classified for each number of PRACH repetitions.

For example, after the number of PRACH repetitions is selected, some ROs distinguished in the time domain among ROs having the same frequency resources (e.g., the same start PRB(s) for the ROs) may be utilized. In a proposed method, the base station may separately signal a time index according to the number of PRACH repetitions to the terminal.

According to the resource configuration information related to the PRACH configuration index, only ROs having the same frequency resource may not form an RO group. If the RO group is limited to being configured in the same frequency resource, the base station may allocate separate resources. Therefore, if the method of signaling the resource location of the RO group is reused, many ROs may be allocated unnecessarily.

When the number of PRACH repetitions is small, an RO group may be configured using ROs indicated in technical specifications. When msg1-FDM<the number of SSB-ROs and the number of PRACH repetitions selected by the terminal is 2, the terminal may not derive an RO group from the same frequency resource. In this case, the first RO index and the second RO index may be associated with each other according to a predetermined rule. In a proposed method, a rule for RO indexes from which an RO group corresponding to the number of PRACH repetitions is derived may be defined in the technical specifications. Alternatively, the rule for RO indexes from which the RO group corresponding to the number of PRACH repetitions is derived may be derived from the system information (e.g., SIB1). Time resources of ROs belonging to the RO group may be different from each other. In addition, frequency resources of ROs belonging to the RO group may be different from each other.

The number of PRACH repetitions may be K1 or K2. ROs within a PRACH slot may be consecutive in the time domain. RO(s) used when the number of PRACH repetitions is K1 may be different from RO(s) used when the number of PRACH repetitions is K2.

Figure 11:
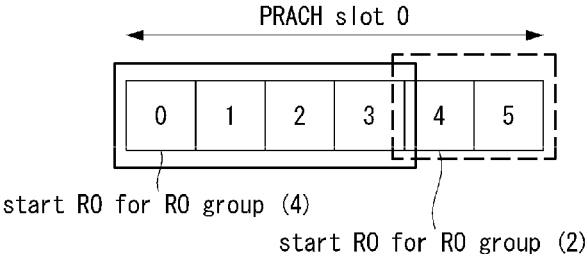
FIG. 11 is a conceptual diagram illustrating a first exemplary embodiment of a TDM method for ROs of PRACHs having different repetition numbers in the same PRACH slot.

FIG. 11 is a conceptual diagram illustrating a first exemplary embodiment of a TDM method for ROs of PRACHs having different repetition numbers in the same PRACH slot.

Referring to FIG. 11, 6 ROs may be TDMed within one PRACH slot. An RO group (4) and an RO group (2) may be consecutive in the time domain. The number of PRACH repetitions in the RO group (4) may be 4, and the number of PRACH repetitions in the RO group (2) may be 2. The base station may transmit system information (e.g., SIB1) including an index of a start RO of each of the RO group (4) and the RO group (2). The terminal may receive the system information from the base station, and based on the system information, the terminal may identify the index of the start RO of each of the RO group (4) and the RO group (2). The terminal may derive an RO group (k) by considering an index of the first RO (e.g., start RO) and the number of PRACH repetitions.

ROs belonging to the RO group (k) may belong to one PRACH slot. Alternatively, ROs belonging to the RO group (k) may belong to a plurality of PRACH slots. According to a TDD slot configuration, ROs may be configured in resource(s) indicated as UL symbol(s) by RRC signaling within an active UL BWP (or initial UL BWP). All symbols belonging to the PRACH slot may be indicated as UL symbols, and ROs configured in the UL symbols may be configured as the RO group (k). The ROs belonging to the RO group (k) may not be consecutive in the time domain.

2.4 Method of Separately Allocating Sequence Resources

The system information (e.g., SIB1) may include prach-RootSequenceIndex, and the terminal may generate a PRACH preamble using prach-RootSequenceIndex. prach-RootSequenceIndex may be considered a cell-specific parameter. prach-RootSequenceIndex may be determined by considering interference between sequences in terms of cell planning of the communication system.

When the PRACH repetition factors are different, the base station may detect corresponding PRACH preambles when the PRACH preambles are different. When PRACH preamble sets A and B are configured in one RO and a plurality of SSBs are associated with one RO, the number of sequences for separately allocating PRACH preambles may be insufficient. Resources (e.g., root sequence) for generating PRACH preambles may be extended. Information elements included in the system information (e.g., SIB1) may be reused to derive the RO group. For example, an information element for indicating 'the number of PRACH repetitions=1' may be reused to derive the RO group. Alternatively, separate information elements used to derive the RO group may be included in the system information (e.g., SIB1).

In a proposed method, a separate root sequence (e.g., prach-RootSequenceIndex) for (PRACH repetition factor >1) may be included in the system information (e.g., SIB1).

When the PRACH preamble is repeatedly transmitted, the PRACH preamble may act as interference to other nearby base station(s). Thus, neighboring base station(s) may allocate separate root sequences. For example, the neighboring base station(s) may allocate separate sequence resources for the terminal(s) performing repeated PRACH transmissions.

In this case, a terminal located in a cell edge and a terminal located in a cell center may transmit PRACH preambles generated based on different root sequences in the same RO. Cross correlation between the PRACH preambles may occur. The terminal located in a cell edge may select one serving cell and may select a route sequence. In this case, the performance of autocorrelation may be good in the serving cell selected by the terminal located in the cell edge. However, if the PRACH preamble of the terminal is treated as interference in another serving cell, cross-correlation may occur. Therefore, even when the terminal located in a cell edge uses a separate route sequence for a plurality of adjacent cells, the burden in the communication system may not increase.

In a proposed method, a separate feature combination may be allocated to perform repeated PRACH transmission. The system information (e.g., SIB1) may assign a feature priority to each feature combination, and the PRACH preamble set (e.g., PRACH preamble index set) may be partitioned based on the feature priority.

In a use case requesting partitioning of the PRACH preamble index set, at least one of an identifier for distinguishing between a RedCap terminal and a normal terminal (e.g., legacy terminal), an identifier for performing RAN slicing, an identifier for performing repeated Msg3 transmission, or an identifier indicating a PRACH preamble index set used for SDT may be used. More than one use case may be supported. For operations in the same RO or RO group, feature priorities may be compared. The feature(s) with the lowest or highest priority may be selected, and the non-selected feature(s) may not be used in the RO or RO group.

2.5 Phase Continuity

The terminal may perform PRACH sweeping and/or repeated PRACH transmission. When PRACH instances are consecutive in the time domain, phase continuity and power consistency may be secured. The terminal may transmit the same PRACH preamble in PRACH instances. In this case, the terminal may transmit the PRACH preamble using the same Tx power and the same Tx beam. To obtain phase continuity, the terminal may not perform a DL-UL switching operation for UL transmission or DL reception between adjacent PRACH instances.

A radio channel between the terminal and the base station may be defined as h, and a sequence of the PRACH preamble may be defined as x. A signal received by the base station in the RO may be expressed as $y=h \cdot x+n$. n may be noise. When the PRACH preamble is repeatedly transmitted twice, signals received by the base station may be $y_1=h_1 \cdot x_1 + n_1$ and $y_2=h_2 \cdot x_2+n_2$. When the terminal uses the same PRACH sequence, $x_1=x_2$ may be defined.

When the terminal repeatedly transmits PRACH preambles in two ROs while maintaining phase continuity, $h_1=h_2$ may be assumed. If the terminal does not maintain phase continuity, $h_1 \neq h_2$ may be assumed. When PRACH slots in which the PRACH preambles are transmitted are different and power consistency and/or phase continuity are not guaranteed, phase discontinuity for the PRACH preamble transmitted by the terminal may occur at a boundary of the PRACH slots. When ROs adjacent in the time domain belong to a coherence time of the radio channel, a fading coefficient may not change. However, amplitudes and/or phases of PRACH sequences in different ROs (e.g., adjacent ROs) may not be maintained as the same value.

In this case, a relationship between effective channels may be expressed as $h_1 = h_2 \cdot A \cdot e^{B\sqrt{-1}}$. If power consistency is ensured, $A=1$ may be considered. If phase continuity is ensured, $B=0$ may be considered.

When the base station receives the PRACH preamble twice and power consistency and/or phase continuity are secured, {Find $x|y_1=h \cdot x+n_1$, $y_2=h \cdot x+n_2$, where h and x are unknown} may be assumed. Otherwise, {Find $x|y_1=h_1 \cdot x+n_1$, $y_2=h_2 \cdot x+n_2$, where $h_1$, $h_2$ and x are unknown} may be assumed. In an optimization problem of searching for the PRACH preamble, since the number of variables of fading coefficients may be reduced, it may be preferable for the terminal to secure power consistency and/or phase continuity between the ROs.

The terminal may derive different frame boundaries based on two or more SSBs. If a Tx beam of each PRACH (e.g., each PRACH preamble) is derived from each SSB, the frame boundary may be interpreted differently. In this case, the terminal may not be able to secure phase continuity between the ROs. In a proposed method, the terminal may derive the same frame boundary by applying the same timing advance (TA) to PRACHs (e.g., PRACH preambles) transmitted in the same PRACH slot. The frame boundary may mean a subframe boundary and/or a slot boundary.

When the terminal derives each Tx beam from each of two or more SSBs, a Tx power may be determined based on a DL RSRP. In this case, the terminal may not be able to secure power consistency between the ROs. In a proposed method, the terminal may apply the same Tx power to PRACHs (e.g., PRACH preambles) transmitted in the same PRACH slot.

2.6 Exemplary Embodiment Using SSB Re-Selection

In order to improve a PRACH quality, the terminal may transmit a plurality of PRACHs (e.g., a plurality of PRACH preambles). The terminal may use one SSB to derive a Tx beam applied to the PRACH. The terminal may determine a Tx beam corresponding to a received SSB, and may transmit a PRACH (e.g., PRACH preamble) in an RO corresponding to the SSB. The terminal may derive an RAR window for the SSB and perform a monitoring operation for a search space (e.g., ra-searchSpace) within the RAR window.

In a PRACH sweeping procedure, the terminal may apply a different Tx beam for each PRACH instance. Since a terminal in the RRC idle state performs the initial access procedure, the terminal may not know which Tx beams to consider for applying different Tx beams. The terminal may derive a set of Tx beams based on signaling of the base station. To indicate the set of Tx beams, the size of system information (e.g., SIB1) may increase. To minimize the size of SIB1, a pattern of Tx beams, a list of Tx beams, and/or codebook information may be required.

The terminal may receive an RAR and identify a BI included in the RAR. The RAR received by the terminal may be an RAR for a PRACH of another terminal. The terminal may derive an integer by multiplying a scaling factor and the BI, randomly extract an integer not larger than the derived integer (e.g., integer smaller than the derived integer), and derive a time resource for retransmission of the PRACH based on the extracted integer.

According to a proposed method, the terminal may interpret a BI for each Tx beam. The terminal may apply a BI for each SSB from which a Tx beam is derived. For example, the terminal may transmit a PRACH in an RO for an SS/PBCH block a, receive an RAR for the PRACH, and derive a BI from the RAR. The derived BI may not be applied to a PRACH transmitted in an RO for an SS/PBCH block b.

According to a proposed method, the terminal may measure RSRP(s) for one or more SSBs, and when the RSRP is equal to or greater than a threshold value configured in the terminal, it may be considered that initial access is possible. The RSRP may mean a measurement result for the SSB The terminal may manage a plurality of parameters (e.g., counters, etc.) necessary for the initial access procedure. The number of initial access procedures that can be simultaneously performed by the terminal may vary depending on capability of the terminal. The parameters (e.g., counters, etc.) required in the initial access procedure may be independently applied to each of SSBs. Some of the parameters required in the initial access procedure may be commonly applied to SSBs. One RO indicated to the terminal may be associated with a plurality of SSBs. In this case, some of the parameters (e.g., counters, etc.) may be managed for each RO.

According to a proposed method, an RAR window (ra-Response Window) may be applied to an RO for each SS/PBCH block. If contention resolution is not completed, the terminal may transmit a PRACH in an RO corresponding to each SSB, and may perform a monitoring operation for an RA search space associated with the RO.

According to a proposed method, when an RAR received by the terminal includes information on the terminal (e.g., an RAPID of a PRACH preamble transmitted by the terminal), the terminal may stop initial access procedure(s) associated with SSB(s) other than the SSB (e.g., SSB1) associated with the RAR. The terminal may obtain scheduling information from the received RAR and transmit a Msg3 to the base station based on the scheduling information.

The terminal may not search for the RAR. Here, the RAR that the terminal does not search for may be RAR(s) for other SSB(s) and the SSB1, and the terminal may not perform a monitoring operation for a search space associated with the RAR.

The terminal may not transmit PRACH(s) derived from SSBs other than the SSB1. The terminal may not monitor ROs derived from the SSBs other than the SSB1.

The terminal may detect one RAR and may detect the RAPID of the terminal from two or more RARs. The terminal may detect the RAPID of the terminal from one RAR, and consider a processing time $\Delta$ for dropping initial access procedure(s) using other SSB(s). The terminal may continue to perform the initial access procedure using two or more SSBs until the processing time $\Delta$ elapses.

In this case, the terminal may transmit the PRACH to the base station. Alternatively, the terminal may perform a monitoring operation for the search space (RA searchSpace). The terminal may transmit two or more Msg3s to the base station.

When two or more RARs (e.g., UL grants) are received, the terminal may select one UL grant from among the two or more UL grants, and transmit a Msg3 to the base station based on one UL grant.

The terminal may receive RARs on different PDSCHs and obtain UL grants from the RARs. In this case, the terminal may operate according to a UL grant obtained from an RAR received at an earlier time point (e.g., DL slot or PDSCH). When two or more RARs are received on the same PDSCH, the terminal may operate according to an RAR scheduling an earlier PUSCH (e.g., UL slot) among the two or more RARs.

When RSRPs for two SSBs (e.g., SSB a and SSB b) are greater than or equal to a boundary value, the terminal may independently perform an initial access procedure for each of the two SSBs. The terminal may transmit a PRACH preamble a in an RO associated with the SSB a, and may perform a monitoring operation for an RAR window a to receive an RAR. If a BI is obtained from an RAR for another terminal, the terminal may (re)transmit the PRACH in an RO associated with the SSB a after a preset time elapses.

The terminal may transmit a PRACH preamble b in an RO associated with the SSB b, and may perform a monitoring operation for an RAR window b to receive an RAR. When a BI is obtained from an RAR for another terminal, the terminal may (re)transmit the PRACH in an RO associated with the SSB b after a preset time elapses.

The terminal may receive the RAR for the RO associated with the SSB a, obtain a BI from the RAR, and apply the BI to the PRACH associated with the SSB a. The terminal may receive the RAR for the RO associated with the SSB b, obtain a BI from the RAR, and apply the BI to the PRACH associated with the SSB b.

The RAPID included in the RAR received by the terminal may be the same as the RAPID of the PRACH preamble transmitted by the terminal (e.g., the RAPID of the PRACH sequence associated with the SSB a). In this case, the terminal may transmit a Msg3 according to a UL grant included in the RAR. Another initial access procedure (e.g., PRACH associated with the SSB b) associated with a RAPID different from the RAPID included in the RAR may be canceled. For example, PRACH retransmission and/or RAR (e.g., UL grant) may be canceled.

2.7 Tx Beam Determination

The terminal operating in FR2 may transmit capability signaling (e.g., capability report) including beam correspondence. The capability of the terminal may be classified into a capability 1 to satisfy beam correspondence requirements by performing UL beam sweeping and a capability 0 to satisfy beam correspondence requirements without performing UL beam sweeping. The terminal may transmit either the capability 1 or capability 0 to the base station.

The terminal supporting the capability 1 may not be able to guarantee beam correspondence before performing UL beam sweeping. In this case, even when the terminal transmits a PRACH in an RO associated with an SSB, beam correspondence may not be guaranteed. The terminal supporting the capability 1 may perform repeated PRACH transmission without changing a Tx beam. The base station (or transmission and reception point (TRP), Rx panel) may not know the Tx beam of the terminal used for the PRACH transmission. The terminal supporting the capability 0 may derive a plurality of Tx beams using one SSB. Even in this case, the base station (or TRP, Rx panel) may receive a signal from the terminal. Therefore, the terminal may perform repeated PRACH transmission while changing a Tx beam.

The terminal supporting FR1 may not perform beam-based operations. Therefore, the aforementioned constraints may not be taken into account. The terminal may transmit a PRACH in an RO associated with an SSB, and there may be a freedom for selecting a Tx beam. In PRACH sweeping and/or repeated PRACH transmission, the terminal may use a different Tx beam for each PRACH instance.

The base station may not know the Tx beam selected by the terminal. Therefore, even when the PRACH preamble is repeatedly received, the base station may independently perform reception processing for the PRACH preamble for each PRACH instance. In this case, the base station may not be able to perform a soft combining operation on the PRACH preambles.

In the exemplary embodiment of FIG. 11, PRACH sweeping and/or repeated PRACH transmission may be performed. Four PRACH instances may be transmitted. The terminal may apply a different Tx beam to each PRACH instance. One or more PRACH instances may correspond to the same RO. PRACH sweeping and/or repeated PRACH transmission may be performed in a plurality of ROs.

The same PRACH preamble may be derived from PRACH instances belonging to the same RO. Different PRACH preambles may be derived from different ROs. The terminal may select a new PRACH preamble for each RO.

The terminal may determine a Tx beam and/or Tx power of a PRACH instance based on SSB(s). A PRACH i may be transmitted in an RO i associated with SSBs {i, j, . . . }. The terminal may derive a Tx power of a PRACH j transmitted in an RO j based on a reception strength (e.g., RSRP) of an SSB j.

The terminal may determine the number of repetitions of the PRACH j using the one SSB j. When the terminal uses a plurality of SSBs and a Tx beam of the terminal is derived from each of the SSBs, each Tx beam may have different repetition numbers.

When the terminal selects a plurality of SSBs, the terminal may determine the number of PRACH repetitions based on a comparison result between an RSRP of each of the plurality of SSBs and an RSRP threshold. When the terminal repeatedly transmits the PRACH based on a Tx beam sweeping scheme, the number of ROs required for each SSB may be different.

In a proposed method, the terminal may perform repeated PRACH transmission using a first Tx beam, and then perform repeated PRACH transmission using a second Tx beam. In another proposed method, PRACH transmission using a changed Tx beam may be configured as one transmission unit, and the terminal may repeatedly perform the transmission unit. In this case, the number of PRACH repetitions for each of the Tx beams may be the same.

The Tx beam of the PRACH instance may be determined by referring not only to the SSB but also to other reference signal(s) (RS(s)). For example, the other RS(s) may be a channel state information (CSI)-RS, a positioning reference signal (PRS), and/or a sounding reference signal (SRS). In a proposed method, the base station may indicate a transmission configuration indicator (TCI)-state or RS of the PRACH to the terminal, and the terminal may determine the Tx beam to be applied to the PRACH instance based on the TCI state or RS indicated by the base station.

In order to derive the Tx beam of the PRACH from the SSB, an RRC connection between the terminal and the base station does not need to be established. In order to indicate the RS (e.g., CSI-RS, PRS, SRS) to the terminal, an RRC connection between the terminal and the base station needs to be established. Even when the Tx beam is not indicated to the terminal before the RRC connection between the terminal and the base station is established, the terminal may determine the Tx beam using the SSB. In order to indicate the Tx beam to the terminal, the base station may indicate an SSB, DL RS, and/or UL RS to the terminal.

According to a proposed method, when a TCI-state of a PRACH is indicated to the terminal, in order to indicate an RS to which the TCI-state refers to the terminal, the base station may signal a serving cell ID, BWP ID, RS resource ID, and/or physical cell identifier (PCI) to the terminal. The terminal may repeatedly transmit PRACH instances using the same Tx beam. Alternatively, the terminal may transmit the PRACH instances based on a Tx beam sweeping scheme. In this case, information indicating the Tx beam of the PRACH may include information on one or more RSs. The terminal may derive one Tx beam from each RS. When two or more RSs are indicated to the terminal, the terminal may repeatedly transmit PRACH instances.

When the terminal transmits a PRACH to a base station other than the serving base station, a frequency resource and/or PCI for the PRACH transmission may be indicated in advance.

The terminal may derive two or more Tx beams for the SSB. It may be difficult to pre-determine the Tx beams derived by the terminal. It may be difficult to separately indicate Tx beams derived by the terminal. The terminal may acquire time synchronization and frequency synchronization based on one SSB, and derive Tx beam(s) satisfying beam correspondence. 'Beam correspondence for the SSB is established' may mean satisfying a predefined condition.

A plurality of Tx beams may be derived, and all the derived Tx beams may correspond to the same spatial relation information (e.g., the same SSB). The Tx beams may be orthogonal to each other. Alternatively, the Tx beams may not be orthogonal. The Tx beams may have radiation patterns in which some lobes overlap.

Figure 12:
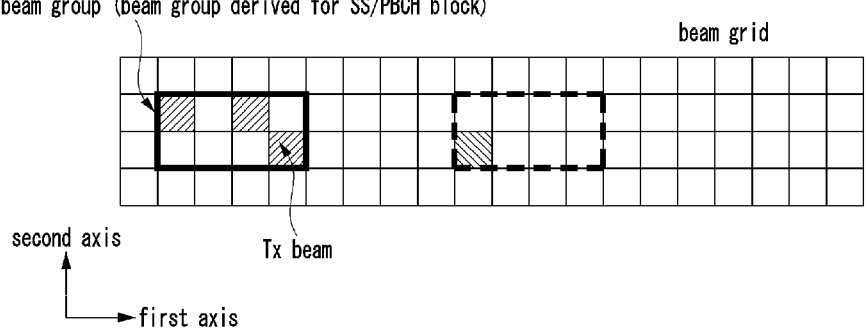
FIG. 12 is a conceptual diagram illustrating a first exemplary embodiment of a beam grid and Tx beam(s) corresponding to an SSB.

FIG. 12 is a conceptual diagram illustrating a first exemplary embodiment of a beam grid and Tx beam(s) corresponding to an SSB.

Referring to FIG. 12, a Tx beam of the terminal may correspond to one grid, and Tx beams associated with the same SSB may be classified into adjacent grids. The grids may constitute one beam group and may be interpreted as grids satisfying beam correspondence with one SSB.

When the base station can simultaneously apply different Rx beams, the base station may indicate that a plurality of SSBs correspond to one RO through signaling. For example, the terminal may transmit PRACH preambles in one RO corresponding to n SSBs (e.g., SSB 1, SSB 2, . . . , SSB n). n may be a natural number. The terminal may derive n Tx beams (e.g., Tx beam 1, . . . , Tx beam n) based on the beam correspondence. The Tx beams may be distinguished by TCI states, spatial relationship information, and/or quasi colocations (QCLs). The terminal may derive Tx powers of the PRACH preambles based on measurement results (e.g., RSRPs) of the SSBs. Therefore, the Tx power may be different for each Tx beam.

The base station may indicate that one SSB corresponds to a plurality of ROs (e.g., RO 1, RO 2, . . . , RO m) through signaling. m may be a natural number. For example, when m ROs corresponding to one SSB are configured in the time domain, the terminal may select n' ROs and transmit PRACH preambles in the n' ROs. n' may be less than or equal to m. The terminal may derive n' Tx beams (e.g., Tx beam 1, . . . , Tx beam n') based on the beam correspondence for the same SSB. The Tx powers of the PRACH preambles may be the same.

The case where the Tx beams of the terminal are orthogonal may correspond to a case where the base station arranges TRPs (or RxPs) geographically apart or a case where the base station uses a plurality of Rx panels. In this case, the Tx beams of the terminal may constitute a beam group. Alternatively, the Tx beams of the terminal may have grids far apart from each other. Even if the beam correspondence for one SSB is not satisfied, the Tx beams may be Tx beams derived from one SSB.

2.7.1 Switching Time of a Tx Beam

When PRACH sweeping and/or repeated PRACH transmission is applied to PRACH instances belonging to the same RO, the corresponding PRACH instances may have a preset time interval. The terminal may change the Tx beam or Tx timing using the preset time interval.

Tx beam switching may not be performed in consecutive ROs belonging to the same RACH slot. Several microseconds (us) may be required for the Tx beam switching operation. When a certain subcarrier spacing (SCS) is applied, the Tx beam switching operation may be performed within a cyclic prefix (CP). However, when another SCS is applied, the Tx beam switching operation may not be completed within a CP.

According to a proposed method, for $\mu_0$ (=0, 1, 2, . . . ), in a PRACH transmission procedure to which an SCS ($\mu$) less than $\mu_0$ is applied, the Tx beam switching operation may be allowed in adjacent ROs in the time domain. However, in a PRACH transmission procedure to which an SCS($\mu$) equal to or greater than $\mu_0$ is applied, the Tx beam switching operation may not be allowed in adjacent ROs in the time domain.

In the PRACH transmission procedure to which an SCS ($\mu$) equal to or greater than $\mu_0$ is applied, the terminal may not transmit a PRACH in temporally adjacent ROs within the same PRACH slot, and may transmit a PRACH in an RO next to the adjacent ROs. When the Tx beam sweeping operation is performed, only the first RO may be indicated to the terminal.

Figure 13:
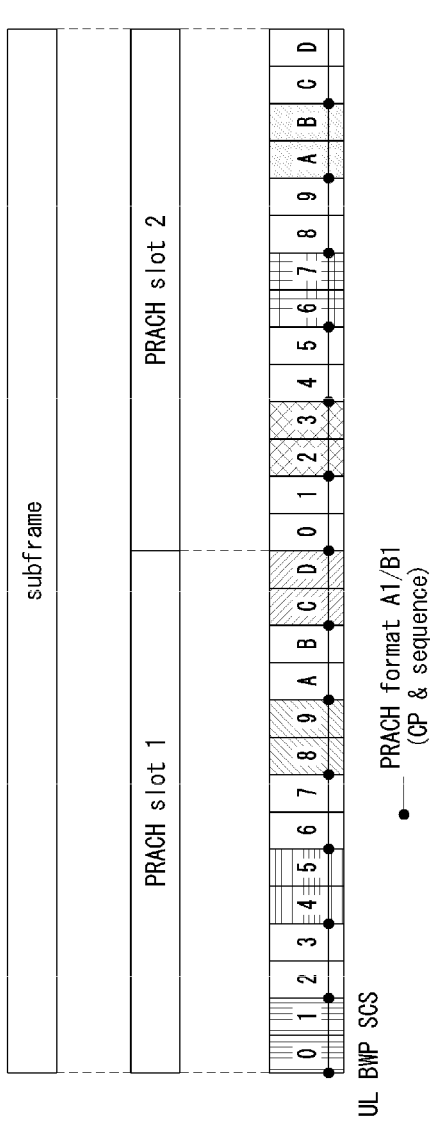
FIG. 13 is a conceptual diagram illustrating a first exemplary embodiment of a PRACH sweeping operation in a PRACH slot.
Figure 14:
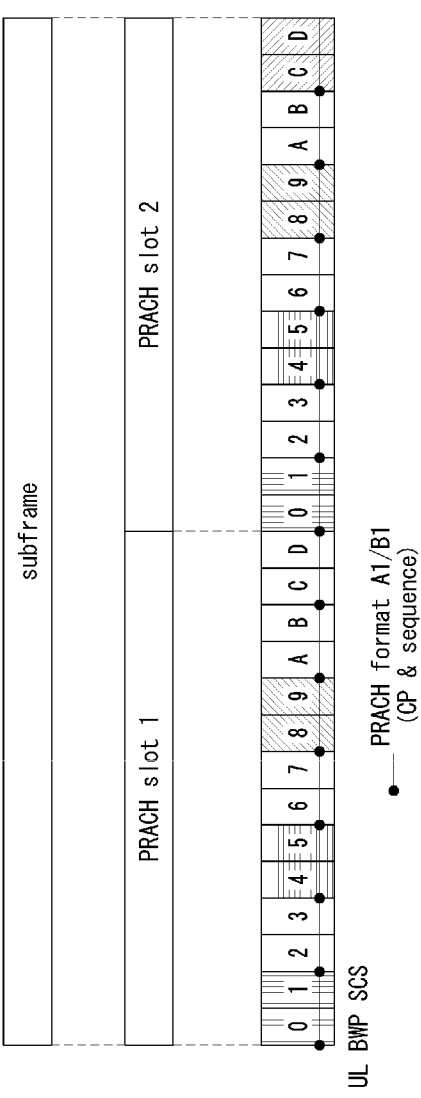
FIG. 14 is a conceptual diagram illustrating a second exemplary embodiment of a PRACH sweeping operation in a PRACH slot.
Figure 15:
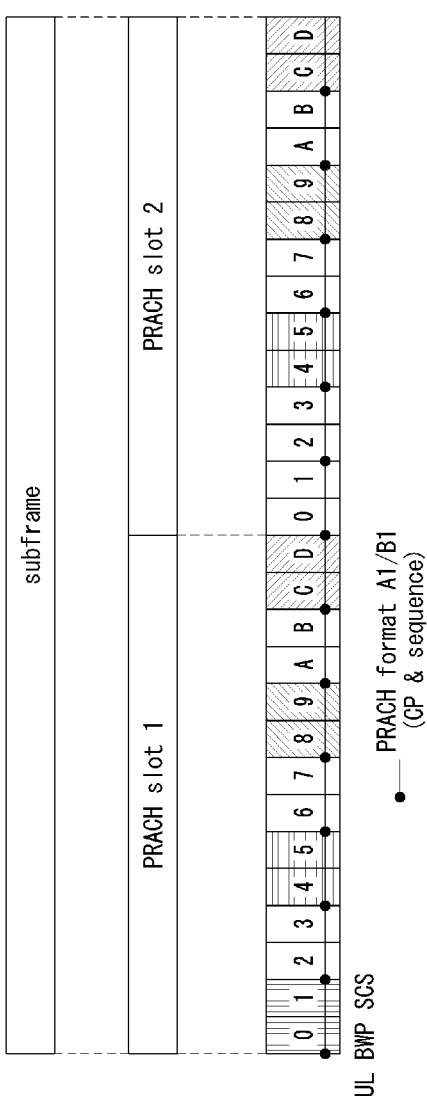
FIG. 15 is a conceptual diagram illustrating a third exemplary embodiment of a PRACH sweeping operation in a PRACH slot.

FIG. 13 is a conceptual diagram illustrating a first exemplary embodiment of a PRACH sweeping operation in a PRACH slot, FIG. 14 is a conceptual diagram illustrating a second exemplary embodiment of a PRACH sweeping operation in a PRACH slot, and FIG. 15 is a conceptual diagram illustrating a third exemplary embodiment of a PRACH sweeping operation in a PRACH slot.

Referring to FIGS. 13 to 15, the terminal may transmit 7 PRACHs (e.g., PRACH preambles) using the same Tx beam within one PRACH slot. When a Tx beam sweeping operation (e.g., PRACH sweeping operation) is performed, the terminal may transmit the PRACHs in non-adjacent ROs. In the present disclosure, the Tx beam sweeping operation may mean the Tx beam switching operation.

The RO may be mapped based on a subframe including two PRACHs. In the exemplary embodiment of FIG. 13, the RO may be mapped to symbols C and D of a PRACH slot 1, and the RO may be mapped to symbols after one or more symbols from the symbols C and D of the PRACH slot 1. For example, the RO may be mapped in symbols 2 and 3 of a PRACH slot 2.

In the exemplary embodiment of FIG. 14, an RO may be mapped to each of the PRACH slots. A new RO may be mapped for each PRACH slot. When mapped in symbols C and D of the PRACH slot 1, the RO may not be mapped in symbols 1 and 2 of the PRACH slot 2. When not mapped in symbols C and D of the PRACH slot 1, the RO may be mapped in symbols 1 and 2 of the PRACH slot 2. Since there is no other PRACH slot (e.g., PRACH slot 3) consecutive to the PRACH slot 2, the RO may be mapped in symbols C and D of the PRACH slot 2. Alternatively, in order to balance the PRACH slot 1 and the PRACH slot 2, the RO may not be mapped in symbols C and D of the PRACH slot 2.

In the exemplary embodiment of FIG. 15, the RO may be identically mapped in each of the PRACH slots. The RO may not be mapped to symbols C and D of the PRACH slot 1, and the RO may not be mapped to symbols 0 and 1 of the PRACH slot 2. The RO may be mapped considering a time for changing the Tx beam. If ROs constituting an RO group are invalid, the invalid ROs may not be used.

When the terminal has two or more Tx panels, the Tx panels may have different Tx beams. For example, a first Tx panel may have a first beam and a second Tx panel may have a second beam. In this case, the terminal may use another Tx panel to change a Tx beam. A time for the terminal to change a Tx panel may be very short. Even when ROs are consecutively mapped in the time domain, separate symbol(s) for the Tx beam switching operation may not be allocated. According to the exemplary embodiments of FIGS. 13 and 14, adjacent ROs may be used. In this case, power allocated to the Tx beams by the terminal may be the same. Alternatively, the powers allocated to the Tx beams by the terminal may be different from each other. If the power is changed for each Tx beam, the terminal may derive the power of the corresponding Tx beam based on a reception strength of a DL signal/channel used to derive the Tx beam. In the present disclosure, a signal/channel may mean a signal and/or a channel.

Even when the terminal uses one Tx panel, a separate symbol for the Tx beam switching operation may be unnecessary depending on the capability of the terminal. In this case, in the exemplary embodiments of FIGS. 13 to 15, adjacent ROs may be used.

ROs may be indexed first according to the order of frequency resources, and then indexed according to the order of time resources. When M ROs are configured in the frequency domain within the same PRACH slot, indexes of ROs adjacent in the time domain may be increased by M. M may be a natural number. When the Tx beam sweeping operation is used, a difference between RO indexes in the PRACH transmission procedure may be 2·M.

According to a proposed method, the terminal may perform the Tx beam sweeping operation in ROs having the same frequency resources among ROs belonging to the PRACH slot.

When the number of valid PRACH occasions decreases in the TDD system, the number of PRACH repetitions may increase. In this case, the Tx beam sweeping operation may not be completed in one PRACH slot, and the terminal may drop PRACH(s) that could not be transmitted. It may be difficult for the base station to comprehensively process PRACH preambles received in a plurality of PRACH slots. Accordingly, the PRACH transmission operation may be limited to being performed in one PRACH slot. In this case, an RO in which PRACH is initially transmitted may be limited.

According to a proposed method, PRACH instances not transmitted in the PRACH slot may be dropped. According to a proposed method, a counter managed by the terminal may be increased in units of a PRACH slot instead of the RO. A retransmission counter and a power ramping counter of the PRACH may be managed based on RO. When the PRACH sweeping operation is performed, the counter may be managed or processed for each PRACH sweeping operation. When the PRACH sweeping operation is performed, the counter may be managed based on the PRACH slot.

2.8 CFRA

The terminal may transmit a PRACH according to an indication of the serving base station. The terminal may receive a DCI format 1_0, and when a specific condition (e.g., frequency domain resource allocation (FDRA) field values are all set to 1), the DCI format 1_0 may be interpreted as a PDCCH order not scheduling DCI. In this case, the terminal may interpret information field(s)

included in the DCI format 1_0 (e.g., information field(s) following the FDRA field) for use as the PDCCH order.

A random access (RA) preamble index, an SSB index, and/or a PRACH mask index may be signaled to the terminal. The terminal may derive one resource using the index(es) indicated by the base station. For example, the terminal may derive one or more ROs using the SSB index and select one RO using the PRACH mask index. The terminal may transmit a PRACH using the RA preamble index.

In a proposed method, the terminal may derive the number of PRACH repetitions using an RSRP of the SSB. As another proposed method, the terminal may derive the number of PRACH repetitions based on information of a DCI format (e.g., information field(s) and/or information element(s) included in the DCI format.

The resource indicated by the PRACH mask index may mean the first RO through which the PRACH is transmitted. The terminal may repeatedly transmit the PRACH using consecutive ROs or non-consecutive ROs after the first RO. In other words, the terminal may repeatedly transmit the PRACH using the first RO and one or more ROs subsequent to the first RO.

An information field included in the DCI may indicate the number of PRACH repetitions. The base station may inform the terminal of mapping relationship information between the numbers of PRACH repetitions and indexes using signaling. The terminal may know mapping relationship information between the numbers of PRACH repetitions and the indexes based on the signaling of the base station. The DCI may include an index mapped to the number of PRACH repetitions. Therefore, the terminal may identify the number of PRACH repetitions based on the index included in the DCI and the mapping relationship information indicated by the signaling. Alternatively, an information field (e.g., information element) included in the DCI may directly indicate the number of PRACH repetitions. The information field used to indicate the number of PRACH repetitions may be one or more reserved bits among reserved bits in a DCI format 1_0.

The terminal may transmit the PRACH to a base station other than the serving base station. When the terminal performs beam management using a DL RS received from another base station, the terminal may directly transmit a beam failure recovery request to the base station other than the serving cell (e.g., serving base station). For a handover procedure, the serving base station (e.g., source gNB) may transmit a PDCCH order to the terminal, and the terminal may transmit a PRACH based on the PDCCH order of the serving base station. Another base station (e.g., target gNB) may receive the PRACH from the terminal.

In a proposed method, the base station may signal information (e.g., PCI and/or TRP ID) for deriving an RO through which a PRACH is transmitted to the terminal. The PCI may be indicated to the terminal by signaling from the base station. In this case, in order for the terminal to transmit a PRACH to one base station, the PCI may be additionally indicated to the terminal. The PCI may be derived from information of a DCI format. The terminal may identify the PCI based on an information field included in the DCI. The PCI may be represented by one or more reserved bits among reserved bits of the DCI. The terminal may derive the RO based on a combination of the PCI and an SSB index. Since the DCI format (e.g., DCI format 1_0) includes the PCI, the size of the DCI format may increase. If reserved bit(s) of the DCI format are used to represent the PCI, the conventional DCI format may be reused.

Alternatively, the PCI may be derived from information of a MAC CE. The base station may transmit a MAC CE including the PCI applied to the PDCCH order to the terminal on a PDSCH. The terminal may receive the MAC CE from the base station. After a time at which the MAC CE is reflected, the terminal may apply the PCI indicated by the MAC CE. In this case, the terminal may reuse the conventional DCI format.

When the additional PCI is indicated to the terminal, the terminal may interpret the SSB index based on the additional PCI, and determine the RO based on the interpretation of the SSB index. When the additional PCI is not indicated to the terminal, the terminal may interpret the SSB index based on a PCI of the serving cell and determine the RO based on the interpretation of the SSB index.

The PCI and/or TRP ID may be indicated to the terminal. In a scenario where the same PCI is used, the terminal may transmit PRACHs to different TRPs. To support this operation, Tx beam(s) and/or TRP ID(s) for PRACH transmission may be indicated to the terminal. The base station may explicitly indicate the TRP ID(s) to the terminal. Alternatively, the terminal may derive the TRP ID(s) in an implicit manner. The TRP ID(s) may be indicated to the terminal by a CORESET pool index in which DCI triggering the PRACH (or DCI triggered by the PRACH) is detected, an information field of the DCI, and/or a MAC CE.

The base station may inform the terminal of a list (e.g., table or structure) of combination(s) of the PCI, SSB index, and/or TRP ID using signaling. DCI may indicate an index for PCI, SSB index, and/or TRP ID. The index included in the DCI may indicate one combination in the list configured by RRC signaling. The terminal may identify the combination of PCI, SSB index, and/or TRP ID based on the RRC signaling and the DCI.

Alternatively, the base station may inform the terminal of a list (e.g., table or structure) of combination(s) of the PCI, SSB index, TRP ID, RAPID, and/or PRACH mask index using signaling. DCI may indicate an index for PCI, SSB index, TRP ID, RAPID, and/or PRACH mask index. The RAPID and the PRACH mask index may be indicated by the DCI. The index included in the DCI may indicate one combination in the list configured by RRC signaling. The terminal may identify the combination of PCI, SSB index, TRP ID, RAPID, and/or PRACH mask index based on the RRC signaling and the DCI.

In a proposed method, the base station may instruct the terminal to perform repeated PRACH transmission using the same Tx beam or to perform repeated PRACH transmission using different Tx beams. The indication may be transmitted through signaling (e.g., RRC signaling) of the base station. The terminal may confirm that repeated PRACH transmission using the same Tx beam or repeated PRACH transmission using different Tx beams has been indicated to perform based on the signaling of the base station.

The base station may transmit association information between Tx beam(s) and PRACH instance(s) for repeated PRACH transmission to the terminal using signaling. The terminal may identify the association information between Tx beam(s) and PRACH instance(s) for repeated PRACH transmission by receiving the signaling from the base station. When one Tx beam is indicated to the terminal or when no Tx beam is indicated to the terminal, the terminal may transmit PRACH instances in adjacent ROs in the time domain. When two or more Tx beams are indicated to the terminal, the base station may allocate a time gap for changing the Tx beam to the terminal. In this case, the terminal may transmit PRACHs in non-consecutive ROs.

Chapter 3 Dynamic Waveform Switching

In a mobility environment, a terminal may move from a region adjacent to a base station to a region far from the base station. In this case, if the terminal does not perform a handover procedure, the base station may re-configure or re-indicate, to the terminal, PDSCH/PUSCH transmission parameter(s) suitable for a radio channel. When a waveform of a PUSCH is changed, a low peak to average power ratio (PAPR) and/or a low cubic metric (CM) may be obtained.

DCI formats 0_0, 0_1, and/or 0_2 may schedule PUSCHs having different waveforms. Since the DCI format 0_0 performs scheduling using limited parameters, there may be a room for improvement in terms of a transmission amount of a PUSCH. In a proposed method, the waveform may be dynamically changed.

'Changing a waveform' may mean 'changing a transform precoder to an active state or an inactive state'. When a waveform is changed, a changed modulation and coding scheme (MCS) table may be applied. Since MCS tables used in CP-OFDM and DFT-s-OFDM are different, the terminal may assume 'a waveform is changed' as 'MCS table(s) are changed'. The base station may signal that MCS table(s) are changed to the terminal. In this case, the terminal may interpret 'changing the MCS table(s)' as 'changing the waveform'. In the present disclosure, a change in a waveform may be interpreted as the same as a change in MCS table(s).

Waveform switching, waveform change, and waveform indication may mean activation of a transform precoder, inactivation of a transform precoder, and/or change of MCS table(s).

3.1 Application Time for Waveforms Switching

The terminal may transmit a PUSCH in a slot n by applying a new waveform. Depending on the waveform, the sizes of information fields of scheduling DCI may vary. The base station may transmit all parameters necessary for DFT-s-OFDM and CP-OFDM to the terminal. In this case, the terminal may dynamically change the waveform.

Among information fields of the DCI, the sizes of information fields corresponding to 'precoding information and number of layers', 'antenna port', 'phase tracking reference signal (PTRS)-demodulation reference signal (DMRS) association', and/or 'DMRS sequence initialization' may vary depending on the waveform.

The sizes of the information fields included in the scheduling DCI may vary depending on the waveform. The size of the scheduling DCI may be determined based on a long information field. Known bit(s) may be appended to a shortened information field. Alternatively, in a long information field, the most significant bit(s) (MSB(s)) or least significant bit(s) (LSB(s)) may be considered as valid bit(s).

In a slot n−1 or in a previous slot and a slot n, the sizes of the information fields of the DCI may be the same, but information derived by the terminal from the information fields of the DCI may be different. A time T ahead of a preset time $T_{proc}$ from a transmission time of the first symbol of the PUSCH may be considered.

3.1.1 Method of Changing a Waveform Using DCI

When a waveform is changed by an information field of DCI, the terminal may apply the waveform indicated by the DCI (e.g., scheduling DCI). Since a time at which the change of the waveform is indicated is a time at which the scheduling DCI is received, sufficient time for applying the new waveform may be given to the terminal.

A time required by the terminal to transmit the PUSCH may be considered to be greater than or equal to $T_{proc,2}$. Since the waveform can be derived according to a DCI format when the scheduling DCI is detected, the terminal may start preparation for PUSCH transmission after completing cyclic redundancy check (CRC) check and/or validity check.

The terminal may apply the waveform derived from information field(s) of the DCI. When the CRC check and/or validity check is completed and determination of the waveform using a DCI payload is completed, the terminal may determine whether to perform transform precoding. Accordingly, a time for activating or deactivating a discrete Fourier transform (DFT) engine may be additionally considered. Symbol offsets constituting $T_{proc,2}$ may be improved. A new symbol offset may be added. Alternatively, a value of the existing symbol offset may be increased.

A new DCI format for non-fallback DCI may be introduced, and the new DCI format may be utilized to change the waveform. The base station may transmit a new DCI format to the terminal to change the waveform. The terminal may receive the new DCI format from the base station and transmit an HARQ-ACK (e.g., ACK) for the new DCI format to the base station.

3.1.2 Method of Changing a Waveform Using a MAC CE

The change of the waveform may be indicated by a method (e.g., MAC CE) other than scheduling DCI. In this case, the last time at which the terminal applies the change of the waveform may be derived by considering a predefined processing time from the first symbol through which the PUSCH is transmitted. The predefined processing time may be referred to as T.

If the change of the waveform is allowed at or after T, the terminal may assume that the new waveform indicated by the MAC CE is not reflected when transmitting the PUSCH. Here, $T_{proc}$ may be a value defined in technical specifications. $T_{proc,2}$ may be defined and a symbol offset may be applied. The PUSCH may be scheduled by a non-fallback DCI format. The change of the waveform may not be allowed in a PUSCH scheduled by a fallback DCI format.

Figure 16:
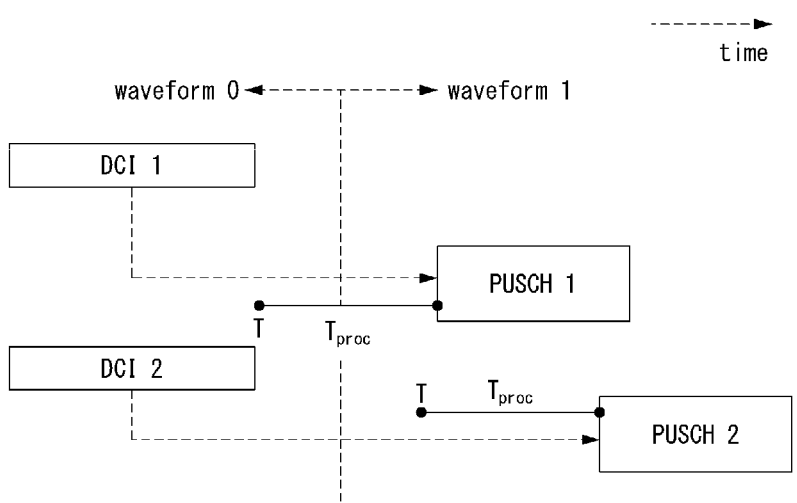
FIG. 16 is a conceptual diagram illustrating a first exemplary embodiment of a time at which a change in a waveform for a PUSCH scheduled by DCI is reflected.

FIG. 16 is a conceptual diagram illustrating a first exemplary embodiment of a time at which a change in a waveform for a PUSCH scheduled by DCI is reflected.

Referring to FIG. 16, a PUSCH 1 and a PUSCH 2 may be considered. The terminal may derive T for the PUSCH 1 scheduled by DCI 1. A time at which the change of the waveform is reflected in the terminal may be later than T for the PUSCH 1. In this case, the terminal may not change the waveform. In other words, the terminal may transmit the PUSCH 1 using a waveform 0. Therefore, the terminal may interpret the sizes of information fields of the DCI 1 as the sizes of information fields for scheduling the waveform 0.

The terminal may derive T for the PUSCH 2 scheduled by DCI 2. A time at which the change of the waveform is reflected in the terminal may be earlier than T for the PUSCH 2. In this case, the terminal may change the waveform. In other words, the terminal may transmit the PUSCH 2 using a waveform 1. Therefore, the terminal may interpret the sizes of information fields of the DCI 2 as the sizes of information fields for scheduling the waveform 1.

An SCS according to a MAC CE may be interpreted as a numerology of a serving cell or a reference numerology of a PCell. The terminal may derive an accurate time at which the change of the waveform is reflected by comparing the SCS according to the MAC CE with an SCS of active UL BWP, default UL BWP, or initial UL BWP.

3.2 Configured Grant (CG) PUSCH

A CG PUSCH may be classified into a type 1 CG PUSCH configured by RRC signaling and a type 2 CG PUSCH activated and released by DCI. Parameters required for configuring a CG PUSCH may vary for each type of waveform. According to a proposed method, it may be preferable for the base station to indicate to the terminal configuration information for all waveforms supported by the CG PUSCH. For example, the configuration information (e.g., parameters) may include at least PUSCH DM-RS information and FDRA information.

According to a proposed method, configuration information of type 1 CG PUSCH and/or type 2 CG PUSCH may include DM-RS information for DFT-s-OFDM and CP-OFDM, respectively. The DM-RS information for DFT-s-OFDM may include information for generating a Zadoff-Chu sequence. The DM-RS information for CP-OFDM may include information for generating a Gold sequence.

The FDRA information may be interpreted differently depending on the waveform. When performing DFT precoding, the number of PRBs derived by FDRA may be a multiple of 2, 3, or 5. According to technical specifications, a T0 FDRA (i.e., Type0 FDRA) may be expressed as a bitmap, and one bit of the bitmap may represent whether or not consecutive virtual resource blocks (VRBs) are allocated. A T1 FDRA (i.e., Type 1 FDRA) may be expressed as a resource indication value (MV), and the terminal may derive a start VRB and the number of consecutive VRBs based on the MV. When a T2 FDRA (i.e., Type 2 FDRA) is used, VRBs may be derived as an index of an interlace. The VRB may be mapped to a PRB.

According to a proposed method, a FDRA of the type 1 CG PUSCH and/or type 2 CG PUSCH may be limited to the T1 FDRA. When the T1 FDRA is used, VRBs may be allocated in form of an MV. In this case, when transform precoding is applied, a PAPR, CM, and/or inter-modulation distortion may be reduced. In this case, the number n of PRBs allocated to transmit the PUSCH may be a multiple of 2, 3, or 5.

According to a proposed method, when the FDRA of type 1 CG PUSCH and/or type 2 CG PUSCH is indicated as T0 FDRA, the FDRA of type 1 CG PUSCH and/or type 2 CG PUSCH may be interpreted as T1 FDRA as the waveform changes.

When the PUSCH waveform is changed from CP-OFDM to DFT-s-OFDM, the terminal may select some or all of n PRBs allocated to transmit the PUSCH. The terminal may select m PRBs from among n PRBs. m may be a multiple of 2, 3, or 5. m may be less than or equal to n. The PRBs selected by the terminal may not be consecutive. The terminal may select PRBs in an order of a lower index from among the PRBs allocated by the base station.

According to a proposed method, FDRA for type 1 CG PUSCH and/or type 2 CG PUSCH may be indicated for each waveform.

The FDRA may be independently indicated for each waveform of the PUSCH. The FDRA applied for CP-OFDM and the FDRA applied for DFT-s-OFDM may have different types.

According to a proposed method, a MAC layer of the terminal that delivers a transport block (TB) to a PHY layer may select a CG PUSCH according to the waveform.

The base station may configure and/or activate two or more CG PUSCHs. When the CG PUSCHs overlap in the time domain, the terminal may select one CG PUSCH among the CG PUSCHs and transmit the selected CG PUSCH. When priority indexes of the CG PUSCHs are different from each other, the terminal may select a CG PUSCH having a high priority index and may drop a CG PUSCH having a low priority index. When the CG PUSCHs have the same priority index or if priority indexes for the CG PUSCHs are not configured, the base station may configure or indicate CG PUSCHs that do not overlap in the time domain to the terminal.

When different waveforms are applied to CG PUSCHs, the base station may configure and/or activate CG PUSCHs overlapping in the time domain.

Figure 17:
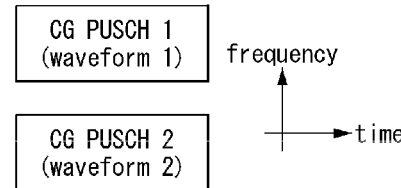
FIG. 17 is a conceptual diagram illustrating a first exemplary embodiment of a method of configuring CG PUSCHs.

FIG. 17 is a conceptual diagram illustrating a first exemplary embodiment of a method of configuring CG PUSCHs.

Referring to FIG. 17, a base station may configure two CG PUSCHs. The two CG PUSCHs may overlap in the time domain. Different waveforms may be applied to the two CG PUSCHs. Priority indexes of the two CG PUSCHs may not be indicated to the terminal. Alternatively, the two CG PUSCHs may have the same priority index. It may be assumed that the terminal does not simultaneously transmit a CG PUSCH 1 and a CG PUSCH 2.

According to a proposed method, the terminal may select one CG PUSCH among the CG PUSCHs and transmit a TB on the selected CG PUSCH. A procedure for selecting the CG PUSCH may be performed as follows. In the CG PUSCH selection procedure, the MAC layer of the terminal may select the CG PUSCH according to the waveform. For example, the MAC layer of the terminal may select the CG PUSCH 1 when a waveform 1 is applied, and may select the CG PUSCH 2 when a waveform 2 is applied. The CG PUSCH not selected by the MAC layer of the terminal may be dropped. Since the terminal and the base station know the waveform of the CG PUSCH, the base station may know the CG PUSCH selected by the terminal.

3.2.1 Exemplary Embodiment of Waveform Change Based on DCI

When the change of the waveform is indicated by DCI, the waveform of the type 1 CG PUSCH may not be changed. The terminal may assume that scheduling of the PUSCH is sufficiently possible only with information indicated by RRC signaling in order to transmit the type 1 CG PUSCH. When the change of the waveform is indicated by activating DCI, the waveform of the type 2 CG PUSCH may be changed.

In order to reflect changed resource allocation for a CG PUSCH interpreted by the same identifier, the CG PUSCH may be released by releasing DCI and then activated again by activating DCI.

According to a proposed method, when activating DCIs are received, the terminal may transmit a type 2 CG PUSCH by reflecting information on the most recently received activating DCI among the activating DCIs. The terminal may not receive releasing DCI between reception times of the activating DCIs.

3.2.2 Exemplary Embodiment of Waveform Change Based on MAC CE

When the change of the waveform is indicated by a MAC CE, the waveform of the CG PUSCH may be changed. The terminal may determine that the waveform is changed based on a specific slot after a reception time of the MAC CE.

According to a proposed method, the changed waveform may be reflected in a type 1 CG PUSCH and/or type 2 CG PUSCH configured and/or activated in the UL BWP.

According to another proposed method, the base station may indicate change of waveform(s) for some of the configured CG PUSCHs. In this case, a MAC CE indicating the change of the waveform(s) may include identifier(s) of the CG PUSCH(s) or index(es) meaning identifier(s) of the CG PUSCH(s). To support this operation, the base station may inform the terminal of correspondence information between the identifier(s) and index(es) of the CG PUSCH(s). The correspondence relationship information may be indicated to the terminal through signaling.

In another exemplary embodiment, the terminal may transmit CG PUSCH(s) having the same waveform as the waveform indicated by the MAC CE of the base station among the CG PUSCHs configured by the base station. When using the waveform 1 is indicated from a slot n, the terminal may transmit CG PUSCH(s) using the waveform 1 among the CG PUSCHs configured and/or activated by the base station. The terminal may not transmit a CG PUSCH using a waveform other than the waveform 1.

For example, a CG PUSCH 1 to which the waveform 1 is applied and a CG PUSCH 2 to which the waveform 2 is applied may be configured to the terminal. The terminal may transmit the CG PUSCH 1 by using the waveform 1 from the slot n, and may consider the CG PUSCH 2 using the waveform 2 as released. The above operation may be applied to both a type 1 CG PUSCH and a type 2 CG PUSCH. Alternatively, the above operation may be applied to a type 1 CG PUSCH or a type 2 CG PUSCH.

The CG PUSCH 1 to which the waveform 1 is applied and the CG PUSCH 2 to which the waveform 2 is applied may be configured and activated in the terminal. The terminal may transmit the CG PUSCH 1 using the waveform 1 until a slot n−1, and may transmit the CG PUSCH 2 using the waveform 2 from the slot n. The CG PUSCH 1 may be transmitted until the slot n−1, but the terminal may consider that the CG PUSCH 1 is released from the slot n. The terminal may consider that the CG PUSCH 2 is released up to the slot n−1, and may consider that the CG PUSCH 2 can be transmitted from the slot n. The above operation may be applied to both a type 1 CG PUSCH and a type 2 CG PUSCH. Alternatively, the above operation may be applied to a type 1 CG PUSCH or a type 2 CG PUSCH.

An SCS according to the MAC CE may be interpreted as a numerology of one serving cell or a reference numerology of a PCell. The terminal may derive an accurate time at which the change in the waveform is reflected by comparing the SCS according to the MAC CE with an SCS of the active UL BWP, default UL BWP, or initial UL BWP.

3.3 Exemplary Embodiment of Changing Waveform Using MAC CE

Figure 18:
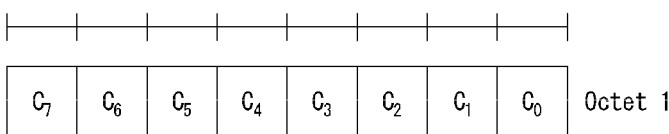
FIG. 18 is a conceptual diagram illustrating a first exemplary embodiment of a MAC CE indicating a waveform.

FIG. 18 is a conceptual diagram illustrating a first exemplary embodiment of a MAC CE indicating a waveform.

Referring to FIG. 18, a MAC CE may include one or more octets. Each bit within the one or more octets may correspond to each serving cell. A first value of a bit may correspond to CP-OFDM, and a second value of the bit may correspond to DFT-s-OFDM. The terminal may apply a waveform indicated by the MAC CE in an active UL BWP. The waveform indicated by the MAC CE may be applied to a PUSCH and/or CG PUSCH scheduled by DCI.

According a proposed method, an arrangement order of bits in the MAC CE may correspond to an index order of serving cells configured in the terminal.

When some serving cells are not configured in the terminal, the terminal may ignore bits corresponding to the some serving cells among the bits of MAC CE. When some serving cells are inactivated, the terminal may ignore bits corresponding to the some serving cells among the bits of MAC CE. If PUSCH transmission is not configured in some serving cells, the terminal may ignore bits corresponding to the some serving cells among the bis of MAC CE.

The terminal may reflect the value of the MAC CE (e.g., waveform indicated by the MAC CE) after a preset time from a reception time of the MAC CE. The terminal may derive a slot n after a slot offset from a slot in which a HARQ-ACK for the MAC CE is transmitted. In the slot n and/or slots prior to the slot n, the terminal may transmit a PUSCH without reflecting the waveform indicated by the MAC CE. In a slot n+1 and/or slots subsequent to the slot n+1, the terminal may transmit a PUSCH by reflecting the waveform indicated by the MAC CE.

In a proposed method, an SCS according to the MAC CE may be interpreted as a numerology of one serving cell or a reference numerology of a PCell. The terminal may derive an accurate time at which the change in the waveform is reflected by comparing the SCS according to the MAC CE with an SCS of the active UL BWP, default UL BWP, or initial UL BWP.

If the UL BWP is switched or the serving cell is deactivated after the waveform indicated by the MAC CE is applied, the MAC CE indicated to the terminal may be invalid. In this case, the terminal may apply a waveform derived from the active UL BWP.

In the serving cell, a supplementary uplink (SUL) carrier may be configured in the terminal. A change in a waveform of the SUL carrier may be unnecessary. In a proposed method, even when the SUL carrier is configured in the serving cell, a bit included in the MAC CE may indicate a change in a waveform of a normal uplink (NUL) carrier.

In another proposed method, each waveform of the SUL carrier and the NUL carrier may be independently changed. To support this operation, 2 bits included in the MAC CE may be used to change the waveform for the serving cell. In other words, one bit included in the MAC CE may indicate the waveform of the SUL carrier, and another bit included in the MAC CE may indicate the waveform of the NUL carrier.

3.4 Exemplary Embodiment of Changing Waveform Using Scheduling Information

A waveform (e.g., change of the waveform) may be implicitly derived from resource allocation information of a PUSCH. A condition for changing the waveform (i.e., waveform change condition) may be defined in technical specifications. Alternatively, the base station may signal information on the waveform change condition to the terminal.

For example, the base station may signal information on a boundary value of an MCS (e.g., MCS index) and/or a boundary value of a scheduled bandwidth (or, the number of PRBs) to the terminal. The terminal may identify the boundary value of the MCS (e.g., MCS index) and/or the boundary value of the scheduled bandwidth (or, the number of PRBs) indicated by the signaling of the base station. A case in which scheduling is performed by an MCS index lower than the boundary value of the MCS index, or a case in which PRBs less than the boundary value of the number of PRBs are scheduled may be considered. If the number of PRBs is limited to a multiple of 2, 3, or 5, DFT-s-OFDM may be utilized.

For another example, when the maximum rank configured to the terminal is by signaling 1, an indication of change of the waveform may be delivered.

The terminal may consider that a specific waveform is applied to a PUSCH scheduled to satisfy the waveform change condition. The terminal may apply a waveform indicated in the active UL BWP to a PUSCH scheduled not to satisfy the waveform change condition.

For another example, the terminal may apply a specific waveform (e.g., DFT-s-OFDM) to a PUSCH scheduled to satisfy the waveform change condition, and apply another waveform (e.g., CP-OFDM) to a PUSCH scheduled not to satisfy the waveform change condition.

In scheduling DCI, configuration of required information fields for each waveform may be different. In other words, a required field width for each waveform may be different. The field width may mean a bit width of an information field. The DCI may be configured based on the largest field width among field widths for waveforms. When a waveform is determined, the terminal may ignore unnecessary information fields within the DCI and obtain necessary information based on MSB(s) and/or LSB(s) of the necessary information field within the DCI.

Figure 19A:
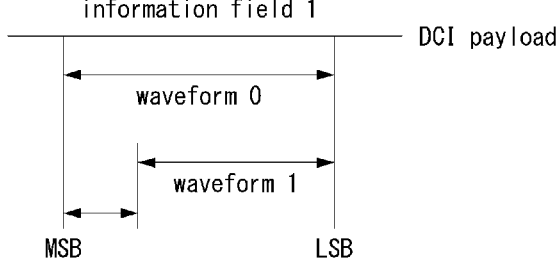
FIG. 19A is a conceptual diagram illustrating a first exemplary embodiment of a method of configuring a bit width of an information field of DCI indicating a waveform change.
Figure 19B:
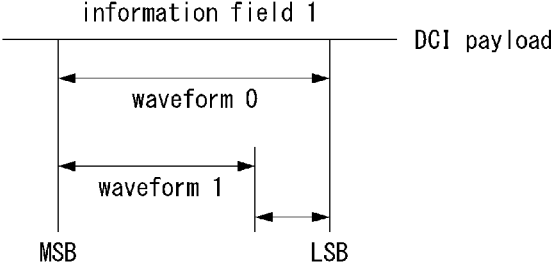
FIG. 19B is a conceptual diagram illustrating a second exemplary embodiment of a method of configuring a bit width of an information field of DCI indicating a waveform change.

FIG. 19A is a conceptual diagram illustrating a first exemplary embodiment of a method of configuring a bit width of an information field of DCI indicating a waveform change, and FIG. 19B is a conceptual diagram illustrating a second exemplary embodiment of a method of configuring a bit width of an information field of DCI indicating a waveform change.

Referring to FIGS. 19A and 19B, the size of the information field of DCI may be adjusted according to a waveform. In the exemplary embodiment of FIG. 19A, a truncation operation or a padding operation on the MSB(s) of the information field may be performed. Known bit(s) may be concatenated to the MSB of the information field. In the exemplary embodiment of FIG. 19B, a truncation operation or a padding operation on the LSB(s) of the information field may be performed. Known bit(s) may be concatenated to the LSB of the information field.

3.4.1 Method of Using a Specific Information Field

A specific information field of scheduling DCI may be used to indicate a PUSCH waveform. The information field having a first value may indicate PUSCH transmission to which CP-OFDM is applied. The information field having a second value may indicate PUSCH transmission to which DFT-s-OFDM is applied. The above operation may be interpreted equivalently to an operation for a case where an information field indicating activation or deactivation of transform precoding is introduced. The above operation may mean that the size of the scheduling DCI increases. UL-DCI with an increased size may be utilized in a DCI size alignment procedure. In a proposed method, the size of the information field may be maintained to be the same regardless of the waveform. Known bit(s) may be appended to the MSB or LSB of the information field, and the information fields may be interpreted with the same size.

The information field indicating the waveform may be utilized in a non-fallback DCI format. For example, the non-fallback DCI format may be DCI format 0_1 and/or format 0_2. The size of UL-DCI using CP-OFDM and the size of UL-DCI using DFT-s-OFDM may be different from each other, and among the UL-DCIs, UL-DCI having a larger size may be utilized. Since the information field indicating the waveform is added to the UL-DCI, the size of the UL-DCI may increase by 1 bit.

In another proposed method, the size of the information field of the scheduling DCI may vary according to the waveform.

When use of DFT-s-OFDM is indicated, the size of one information field in scheduling information based on DFT-s-OFDM may be reduced. When use of CP-OFDM is indicated, the size of one information field in scheduling information based on CP-OFDM may be reduced.

According to a proposed method, the size of the information field indicating scheduling information within the DCI may be interpreted differently according to the waveform.

When DFT-s-OFDM is indicated, the terminal may consider the size of the MCS index to be 4 bits. When CP-OFDM is indicated, the terminal may expect that the size of a transmit precoding matrix indicator (TPMI) and an index indicating the number of layers decreases by 1 bit.

A TPMI codebook may be determined according to antenna port(s), maximum rank, and whether or not DFT precoding is applied. Depending on capability of the terminal, some TPMIs may be selected from scheduling DCI. Accordingly, the size of the information field may be different. Tables 4 to 6 may indicate the number of TPMIs according to the capability of the terminal, the maximum rank configured to the terminal, and the number of DM-RS ports.

Fullpower, fullpowerMode1, or fullpowerMode2 may be indicated to the terminal as capability information so that the maximum value of transmit power is reflected in a scheduler of the base station according to a structure of the terminal. Alternatively, nothing may be indicated to the terminal. In order to indicate a combination of DM-RS antenna ports capable of maintaining phase coherence in the TPMI according to the structure of the terminal structure, one of fully-AndPartialAndNonCoherent, PartialAndNonCoherent, or NonCoherent may be indicated to the terminal as capability information.

Tables 4 and 5 may represent the number of bits of DCI scheduling a PUSCH to which CP-OFDM is applied. Table 6 may represent the number of bits of DCI for scheduling a PUSCH to which DFT-s-OFDM is applied.

TABLE 4

| | | Number of indexes (bits) | | |
|---|---|---|---|---|
| DM-RS | maxRank | fullyAndPartialAndNonCoherent | PartialAndNonCoherent | NonCoherent |
| Two ports | 1 (null, fullpower, fullpowerMode2) | 6 indexes (three bits) | (Not applicable) | 2 indexes (one bit) |
| | 1 (fullpowerMode1) | (Not applicable) | (Not applicable) | 3 indexes (two bits) |
| | 2 (null, fullpower, fullpowerMode2) | 9 indexes (four bits) | (Not applicable) | 3 indexes (two bits) |
| | 2 (fullpowerMode1) | (Not applicable) | (Not applicable) | 4 indexes (two bits) |

TABLE 5

| | | Number of indexes (bits) | | |
|---|---|---|---|---|
| DM-RS | maxRank | fullyAndPartialAndNonCoherent | PartialAndNonCoherent | NonCoherent |
| Four ports | 1 (null, fullpower, fullpowerMode2) | 28 indexes (five bits) | 12 indexes (four bits) | 4 indexes (two bits) |
| | 1 (fullpowerMode1) | (Not applicable) | 16 indexes (four bits) | 5 indexes (three bits) |
| | 2, 3, 4 (null, fullpower, fullpowerMode2) | 62 indexes (six bits) | 32 indexes (five bits) | 12 indexes (four bits) |
| | 2 (fullpowerMode1) | (Not applicable) | 30 indexes (five bits) | 12 indexes (four bits) |
| | 3, 4 (fullpowerMode1) | (Not applicable) | 36 indexes (six bits) | 15 indexes (four bits) |

TABLE 6

| | | Number of indexes (bits) | | |
|---|---|---|---|---|
| DM-RS | maxRank | fullyAndPartialAndNonCoherent | PartialAndNonCoherent | NonCoherent |
| Two ports | 1 (null, fullpower, fullpowerMode2) | 6 indexes (three bits) | (Not applicable) | 2 indexes (one bit) |
| | 1 (fullpowerMode1) | (Not applicable) | (Not applicable) | 3 indexes (two bits) |
| Four ports | 1 (null, fullpower, fullpowerMode2) | 28 indexes (five bits) | 12 indexes (four bits) | 4 indexes (two bits) |
| | 1 (fullpowerMode1) | (Not applicable) | 16 indexes (four bits) | 5 indexes (three bits) |

Considering a case where the same capability and power mode are indicated to the terminal, the numbers of bits of information fields according to waveforms in Table 7 and Table 8 may be compared. When DFT-s-OFDM is used, two or more PUSCH layers may not be transmitted. Accordingly, when the maximum rank is 2, 3, or 4, the bit width may not be derived.

TABLE 7

| DM-RS | maxRank | Number of indexes (bits) for CP-OFDM, Number of indexes (bits) for DFT-s-OFDM | | |
|---|---|---|---|---|
| | | fullyAndPartialAndNonCoherent | PartialAndNonCoherent | NonCoherent |
| Two ports | 1 (null, fullpower, fullpowerMode2) | 6 indexes (three bits), 6 indexes (three bits) | (Not applicable), (Not applicable) | 2 indexes (one bit), 2 indexes (one bit) |
| | 1 (fullpowerMode1) | (Not applicable), (Not applicable) | (Not applicable), (Not applicable) | 3 indexes (two bits), 3 indexes (two bits) |
| | 2 (null, fullpower, fullpowerMode2) | 9 indexes (four bits), (Not applicable) | (Not applicable), (Not applicable) | 3 indexes (two bits), (Not applicable) |
| | 2 (fullpowerMode1) | (Not applicable), (Not applicable) | (Not applicable), (Not applicable) | 4 indexes (two bits), (Not applicable) |

TABLE 8

| DM-RS | maxRank | Number of indexes (bits) for CP-OFDM, Number of indexes (bits) for DFT-s-OFDM | | |
|---|---|---|---|---|
| | | fullyAndPartialAndNonCoherent | PartialAndNonCoherent | NonCoherent |
| Four ports | 1 (null, fullpower, fullpowerMode2) | 28 indexes (five bits), 28 indexes (five bits) | 12 indexes (four bits), 12 indexes (four bits) | 4 indexes (two bits), 4 indexes (two bits) |
| | 1 (fullpowerMode1) | (Not applicable), (Not applicable) | 16 indexes (four bits), 16 indexes (four bits) | 5 indexes (three bits), 5 indexes (three bits) |
| | 2, 3, 4 (null, fullpower, fullpowerMode2) | 62 indexes (six bits), (Not applicable) | 32 indexes (five bits), (Not applicable) | 12 indexes (four bits), (Not applicable) |
| | 2 (fullpowerMode1) | (Not applicable), (Not applicable) | 30 indexes (five bits), (Not applicable) | 12 indexes (four bits), (Not applicable) |
| | 3, 4 (fullpowerMode1) | (Not applicable), (Not applicable) | 36 indexes (six bits), (Not applicable) | 15 indexes (four bits), (Not applicable) |

When information on DM-RS mapping indicated to the terminal is additionally considered, information on the number of code division multiplexing (CDM) groups and the number of DM-RS ports may be obtained based on Table 9. When a transform precoder is activated, DFT-s-OFDM may be applied. When the transform precoder is deactivated, CP-OFDM may be applied.

When a waveform is indicated by scheduling DCI, information required for DM-RS mapping may be derived differently in DFT-s-OFDM and CP-OFDM. Accordingly, the length of an information field (e.g., information field indicating information necessary for DM-RS mapping) in the scheduling DCI may be different. For example, when CP-OFDM is used, 3, 4, or 5 bits may be required to indicate information necessary for DM-RS mapping. When DFT-s-OFDM is used, 2 or 4 bits may be required to indicate information necessary for DM-RS mapping. The terminal may interpret the information field of the scheduling DCI based on an information field composed of more bits.

TABLE 9

| Transform precoder | dmrs-Type | maxLength | maxRank | CDM groups and DM-RS ports |
|---|---|---|---|---|
| Activated (enabled) | 1 | 1 | Not applicable | 4 indexes (2 bits) |
| | | 2 | | 12 indexes (4 bits) |

TABLE 9-continued

| Transform precoder | dmrs-Type | maxLength | maxRank | CDM groups and DM-RS ports |
|---|---|---|---|---|
| Deactivated (disabled) | 1 | 1 | 1 | 6 indexes (3 bits) |
| | | | 2 | 4 indexes (3 bits) |
| | | | 3 | 1 index (3 bits) |
| | | | 4 | 1 index (3 bits) |
| | | 2 | 1 | 14 indexes (4 bits) |
| | | | 2 | 10 indexes (4 bits) |
| | | | 3 | 3 indexes (4 bits) |
| | | | 4 | 3 indexes (4 bits) |
| | 2 | 1 | 1 | 12 indexes (4 bits) |
| | | | 2 | 7 indexes (4 bits) |
| | | | 3 | 3 indexes (4 bits) |
| | | | 4 | 2 indexes (4 bits) |
| | | 2 | 1 | 28 indexes (5 bits) |
| | | | 2 | 19 indexes (5 bits) |
| | | | 3 | 6 indexes (5 bits) |
| | | | 4 | 5 indexes (5 bits) |

In a proposed method, according to a value of the information field indicating the waveform in the scheduling DCI, the size of another information field may be interpreted as being reduced by 1 bit. In the case of changing from DFT-s-OFDM to CP-OFDM and in the case of changing from CP-OFDM to DFT-s-OFDM, the sizes of other information fields may be reduced. In scheduling DCI for a first waveform, the size of a first information field may decrease, but in scheduling DCI for a second waveform, the size of the first information field may not decrease.

For example, when DCI indicates CP-OFDM, the size of the MCS field (or MCS-related information field) of the DCI may be interpreted as 4 bits. When DCI indicates DFT-s-OFDM, the size of the MCS field of the DCI may be interpreted as 5 bits.

When CP-OFDM is used, the terminal may transmit a PUSCH using a plurality of layers (e.g., a plurality of ranks). When it is determined that the terminal is located in a center of coverage, the information field indicating the waveform in the scheduling DCI may not be configured so that a high MCS index is scheduled.

When it is determined that the terminal moves to an edge of coverage, the base station may generate scheduling DCI including the information field indicating the waveform. It may be preferrable to change the waveform using the information field of the scheduling DCI when low MCS index(es) are continuously scheduled or when MU-MIMO is utilized.

Since a large number of layers can be considered for PUSCH transmission based on CP-OFDM, the length of the TPMI field (or TPMI-related information field) may be long. In order to match the lengths of the information fields included in the scheduling DCI, when PUSCH transmission based on DFT-s-OFDM is scheduled, an MSB or LSB of the TPMI field may be used to indicate a waveform.

The TPMI information and information on DM-RS generation may be configured to be associated with the waveform. According to a proposed method, all or some of information applied to transmission based on CP-OFDM and information applied to transmission based on DFT-s-OFDM may be configured independently.

For full power operations of the terminal, a different value for each waveform (e.g., no configured value, fullpower, fullpowerMode1, or fullpowerMode2) may be indicated to the terminal.

The number of DM-RS symbols and/or DM-RS configuration type may be indicated to the terminal as a different value for each waveform. Information on the DM-RS symbol(s) may vary according to assumption of MU-MIMO scheduled by the base station.

According to a proposed method, in order to reduce the complexity of the terminal, the number of DM-RS symbols and/or the DM-RS configuration type may be the same regardless of the waveform. For example, the number of DM-RS symbols and/or DM-RS configuration type may be configured identically for all waveforms.

3.4.2 Method of Changing an MCS Table

When a PUSCH waveform is indicated as CP-OFDM, one of three MCS tables may be configured to the terminal. The base station may select one of an MCS table supporting low code rates (e.g., MCS table 3), an MCS table supporting normal code rates (e.g., MCS table 1), and an MCS table supporting high modulation orders (e.g., 256 Quadrature Amplitude Modulation (QAM)), and may inform the terminal of information of the selected MCS table through signaling.

When a PUSCH waveform is indicated as DFT-s-OFDM, one of the three MCS tables may be configured to the terminal. The base station may select one of an MCS table supporting low code rates (e.g., MCS table 2), an MCS table supporting normal code rates (e.g., MCS table), and an MCS table supporting high modulation orders (e.g., an MCS table identical to the MCS table supporting 256QAM in CP-OFDM or MCS table 2), and may inform the terminal of information of the selected MCS table through signaling.

In the MCS table supporting low code rates or normal code rates, the maximum modulation order may be 64QAM. In the MCS table supporting high code rates, the maximum modulation order may be 256QAM. A certain MCS table may be used independently of the waveform. For example, an MCS table including 256 QAM may be used regardless of the waveform. One MCS table may be used regardless of the waveform.

Since the waveform has a relationship with the MCS table, the base station may signal information indicating either the waveform or the MCS table. According to a proposed method, the MCS table may be determined according to the type of waveform indicated to the terminal. According to another proposed method, the waveform may be determined according to the type of MCS table indicated to the terminal.

According to another proposed method, the base station may configure a new MCS table to the terminal. The new MCS table may be configured as a combination of the existing MCS tables. For example, a new MCS table composed of MCS indexes corresponding to code rates lower than certain boundary(ies) may be used for DFT-s-OFDM based transmission. A new MCS table composed of MCS indexes corresponding to code rates higher than certain boundary(ies) may be used for CP-OFDM based transmission. Some MCS indexes constituting the MCS table corresponding to DFT-s-OFDM in the case of supporting modulation orders lower than 64QAM (e.g., Quadrature Phase Shift Keying (QPSK), 16QAM, 64QAM) may be distinguished from some MCS indexes constituting the MCS table corresponding to CP-OFDM in the case of supporting modulation orders lower than 64QAM.

According to a proposed method, the terminal may receive information for changing the MCS table and information on the boundary(ies) serving as reference index(es) of MCS indexes from the base station. The information may be included in DCI and/or MAC CE transmitted by the base station.

For another example, the MCS table may not change according to the waveform. When scheduling DCI indicating a waveform change is used, some MCS indexes may be used. A scenario in which a waveform may be changed may be a case where the terminal is not located in a center or edge of coverage but a quality of the coverage is changed. In this case, high MCS indexes (e.g., a high code rate and/or a high modulation order) may be unnecessary for PUSCH transmission.

According to a proposed method, the size of an information field indicating an MCS index may be reduced. For example, some bit(s) of the information field may be used to indicate the MCS index, and the remaining bit(s) of the information field may be used to indicate the waveform.

The MCS table may not be replaced. In other words, the MCS table may be maintained, and some MCS indexes may be used within the MCS table. For example, 16 MCS indexes or less may be used instead of 32 MCS indexes. Tables 10 and 11 may represent one MCS table among MCS tables. One MCS table may include 32 MCS indexes, and the size of an information field (hereinafter referred to as 'MCS field') indicating an MCS index in DCI may be 5 bits.

In a proposed method, MSB(s) of the MCS field may be ignored, and least significant 4 bits of the MCS field may be used. Alternatively, LSB(s) of the MCS field may be ignored and the most significant 4 bits of the MCS field may be used. According to the above method, MCS indexes 0 to 15 in Tables 10 and 11 may be effectively used, and MCS indexes 16 to 31 may not be used. The unused MCS indexes may have high spectral efficiency.

The MCS index(es) with high spectral efficiency may be applied to fixed terminals and/or terminals with low mobility. Since a scenario requiring waveform indication (e.g., waveform change) assumes that mobility of the terminal is supported, system performance may not significantly decrease. When an MCS index indicating change of a modulation order for retransmission cannot be used, only a modulation order among the modulation order and a target code rate, which are indicated by the MCS index included in the DCI, may be reflected. In this case, a plurality of MCS indexes may mean the same modulation order. Referring to Table 10, the number of MCS indexes (e.g., MCS indexes 0 to 9) indicating a modulation order 2 may be 10. When scheduling DCI for retransmission is received, if the MCS indexes are interpreted as 0 to 9, the terminal may consider that the base station indicates the modulation order 2 to the terminal. When the scheduling DCI for retransmission indicates the same HPN as that for the initial transmission and a new data indicator (NDI) included in the scheduling DCI for retransmission is not toggled, it may be interpreted that retransmission is indicated. The method may be applied to other modulation orders and/or other MCS tables.

TABLE 10

| MCS index $I_{MCS}$ | Modulation order $Q_m$ | Target code rate R x [1024] | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |

TABLE 11

| MCS index $I_{MCS}$ | Modulation order $Q_m$ | Target code rate R x [1024] | Spectral efficiency |
|---|---|---|---|
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |

TABLE 11-continued

| MCS index $I_{MCS}$ | Modulation order $Q_m$ | Target code rate R x [1024] | Spectral efficiency |
|---|---|---|---|
| 27 | 6 | 910 | 5.3320 |
| 28 | 6 | 948 | 5.5547 |
| 29 | 2 | reserved | |
| 30 | 4 | reserved | |
| 31 | 6 | reserved | |

3.4.3 Waveform Change Indication Method in Cross-Carrier Scheduling and/or BWP Switching Scheduling DCI may include information field(s) for supporting cross-carrier scheduling and/or BWP switching. In this case, a carrier indication field (CIF) of the scheduling DCI may indicate an index of a serving cell. A BWP field (or BWP-related information field) of the scheduling DCI may indicate a BWP.

When the CIF is configured, bit widths of information fields (e.g., payload) included in the scheduling DCI may be configured based on DCI associated with the largest information field among DCIs of serving cells schedulable in a carrier indicated by the CIF. Alternatively, known bits (e.g., 0 or 1) may be appended to the MSB or LSB of the scheduling DCI, so that the length of the payload (e.g., number of bits in the information fields) of the scheduling DCI among the DCIs of serving cells schedulable in the carrier indicated by the CIF has the largest value.

Configuration information of a DL BWP may include DL signal/channel information. Configuration information of a UL BWP may include UL signal/channel information. BWP switching may mean that information related to a DCI format is changed. The bandwidth of BWP may be expressed as the number of PRBs. The bit width of an information field for allocating the bandwidth of BWP (e.g., PRB assignment field) may be changed. In addition, the bit width of an information field related to MIMO may be changed.

In exemplary embodiments below, a situation in which the BWP is switched from a BWP 1 to a BWP 2 may be considered. The same DCI format may be configured for the BWP 1 and the BWP 2, and information fields in the DCI format of the BWP 1 and the DCI format of BWP 2 may be the same. In the DCI format of the BWP 1 and the DCI format of BWP 2, bit widths of the information field may be different. For example, a waveform (e.g., waveform change) in the BWP 1 may not be dynamically indicated, and a waveform (e.g., waveform change) in the BWP 2 may be dynamically indicated using scheduling DCI.

Since a DL signal/channel and a UL signal/channel are configured for each BWP, UL-DCI 1 in the BWP 1 may not include an information field indicating a waveform, and UL-DCI 2 in the BWP 2 may include an information indicating a waveform. The size of the information field indicating a waveform in the UL-DCI 1 may be 0 bits, and the size of the information field indicating a waveform in the UL-DCI 2 may be 1 bit. Even when the UL-DCI 1 and the UL-DCI 2 have the same DCI format, the UL-DCI 1 and the UL-DCI 2 may require sizes before a size alignment procedure is applied. The difference in sizes between the UL-DCI 1 and the UL-DCI 2 may occur even in the same BWP. Interpretation of information fields according to BWP switching may be interpreted as differences in bit widths of corresponding information fields.

If the size of the UL-DCI increases, the number of information bits of various DCI formats may increase in consideration of a DCI decoding budget of the terminal. It may be preferable to maintain the size of the UL-DCI.

According to a proposed method, in order to schedule a PUSCH in a UL BWP 2 (or BWP 2), based on a combination of the information field indicating a waveform included in the DCI received in the BWP 1 and other information field(s), the size of the information field for the BWP 2 may be interpreted as 1 bit, and the information field having the size of 1 bit may be interpreted as information indicating a waveform.

A specific information field may be interpreted as having a shortened length. If the terminal capability supports the interpretation of waveform indication, one or more of a plurality of BWPs may be configured to allow waveform indication. The terminal may decode an information field related to BWP switching, and based on a decoding result, the terminal may determine that BWP switching occurs. In this case, the interpretation of the specific information field may be changed. One bit in the specific information field may indicate a waveform. The remaining bits in the specific information field may be used as information applied to the BWP 2. The terminal may add known bit(s) to the remaining bits, and may interpret 'the remaining bits+the known bit(s)'. Alternatively, the terminal may truncate some of the remaining bits and interpret the truncated remaining bits.

An information field indicating an MCS index may be interpreted as having a shortened length. An information field indicating a time domain resource allocation (TDRA) may be interpreted as having a shortened length. An information field indicating a TPMI may be interpreted as having a shortened length.

According to the above method, the degree of freedom of scheduling may be limited. Therefore, UL throughput may decrease in the BWP switching procedure. To solve this problem, it may be preferable not to reduce the size of the information field of the scheduling DCI. In the BWP 1, a waveform may not be dynamically indicated, and in the BWP 2, a waveform may be dynamically indicated.

According to another proposed method, self-carrier scheduling or cross-carrier scheduling may be performed. In the BWP 1 where waveform change is not supported, scheduling UL-DCI may not include an information field indicating a waveform, and a waveform in the BWP 1 may follow a waveform configured in the BWP 2 (e.g., UL BWP 2).

According to a proposed method, DCI belonging to a BWP i (e.g., UL BWP i) may be used to change a waveform configured in the BWP i (e.g., UL BWP i). i may be 1 or 2. To perform BWP switching from the BWP 1 to the BWP 2 and waveform change together, the DCI may additionally include an information field. This operation may differ from the method applied in the BWP switching (e.g., the method of deriving the waveform indication from the scheduling DCI).

When waveform indication is configured for each serving cell (or carrier) or when waveform indication is configured for each terminal, the scheduling DCI may include an unnecessary information field. The number of reserved bits in the scheduling DCI may unnecessarily increase. In a BWP (or serving cell) in which waveform indication is not configured, a PUSCH may be generated by applying a waveform according to configuration of the BWP. In a proposed method, an information field indicating a waveform may be configured for each BWP (or serving cell).

3.4.4 Exemplary Embodiments for Msg3

A UL grant of an RAR may include resource allocation information for initiation transmission of a Msg3. Resource allocation information for retransmission of the Msg3 may be included in a DCI format 0_0

Depending on a result of resource allocation by the RAR (e.g., UL grant), an event may be considered to occur. The terminal may obtain information of a waveform from system information (e.g., SIB1), and may determine information of a waveform again based on the UL grant of RAR. If contention resolution is not completed in a RACH procedure (e.g., when the terminal transmits the Msg3), the base station may not know whether the terminal is a legacy terminal (e.g., terminal that does not support waveform change) or a new terminal (e.g., terminal supports waveform change). Even when occurrence of a specific event is indicated by the UL grant of RAR, the base station may not know the waveform used by the terminal (e.g., waveform indicated by SIB1 or waveform indicated by the UL grant of RAR).

The base station may determine whether the terminal supports waveform change based on the Msg1 (e.g., PRACH) received from the terminal. An RO for the terminal supporting waveform change may be configured in the terminal. A PRACH preamble set for the terminal supporting waveform change may be configured in the terminal. For example, the base station may determine whether the terminal supports waveform change for the Msg3 (e.g., PUSCH) based on the separate PRACH preamble set in a separate RO or shared RO. When a PRACH preamble is received in an RO configured to support waveform change and/or when a PRACH preamble received from the terminal belongs to a PRACH preamble set configured to support waveform change, the base station may determine that the terminal supports waveform change. The base station may inform the terminal supporting the waveform change for the Msg3 of the event (e.g., occurrence of the event) using the RAR (e.g., UL grant) or DCI format 0_0. The event may mean a waveform change indication.

According to a proposed method, the waveform change for initial transmission of Msg3 may not be supported, and the waveform change for retransmission of Msg3 may be supported.

When the UL grant of RAR includes resource allocation information of the Msg3, the transform precoder may operate based on information indicated by system information (e.g., SIB1). When the terminal is located at an edge of the coverage, the base station may indicate repeated Msg3 transmission to the terminal. In this case, the terminal may repeatedly transmit the Msg3 without changing the waveform.

When retransmission of the Msg3 is performed based on a DCI format 0_0, an event may be regarded as occurring according to a result of the resource allocation. In this case, the terminal may transmit the Msg3 to which CP-OFDM or DFT-s-OFDM is applied.

As another proposed method, waveform change may be supported for initial transmission of the Msg3.

The terminal may transmit a Msg1 including information indicating that the terminal supports waveform change to the base station. The base station may receive the Msg1 from the terminal, and based on the Msg1, the terminal may identify that the terminal supports waveform change. The base station may transmit an RAR (e.g., UL grant) including information indicating a waveform to the terminal. The terminal may receive the RAR from the base station and identify the waveform based on the information included in the RAR. For example, system information (e.g., SIB1) may indicate a waveform for the Msg3 as CP-OFDM, and the RAR may indicate a waveform for the Msg3 as DFT-s-OFDM. In other words, the waveform for the Msg3 may be changed from CP-OFDM to DFT-s-OFDM. For another example, system information (e.g., SIB1) may indicate a waveform for the Msg3 as DFT-s-OFDM, and the RAR may indicate a waveform for the Msg3 as CP-OFDM. In other words, the waveform for the Msg3 may be changed from DFT-s-OFDM to CP-OFDM.

In a Msg3 retransmission procedure, the terminal may determine the waveform of the Msg3 based on scheduling information included in the DCI format 0_0. The purpose of an event in which the waveform change occurs may be improvement of coverage. Therefore, changing the waveform from CP-OFDM to DFT-s-OFDM may be allowed.

According to a proposed method, when system information (e.g., SIB1) indicates the waveform for the Msg3 as CP-OFDM and the RAR indicates the waveform for the Msg3 as DFT-s-OFDM, the waveform for the Msg3 may be changed from CP-OFDM to DFT-s-OFDM. When system information (e.g., SIB1) indicates the waveform for the Msg3 as DFT-s-OFDM and the RAR indicates the waveform for the Msg3 as CP-OFDM, the waveform for Msg3 may not be changed from DFT-s-OFDM to CP-OFDM.

When frequencies for LTE are re-allocated or re-farmed in the NR system or when a separate low frequency band is used in the NR system, the base station may indicate a SUL carrier to the terminal. In this case, the terminal may use the SUL carrier in an initial access phase (e.g., type 1 RACH). The SUL carrier may be located in a lower frequency band than a NUL carrier. When the SUL carrier is used, UL coverage may be improved.

When the base station instructs the terminal to transmit the Msg3 in the SUL carrier, the terminal may not change the waveform for Msg3. According to a proposed method, the terminal may change the waveform for Msg3 in the NUL carrier.

3.5 Waveform Change Method in a Repeated Transmission Procedure

The base station may inform the terminal of the number of PUSCH repetitions by using signaling, and the terminal may identify the number of PUSCH repetitions based on the signaling of the base station. Alternatively, the terminal may derive the number of PUSCH repetitions based on scheduling information (e.g., TDRA) of a PUSCH. In a PUSCH occasion, one or more PUSCHs may be repeatedly transmitted. The terminal may transmit one PUSCH per slot. In other words, one PUSCH repetition may be mapped to one slot. Alternatively, PUSCH repetitions may be transmitted as being concatenated.

Figure 20:
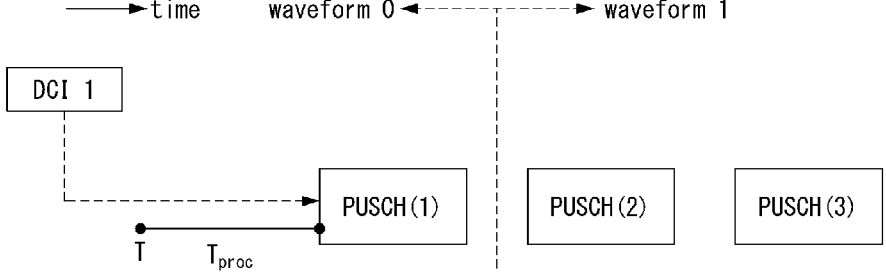
FIG. 20 is a conceptual diagram illustrating a first exemplary embodiment of a method of changing a waveform in a repeated PUSCH transmission procedure.

FIG. 20 is a conceptual diagram illustrating a first exemplary embodiment of a method of changing a waveform in a repeated PUSCH transmission procedure.

Referring to FIG. 20, it may be assumed that a waveform indicated by a MAC CE is not reflected in a slot n, and the waveform indicated by the MAC CE is reflected in a slot n+1. Repetition (e.g., actual repetition) of a PUSCH may be performed in a slot n and a slot m. Each of n and m may be a natural number. The slot n+1 and the slot m may be the same. Alternatively, the slot m may occur after the slot n+1.

According to a proposed method, waveforms of PUSCH repetitions (e.g., actual PUSCH repetitions) in the slot n and the slot m may be different from each other. When a TB is repeatedly transmitted, different redundancy versions (RVs) may be mapped to the PUSCH repetitions (e.g., actual PUSCH repetitions). The base station may perform a soft combining operation for the same TB.

Difference in waveforms for the PUSCH repetitions in the slot n and the slot m may be interpreted as difference between application of DFT precoding and non-application of DFT precoding. According to a proposed method, in transmission of a dynamic grant (DG) PUSCH, resource allocation (e.g., PUSCH DM-RS, FDRA) indicated by scheduling DCI may be maintained as it is. In transmission of a CG PUSCH, resource allocation may be maintained as it is. Alternatively, a CG PUSCH with a different identifier may be transmitted instead.

The base station may instruct the terminal to perform a DM-RS bundling operation through signaling. The terminal may confirm that the DM-RS bundling operation is indicated to be performed based on the signaling of the base station. In this case, the terminal may regard a waveform change indicated by the scheduling DCI as a dynamic event in which phase continuity and power coherence cannot be maintained. The phase continuity and power coherence of the PUSCH may not be maintained in a DFT precoder activation/deactivation procedure.

When the DFT precoder is activated or deactivated, phase continuity and power coherence of the PUSCH may be maintained according to capability of the terminal. In this case, the terminal may not regard the waveform change indicated by the scheduling DCI as a dynamic event.

According to another method, the waveform may not be changed during the repeated PUSCH transmission procedure. Configuration and/or a pattern of a PUSCH DM-RS may vary according to the waveform. Information for changing the PUSCH DM-RS in the slot m may not be provided. The terminal may assume that the same DM-RS is transmitted in all PUSCH repetitions (e.g., all actual PUSCH repetitions). Even when the waveform is changed, a FDRA for the PUSCH may be maintained. In this case, a scheme of mapping VRBs to PRBs may be changed.

3.6 Transmission Power Determination Method

In order to transmit a PUSCH, the terminal may determine a transmission power by scaling the amplitude of the PUSCH based on an equation defined in technical specifications. The terminal may utilize a transmission power control (TPC) command dynamically received from the base station to determine the transmission power.

The base station may indicate to the terminal a TPC command using group common DCI (e.g., DCI format 2_2 or DCI format 2_3) and/or scheduling DCI (e.g., DCI format 0_0, DCI format 0_1, or DCI format 0_2). When the waveform is changed, the terminal may discard accumulated TPC commands. According to a proposed method, the terminal may accumulate TPC commands again from a slot in which the waveform is changed.

Chapter 4 HARQ-ACK Feedback in Sidelink Communication

The coverage may be extended through sidelink communication. In exemplary embodiment, a terminal transmitting data and/or control information may be represented as a source terminal (SUE), and a terminal receiving data and/or control information may be represented as a destination terminal (DUE). In sidelink communication, data may be transmitted in a unicast scheme, groupcast scheme, or broadcast scheme.

The sidelink communication may be performed according to a resource allocation mode 1 or a resource allocation mode 2. When the resource allocation mode 1 is used, the base station may engage in the sidelink communication. When the resource allocation mode 2 is used, the base station may not engage in the sidelink communication. Regardless of the resource allocation mode, the DUE may derive a HARQ-ACK for data. The HARQ-ACK may be derived to ensure quality of data transmission. Depending on the type of traffic, a retransmission operation using HARQ- ACK or a retransmission operation unrelated to HARQ-ACK (e.g., retransmission operation based on ARQ) may be performed. A valid time for data that the SUE wants to transmit may be short. For example, data including only a CSI report may not be retransmitted, and new data including a CSI report may be transmitted.

The SUE may transmit a PSCCH and/or PSSCH. The DUE may receive the PSCCH and/or PSSCH. The DUE may transmit a PSFCH according to sidelink control information (SCI) received from the SUE. Alternatively, the DUE may not transmit a PSFCH. A PSFCH for data transmitted in a broadcast scheme may not be transmitted. In unicast communication, the DUE may derive a HARQ-ACK, which is a decoding result of an SL-SCH, as sidelink feedback control information (SFCI). The SUE may indicate to the DUE enabling or disabling HARQ-ACK feedback. When HARQ-ACK feedback is enabled, the DUE may transmit SFCI to the SUE on a PSFCH.

According to technical specifications, a PSFCH for each PSSCH may be transmitted. When transmission of a plurality of PSFCHs is performed in the same symbol, the DUE may drop transmission of some PSFCHs. For example, the DUE may drop transmission of some PSFCHs due to power constraints. Alternatively, the DUE may drop transmission of some PSFCHs according to priorities of PSSCHs. Alternatively, the DUE may compare priorities of uplink/sidelink according to data priorities (e.g., URLLC or eMBB). Due to half duplex constraints, the DUE may not perform a transmission operation of a PSFCH for a reception operation of a PSCCH and/or PSSCH.

If SFCI (e.g., HARQ-ACK for a PSSCH) is not received from the DUE, the SUE may not be able to use an efficient MCS because it does not know a reception quality of data. The SUE may not be able to identify characteristics of a fading channel through outer loop link adaptation. Accordingly, the SUE may perform link adaptation according to an RSRP based on slow fading. The SUE may receive a CSI report from the DUE. Considering a resource sensing operation and/or resource (re)selection operation, the CSI report may not reflect fast fading at a time when the SUE the CSI report. In other words, a coherence time may be short.

When the resource allocation mode 1 is used, it may be preferrable for the base station to receive SFCI. When the SUE disables SFCI for a PSSCH or when SFCI for a PSSCH is not received from the DUE, the SUE may regard SFCI as ACK, generate uplink control information (UCI) including SFCI (e.g., ACK), and transmit the UCI to the base station. Although SFCI derived by the DUE is NACK, the SUE may report ACK for the PSSCH to the base station. In this case, it may be preferable that the base station does not instruct the SUE to retransmit the PSSCH. It may preferrable to reduce the case where the base station misidentifies the SFCI.

4.1 Sidelink Operation in Unlicensed Band

In an unlicensed band, a base station and/or a terminal may perform a channel access procedure (e.g., channel sensing procedure) for transmission. In the present disclosure, a channel access procedure may mean a channel sensing procedure. When a channel state is determined to be idle, the base station and/or the terminal may perform transmission in the unlicensed band. When the channel state is determined to be busy, the base station and/or the terminal may not be able to perform transmission in the unlicensed band. The channel access procedure in the unlicensed band may be exempted. For example, an SSB and/or PRACH may be transmitted without performing the channel access procedure. In sidelink communication, the SUE may perform a channel access procedure for data transmission. Data transmitted by the SUE may be generated based on a MAC service data unit (SDU). The data transmitted by the SUE may be generated in the MAC layer. The data transmitted by the SUE may be a MAC subheader or a MAC CE.

The SUE may trigger transmission of specific data and/or control information to the DUE. In order to identify a quality of a radio link between the SUE and the DUE, the SUE may transmit an SL-CSI-RS in PSSCH resources. The DUE may receive the SL-CSI-RS from the SUE, generate a CSI report based on a measurement result of the SL-CSI-RS, and transmit the CSI report to the SUE. The CSI report may be included in a MAC CE. A PSSCH transmitted by the DUE may include only the CSI report. Alternatively, the PSSCH may further include a MAC SDU and/or MAC CE as well as the CSI report. The DUE may perform a separate channel access procedure to transmit the PSSCH to the DUE.

In a proposed method, an SCI format transmitted by the SUE may include information on a listen before talk (LBT) type and/or length of a CP extension for PSFCH transmission.

4.2 HARQ Codebook Transmission Method

SFCI may be a HARQ-ACK. A PSFCH resource may be derived from an index associated with a transmission resource of a PSSCH and/or PSCCH. One TB or two TB s may be mapped to the PSSCH. The HARQ-ACK may be derived as 1 bit or 2 bits. The PSFCH may be designed based on a PUCCH format 0. The PUCCH format 0 may consist of one PRB, consecutive PRBs, or non-consecutive PRBs represented by an interlace. The PUCCH format 0 may be generated based on a Zadoff-Chu sequence.

When the DUE transmits a HARQ-ACK having a size of 3 bits or more to the DUE, the PSFCH may be generated based on a different PUCCH format. In a proposed method, the SFCI may be transmitted on a PSFCH derived based on a PUCCH format 2 in an unlicensed band. The SFCI may be transmitted on an enhanced PSFCH, and the PUCCH format may be reused.

As another proposed method, the SFCI transmitted in the unlicensed band may be transmitted using a PSSCH. The SFCI may be a HARQ-ACK for SL-SCH(s). The SFCI may consist of a small number of bits. If a result of the channel access procedure in the unlicensed band is busy, the DUE cannot transmit the SFCI to the SUE. In this case, SFCIs may be accumulated, and there may be many HARQ-ACKs that could not be transmitted to the SUE.

A similar situation may occur in a cellular system. A HARQ-ACK, which is a decoding result for a PDSCH, may be transmitted on a PUCCH. For transmission of the HARQ-ACK, a type 1 HARQ codebook, a type 2 HARQ codebook, or a type 3 HARQ codebook may be used.

To use an enhanced type 2 HARQ codebook, a PDSCH group may be introduced. An information field of DCI may indicate that HARQ-ACK(s) for one or more PDSCH groups are included in the HARQ codebook. Scheduling DCI may indicate that a PDSCH belongs to one PDSCH group. If a channel access procedure fails, the terminal may not be able to transmit the PUCCH. A PDSCH associated with the transmission-failed PUCCH may be regarded as belonging to the PDSCH group. In this case, the terminal may transmit the failed PUCCH (e.g., HARQ-ACK) according to indication of the base station.

When an information field of the DCI has a first value, the terminal may generate a type 2 HARQ codebook including HARQ-ACK(s) for PDSCH(s) belonging to the same PDSCH group as the PDSCH scheduled by the DCI, and transmit the type 2 HARQ codebook to the base station. When the information field of the DCI has a second value, the terminal may generate a type 2 HARQ codebook including HARQ-ACK(s) for PDSCH(s) belonging to the same PDSCH group as the PDSCH scheduled by the DCI as well as HARQ-ACK(s) for PDSCH(s) belonging to another PDSCH group, and transmit the type 2 HARQ codebook to the base station. The type 2 HARQ codebooks for different PDSCH groups may be generated separately, and the type 2 HARQ codebooks may be concatenated.

A type 3 HARQ codebook may include all HARQ-ACKs stored in the terminal regardless of PDSCH reception. The terminal may generate the type 3 HARQ codebook using HARQ-ACK(s) and/or NDI(s) for all carriers configured in the terminal (e.g., all HARQ process(s) configured for the respective carriers). When the terminal fails to transmit a PUCCH due to a failure in the channel access procedure or when the terminal wants to notify the base station of state(s) of its HARQ process(s), the terminal may transmit the HARQ-ACK(s) according to indication of the base station.

When an information field of the DCI has a first value, a PDSCH may not be scheduled for the terminal. In this case, the terminal may generate a type 3 HARQ codebook. When the information field of the DCI has a second value, a PDSCH may be scheduled for the terminal. In this case, the terminal may receive the PDSCH from the base station and generate a type 1 HARQ codebook or a type 2 HARQ codebook for the PDSCH.

The size of the type 3 HARQ codebook may be large. To reduce the size of the type 3 HARQ codebook, an enhanced type 3 HARQ codebook may be used. The terminal uses HARQ-ACK(s) and/or NDI(s) for some carriers (e.g., HARQ process(es) for the respective carriers) according to indication of the base station (e.g., indication according to RRC signaling) to generate an enhanced type 3 HARQ codebook. Accordingly, the base station may adjust the size of the enhanced type 3 HARQ codebook.

When sidelink communication is performed in an unlicensed band, the (enhanced) type 3 HARQ codebook may be usefully utilized. In the present disclosure, an (enhanced) type3 HARQ codebook may mean a type3 HARQ codebook and/or an enhanced type3 HARQ codebook.

Whether the (enhanced) type 3 HARQ codebook is supported by the SUE and/or DUE may be configured by signaling of the base station. Alternatively, it may be pre-configured whether the SUE and/or DUE supports the (enhanced) type 3 HARQ codebook.

A first-stage ($1^{st}$) SCI format transmitted on a PSCCH may include information triggering transmission of an (enhanced) type 3 HARQ codebook. A second-stage ($2^{nd}$) SCI format transmitted on a PSSCH may include information triggering transmission of an (enhanced) type 3 HARQ codebook. The information triggering transmission of an (enhanced) type 3 HARQ codebook may be explicitly indicated by an information field or a combination of information fields included in the SCI format. Alternatively, the information triggering transmission of an (enhanced) type 3 HARQ codebook may be implicitly indicated by an information field or a combination of information fields included in the SCI format.

In a proposed method, transmission of an HARQ codebook (e.g., (enhanced) type 3 HARQ codebook) may be triggered by an SCI format.

When the resource allocation mode 1 is used, a DCI format may trigger transmission of an (enhanced) type 3 HARQ codebook. In this case, transmission of an (enhanced) type 3 HARQ codebook may also be triggered by an SCI format.

Figure 21:
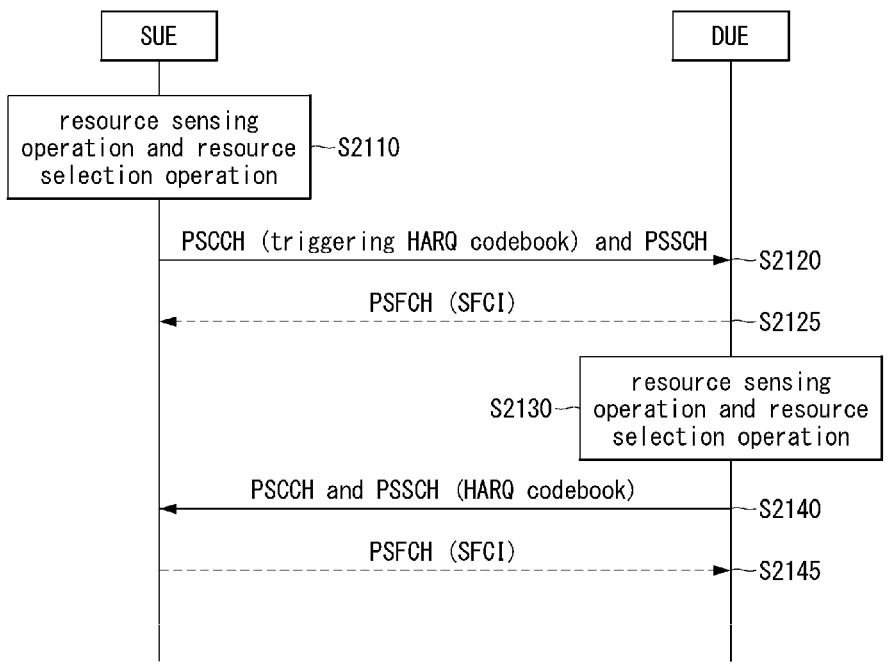
FIG. 21 is a flowchart illustrating a first exemplary embodiment of a HARQ codebook transmission and reception method in sidelink communication.

FIG. 21 is a flowchart illustrating a first exemplary embodiment of a HARQ codebook transmission and reception method in sidelink communication.

Referring to FIG. 21, the SUE may identify transmittable resources by performing a resource sensing operation, and may select resources by performing a resource selection operation on the transmittable resources (S2110). The resource allocation mode 2 may be used. The SUE may transmit PSCCH(s) and PSSCH(s) to the DUE in the selected resources (S2120). According to a proposed method, SCI transmitted on a PSCCH may include information triggering transmission of a HARQ codebook (e.g., (enhanced) type 3 HARQ codebook).

The DUE may receive the PSCCH(s) and the PSSCH(s) from the SUE. The DUE may confirm that transmission of a HARQ codebook is triggered based on the information of the SCI in the PSCCH. The DUE may generate a HARQ codebook for the PSSCH(S) received from the SUE. The DUE may not transmit SFCI to the SUE according to the PSCCH of the SUE (S2125). The DUE may perform a resource sensing operation and a resource selection operation for transmission (S2130). The DUE may transmit a PSCCH and a PSSCH to the SUE in selected resources (S2140). The PSSCH may include a HARQ codebook. The SUE may receive the PSCCH and the PSSCH from the DUE. The SUE may not transmit SFCI to the DUE according to the PSCCH of the DUE (S2145). According to a proposed method, a MAC CE including the HARQ codebook may be transmitted on the PSSCH.

If the HARQ codebook is mapped to the PSSCH, the HARQ codebook may be included in an SL-SCH in the MAC layer. Alternatively, the HARQ codebook may be multiplexed with a second-stage SCI format on the PSSCH.

In a proposed method, SFCI may support a HARQ codebook and may be mapped to a MAC CE. Since the size of the HARQ codebook is determined by signaling, the size of the MAC CE may be fixed. HARQ-ACKs may be arranged in the HARQ codebook according to an order of HARQ process IDs.

The HARQ codebook supported in sidelink communication may include only HARQ-ACK(s). In other words, the HARQ codebook may not include NDI(s). The terminal may not be able to generate a HARQ codebook including NDI(s). Support of a HARQ codebook including NDI(s) in sidelink communication may be indicated by signaling of the base station. In this case, the terminal may generate a HARQ codebook including HARQ-ACK(s) or generate a HARQ codebook including HARQ-ACK(s) and NDI(s). The arrangements of HARQ-ACK(s) and NDI(s) within the HARQ codebook may be different.

The HARQ-ACK(s) may be concatenated with the NDI(s), and the concatenated HARQ-ACK(s) and NDI(s) may be arranged within the HARQ codebook according to an order of HARQ process IDs. Alternatively, a first bit string consisting of only the HARQ-ACK(s) and a second bit string consisting of only the NDI(s) may be concatenated within the HARQ codebook. In the first bit string, the HARQ-ACKs may be arranged according to an order of HARQ process IDs. In the second bit string, the NDIs may be arranged according to an order of HARQ process IDs related to the NDIs.

Scheduling for a certain HARQ process ID may not be performed. In this case, the terminal may regard a HARQ-ACK for the certain HARQ process ID as NACK and an NDI for the certain HARQ process ID as 0. Even when a previous TB is scheduled for a certain HARQ process ID, a new TB is scheduled for the certain HARQ process ID, and a decoding operation for the new TB is being performed, transmission of a type 3 HARQ codebook may be triggered in the terminal. In this case, the terminal may regard the HARQ-ACK and NDI as values for the previous TB, and may not reflect a HARQ-ACK and NDI for the new TB in the type 3 HARQ codebook.

In groupcast-based sidelink communication, two options may exist. In a groupcast option 1 (NACK-only feedback) and a groupcast option 2 (HARQ-ACK/NACK feedback), HARQ codebooks may be generated identically. In broadcast-based sidelink communication, ACK and/or NDI may correspond to a HARQ process ID.

When the HARQ-ACK/NACK feedback (e.g., groupcast option 2) is used, a HARQ-ACK and/or NDI may correspond to each HARQ process, and the terminal may generate a HARQ codebook including HARQ-ACK(s) and/or NDI(s). When the NACK-only feedback (e.g., groupcast option 1) is used, a NACK and/or NDI may correspond to a HARQ process ID for SFCI including the NACK. A HARQ-ACK for another HARQ process ID other than the HARQ process ID may be regarded as ACK, and the ACK and/or NDI may correspond to the another HARQ process ID. The terminal may generate a HARQ codebook including NACK(s) and/or NDI(s) and ACK(s) and/or NDI(s).

According to a cast type (e.g., unicast, group cast, or broadcast) applied to sidelink communication, a PSSCH may be received by one terminal or a plurality of terminals. The DUE may derive HARQ-ACK(s) for SL-SCH(s) received from the SUE, and may transmit a HARQ codebook including the HARQ-ACK(s) to the SUE. The HARQ codebook may be transmitted on a PSSCH.

Referring to Table 12 below, a cast type for transmission from the SUE to the DUE and a cast type for transmission from the DUE to the SUE may be distinguished. In a proposed method, the cast types may be limited. When a certain cast type is not applied, separate identification information may be additionally required. In the present disclosure, transmission of an SL-SCH from the SUE to the DUE may be expressed as a first ($1^{st}$) hop, and transmission of an SL-SCH from the DUE to the SUE may be expressed as a second ($2^{nd}$) hop.

TABLE 12

| | | SUE → DUE (SL data transmission) | |
|---|---|---|---|
| | | unicast | groupcast |
| DUE → SUE (SFCI transmission) | unicast | Case 1 | Case 2 |
| | Groupcast (or broadcast) | Case 3 | Case 4 |

In Case 1, the first hop and the second hop may be unicast transmissions. In Case 2, the first hop may be a groupcast transmission, and the second hop may be a unicast transmission. In Case 2, NACK-only feedback or HARQ-ACK/NACK feedback may be performed according to a groupcast option. In Case 1 and Case 2, since it is clear that a reception target of SFCI is the SUE, a separate identifier for indicating the reception target of the SFCI may be unnecessary.

In Case 3, the first hop may be a unicast transmission, and the second hop may be a groupcast transmission or a broadcast transmission. In Case 4, the first hop and the second hop may not be unicast transmissions. In Case 3 and Case 4, reception target(s) of SFCI may be a plurality of SUES. Accordingly, identification information of the reception target(s) of SFCI (e.g., SUE(s)) may be included in groupcast information or broadcast information.

In a proposed method, when SFCI is included in a PSSCH, transmission of a HARQ codebook may be triggered only in Case 1. As another proposed method, transmission of a HARQ codebooks may be triggered in Case 1, Case 2, and Case 3. As another proposed method, transmission of a HARQ codebook may be triggered in Case 1, Case 2, Case 3, and Case 4.

According to a proposed method, a MAC CE may include SFCI and identification information of the SUE. The identification information of the SUE may be L1 identification information or L2 identification information. In the MAC layer, the L1 identification information may not be used. Even when only the L1 identification information is used for the MAC CE including the SFCI, a reception target of the SFCI may be identifiable. As a proposed method, the MAC CE may additionally include identification information of the DUE. The identification information of the DUE may be L1 identification information or L2 identification information.

Regardless of the cases, in Case 1, Case 2, Case 3, and Case 4, identification information of the SUE may be included in the MAC CE. Alternatively, according to a MAC subheader included in a second hop PSSCH, a case in which the identification information of the SUE is included in MAC CE and a case in which the identification information of the SUE is not included in MAC CE may be distinguished.

The MAC CE may be transmitted on a PSSCH. SFCI for the PSSCH including the MAC CE may occur. The SUE may receive the PSSCH including the MAC CE from the DUE, and may derive SFCI for the PSSCH. The SFCI derived by the SUE may have a cast type (e.g., unicast, groupcast, or broadcast) of the PSSCH (e.g., sidelink (SL) data) previously transmitted by the SUE. The PSSCH transmitted by the DUE to the SUE may include only the MAC CE including the HARQ codebook. Alternatively, the HARQ codebook of the DUE may be multiplexed on the PSSCH together with sidelink (SL) data.

When only the MAC CE including the HARQ codebook is included in the PSSCH (e.g., when the HARQ codebook is not multiplexed with SL data on the PSSCH), the SUE may not transmit the SFCI for the PSSCH to the DUE. The PSSCH may be considered to have the highest priority.

When the HARQ codebook (e.g., MAC CE including the HARQ codebook) is multiplexed with SL data on the PSSCH, the priority of the PSSCH may be determined according to a priority of the SL data. The SUE may receive the PSSCH from the DUE and may transmit SFCI for the PSSCH to the DUE. The operation may be determined by SCI transmitted by the DUE.

4.3 Type 3 HARQ Codebook Transmission Method

When a base station participates in sidelink resource allocation, the base station may transmit an SL-related DCI format to an SUE. The SUE may derive a HARQ-ACK based on SFCI generated in sidelink communication, and may transmit the HARQ-ACK to the base station. If there are many HARQ-ACK bits, the SUE may transmit a HARQ codebook including the HARQ-ACK bits to the base station.

According to technical specifications, the base station may transmit a PDCCH indicating PSSCH resource(s) to the SUE. The SUE may receive the PDCCH from the base station. The SUE may perform sidelink communication with the DUE in the PSSCH resource(s) indicated by the PDCCH. The SUE may derive HARQ-ACK(s) based on SFCI generated in sidelink communication, and may transmit the HARQ-ACK(s) to the base station on a PUCCH or PUSCH. A type 1 HARQ codebook or a type 2 HARQ codebook may be configured or indicated to the SUE by signaling from the base station.

According to a proposed method, the base station may instruct the terminal (e.g., SUE and/or DUE) to use a type 3 HARQ codebook for sidelink communication. Since one terminal performs a plurality of sidelink communications, the type 3 HARQ codebook may be indicated to the one terminal.

Figure 22:
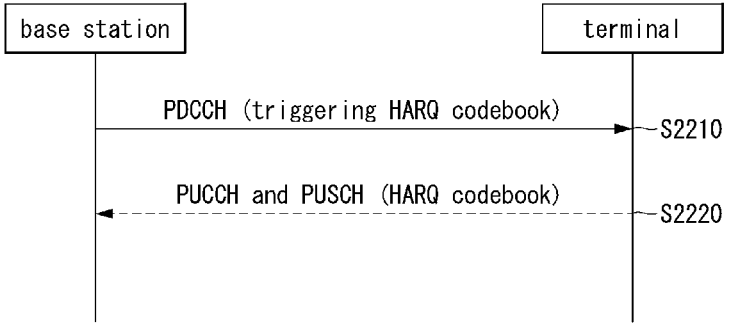
FIG. 22 is a flowchart illustrating a first exemplary embodiment of a method for triggering a type 3 HARQ codebook.

FIG. 22 is a flowchart illustrating a first exemplary embodiment of a method for triggering a type 3 HARQ codebook.

Referring to FIG. 22, a base station may transmit a PDCCH triggering transmission of a type 3 HARQ codebook to a terminal (S2210). The terminal may receive the PDCCH from the base station, and may determine that transmission of a type 3 HARQ codebook is triggered based on the PDCCH. The terminal may generate a type 3 HARQ codebook and transmit the type 3 HARQ codebook on a PUCCH or PUSCH (S2220).

A type 3 HARQ codebook in cellular communication may be distinguished from a type 3 HARQ codebook in sidelink communication. According to a proposed method, a type 3 HARQ codebook in cellular communication and a type 3 HARQ codebook in sidelink communication may be distinguished by different RNTIs. For example, DCI scrambled by a first RNTI may trigger transmission of a type 3 HARQ codebook in cellular communication. DCI scrambled by a second RNTI may trigger transmission of a type 3 HARQ codebook in sidelink communication. Therefore, HARQ-ACK(s) for PDSCH(s) and HARQ-ACK(s) for PSSCH(s) may not be concatenated with each other in a type 3 HARQ codebook generated by the terminal.

According to another proposed method, a type 3 HARQ codebook in cellular communication and a type 3 HARQ codebook in sidelink communication may not be distinguished, and the RNTIs for distinguishing the type 3 HARQ codebooks may not be necessary, and one type 3 HARQ codebook may include HARQ-ACK(s) for PDSCH(s) and HARQ-ACK(s) for PSSCH(s). A DL carrier and a UL carrier may be represented by indexes of different serving cells. Alternatively, a DL carrier and a UL carrier may be represented by an index of the same serving cell.

In a TDD system, a DL BWP and an SL BWP may be TDMed and may have an index of the same serving cell. In a FDD system, a DL carrier and an SL carrier may be FDMed and may have an index of the same serving cell. According to a proposed method, the terminal may generate a first sub-codebook including HARQ-ACK bit(s) for PDSCH(s), and may generate a second sub-codebook including HARQ-ACK bit(s) for PSSCH(s), and may concatenate the first sub-codebook and the second sub-codebook within a type 3 HARQ codebook for the index of the serving cell. The first sub-codebook and the second sub-codebook may be a part of the type 3 HARQ codebook.

Regardless of distinction between SUE and DUE, the method for generating a type 3 HARQ codebook may be equally applied to terminals. According to a proposed method, a type 3 HARQ codebook may include identification information of an SUE, identification information of a DUE, HARQ-ACK(s), and/or NDI(s). The HARQ-ACK(s) and/or NDI(s) may be arranged in the type 3 HARQ codebook according to an order of HARQ process IDs. A bit string for the HARQ-ACK(s) and/or NDI(s) may be generated for each sidelink communication. The terminal may concatenate bit strings in a preconfigured order, generate UCI (e.g., type 3 HARQ codebook) including the concatenated bit strings, and transmit the UCI to the base station.

In groupcast-based sidelink communication, regardless of a groupcast option (e.g., NACK-only feedback or HARQ-ACK/NACK feedback), the terminal may generate a type 3 HARQ codebook. Although the method may be inefficient because of its simplicity, implementation complexity in the terminal may be reduced.

When the HARQ-ACK/NACK feedback (e.g., groupcast option 2) is used, a HARQ-ACK and/or NDI may correspond to each HARQ process, and the terminal may a type 3 HARQ codebook including HARQ-ACK(s) and/or NDI(s). When the NACK-only feedback (e.g., groupcast option 1) is used, a NACK and/or NDI may correspond to a HARQ process ID for SFCI including the NACK. A HARQ-ACK for another HARQ process ID other than the HARQ process ID may be regarded as ACK, and the ACK and/or NDI may correspond to the another HARQ process ID. The terminal may generate a type 3 HARQ codebook including NACK(s) and/or NDI(s) and ACK(s) and/or NDI(s).

In broadcast-based sidelink communication, an ACK and/or NDI may correspond to each HARQ process. In sidelink communication, the terminal may generate a type 3 HARQ codebook including HARQ-ACK(s) for some carriers instead of all carriers. In a proposed method, the terminal may generate a type 3 HARQ codebook including HARQ-ACK(s) for a carrier in which an SL BWP is configured.

In an unlicensed band, one SL BWP may correspond to a plurality of LBT subbands. According to a proposed method, the terminal may generate a type 3 HARQ codebook based on one frequency band (e.g., the first LBT subband having the lowest frequency) included in the SL BWP. In this case, the plurality of LTB subbands may not be considered redundantly.

Chapter 5 UL Signal/Channel Repeated Transmission Method 5.1 Msg4 Repeated Transmission Method A terminal may perform a 4-step RA procedure. The terminal may transmit a Msg1 (e.g., PRACH preamble) to a base station. The base station may receive the Msg1 from the terminal, and may transmit a Msg2 to the terminal on a PDSCH in response to the Msg1. The terminal may receive the Msg2 from the base station. The terminal may transmit a Msg3 to the base station on a PUSCH. The base station may receive the Msg3 from the terminal. In the last step for contention resolution, the base station may transmit a Msg4 to the terminal on a PDSCH. The terminal may receive the Msg4 from the base station, and may transmit a HARQ-ACK for the Msg4 to the base station.

According to technical specifications, repeated transmission may be allowed in some steps of the 4-step RA procedure. However, since repeated transmission of a HARQ-ACK for Msg4 is not allowed, coverage enhancement for the RA procedure may be required. To support a terminal located at a cell edge or to effectively support a scenario in which a base station and/or a terminal is not located on the ground (e.g., non-terrestrial scenario), it may be required to extend the coverage of Msg4.

5.1.1 HARQ-ACK Repetition Factor Indication Method for Msg4

A base station may indicate a PUCCH resource set to a terminal using signaling. The number of PUCCH resource sets may be indicated to the terminal. One PUCCH resource set may include one or more PUCCH resources. The terminal may select a PUCCH resource set according to the number of bits of UCI, and may select one PUCCH resource belonging to the PUCCH resource set. The base station may inform the terminal of a PUCCH resource index using a specific information field of DCI and/or RRC signaling.

In order to extend a UL coverage of the terminal, the base station may inform the terminal of the number of PUCCH repetitions using signaling. In this case, the terminal may repeatedly transmit a PUCCH in a resource indicated by one PUSCH resource index.

Before the terminal establishes an RRC connection with the base station, when the terminal reconfigures an RRC connection with the base station, or when an RRC connection is established between the terminal and the base station, but the terminal does not exchange sufficient information with the base station (e.g., when capability signaling is not received), the terminal may not be able to use a PUCCH resource set. In this case, a separate PUCCH resource set may be provided to the terminal. For example, a PUCCH resource set defined in Table 13 below may be used.

According to Table 13, a PUCCH format 0 or a PUCCH format 1 may be used, a bandwidth may be 1 PRB, and up to 14 symbols may be used. To extend the UL coverage, the base station may allocate a high transmission power to the terminal, and the terminal may transmit a PUCCH for a long time. When the terminal is located at an edge of the UL coverage, interference at other base stations may increase due to the increased transmission power of the terminal. Therefore, it may be preferable for the terminal to transmit the PUCCH for a long time.

TABLE 13

| index | PUCCH format | First symbol | Number of symbols | PRB offset $RB_{BWP}^{offset}$ | Set of first CS indexes |
|---|---|---|---|---|---|
| 0 | 0 | 12 | 2 | 0 | {0, 3} |
| 1 | 0 | 12 | 2 | 0 | {0, 4, 8} |
| 2 | 0 | 12 | 2 | 3 | {0, 4, 8} |
| 3 | 1 | 10 | 4 | 0 | {0, 6} |
| 4 | 1 | 10 | 4 | 0 | {0, 3, 6, 9} |
| 5 | 1 | 10 | 4 | 2 | {0, 3, 6, 9} |
| 6 | 1 | 10 | 4 | 4 | {0, 3, 6, 9} |
| 7 | 1 | 4 | 10 | 0 | {0, 6} |
| 8 | 1 | 4 | 10 | 0 | {0, 3, 6, 9} |
| 9 | 1 | 4 | 10 | 2 | {0, 3, 6, 9} |
| 10 | 1 | 4 | 10 | 4 | {0, 3, 6, 9} |
| 11 | 1 | 0 | 14 | 0 | {0, 6} |
| 12 | 1 | 0 | 14 | 0 | {0, 3, 6, 9} |
| 13 | 1 | 0 | 14 | 2 | {0, 3, 6, 9} |
| 14 | 1 | 0 | 14 | 4 | {0, 3, 6, 9} |
| 15 | 1 | 0 | 14 | $\lfloor N_{BWP}^{size}/4 \rfloor$ | {0, 3, 6, 9} |

In a proposed method, a RACH procedure and/or parameters for a terminal located in an edge of coverage may be indicated differently from a RACH procedure and/or parameters for a terminal not located in an edge of coverage. The RACH procedure and/or parameters may be indicated by signaling of the base station. System information (e.g., SIB) of the base station may implicitly indicate the number of PUCCH repetitions. The terminal may perform a measurement operation for a DL RS (e.g., SSB), and may compare a result of the measurement operation (e.g., RSRP) with a boundary value. The terminal may perform a different RACH procedure based on a result of comparing the result of the measurement operation and the boundary value.

The system information (e.g., SIB) may include information on the number of HARQ-ACK repetitions for a PDSCH. Alternatively, the number of HARQ-ACK repetitions for a PDSCH may be indicated to the terminal in another step of the RA procedure.

The system information may indicate various repetition numbers, and one repetition number among the various repetition numbers may be determined in a step after receiving the system information. The repetition numbers indicated by the system information may be {2, 4, 8} or {1, 2, 4, 8}. DCI scheduling a Msg4 may indicate to the terminal one repetition number among the repetition numbers indicated by the system information.

According to a proposed method, the PDSCH (e.g., MAC RAR or fallback RAR) may include information on the number of PUCCH repetitions. The MAC RAR (or fallback RAR) may include information on the number of HARQ-ACK repetitions for the PDSCH as well as a UL grant. One or more bits included in the MAC RAR (or fallback RAR) may indicate the number HARQ-ACK repetitions for the PDSCH.

The MAC RAR (or fallback RAR) may include information related to repeated PUSCH transmission. In this case, the MAC RAR (or fallback RAR) may include information on the number of PUSCH repetitions and information on the number of HARQ-ACK repetitions for the PDSCH. The MAC PDU may include information related to contention resolution and information on the repetition number. In this case, a problem may occur in backward compatibility of the terminal. In a proposed method, scheduling DCI for allocating the PDSCH may include information on the repetition number.

One information field of the scheduling DCI may represent the number of HARQ-ACK repetitions for the PDSCH. The PDSCH may be allocated by a DCI format 0_0 scrambled by a temporary cell (TC)-RNTI. The DCI format 0_0 (e.g., scheduling DCI) may include information on the repetition number. Reserved bits of the DCI format 0_0 scrambled by the TC-RNTI may be used to indicate the number of repetitions. A downlink assignment index (DAI) field (or DAI-related information field) included in the DCI may be reused. For example, a value indicated by the DAI field may be interpreted as the number of HARQ-ACK repetitions.

As another proposed method, information of a PUCCH resource set may indicate the number of HARQ-ACK repetitions.

When the terminal does not use a PUCCH resource set indicated by signaling, information on the PUCCH resource set may be used to indicate the number of HARQ-ACK repetitions. Since a PUCCH format 0 or PUCCH format 1 including a HARQ-ACK is transmitted in one slot, repeated transmission of HARQ-ACK for the PDSCH may not be indicated. In the information of the PUCCH resource set, time resources may be expressed as being extended. The information of the PUCCH resource set may include information for transmission in two or more slots. In Table 13, one column for the PUCCH resource set may be added, and the added column may include information on the number of repetitions.

According to another proposed method, information of a (sub)slot through which a PUCCH is transmitted and the number of repetitions of the PUCCH may be signaled together. A combination of an offset of the (sub)slot through which the PUCCH is transmitted and the number of PUCCH repetitions may be signaled to the terminal in form of an index. The index may be included in DL-DCI. In the present disclosure, a (sub)slot may mean a slot or a subslot.

The terminal may receive the DL-DCI from the base station, and may identify the offset of the (sub)slot through which the PUCCH is transmitted based on the index included in the DL-DCI. Based on the index, the terminal may derive the number of PUCCH repetitions as well as the offset of the (sub)slot in which the PUCCH is transmitted.

The index may be indicated to the terminal by signaling from the base station. The terminal may repeatedly transmit the PUCCH as many times as the number of repetitions in the (sub)slot. The same resource index (e.g., the same PUCCH resource index) may be applied in (sub)slots.

In a TDD system, the terminal may identify whether to transmit a PUCCH instance by considering a slot pattern. The terminal may interpret a time window in which a PUCCH occasion is located. The above operation may vary depending on whether a search space set and/or a slot pattern for reception of a DCI format 1_0 is configured in the terminal. Alternatively, the above operation may be independent of whether a search space set and/or a slot pattern for reception of a DCI format 1_0 is configured.

The terminal may derive a valid PUCCH instance based on a common slot pattern (e.g., tdd-UL-DL-Configuration-Common) obtained from system information. Alternatively, the terminal may derive a valid PUCCH instance based on a terminal-specific slot pattern (e.g., tdd-UL-DL-ConfigurationDedicated).

The terminal may assume that a PUCCH instance is transmitted in symbol(s) configured as UL symbol(s). The terminal may assume that a PUCCH instance is not transmitted in flexible (FL) symbol(s), DL symbol(s), symbol(s) in which an SSB is transmitted, and/or symbol(s) belonging to a type 0-PDCCH common search space (CSS).

The terminal may not count a PUCCH instance, which has not been transmitted, as the number of PUCCH repetitions. In other words, if a PUCCH instance is not transmitted, the terminal may not increase the number of transmitted PUCCH repetitions. When the number of PUCCH instances received (or the repetition number of PUCCH instances) is equal to a value indicated by a DCI format 1_0, the time window for the PUCCH occasion may be determined in consideration of the DCI format 1_0 as well as the slot pattern.

5.1.2 Method of Indicating Frequency Hopping of HARQ-ACK for Msg4

To increase a coverage, the terminal may repeatedly transmit a HARQ-ACK for the Msg4 (e.g., PDSCH). In a proposed method, the terminal may transmit a PUCCH (e.g., HARQ-ACK for Msg4) in time resources including UL symbol(s) indicated by signaling in an initial BWP. If a slot to transmit the PUCCH includes non-UL symbol(s) (e.g., DL symbol and/or FL symbol), the terminal may attempt PUCCH transmission in a slot next to the slot. The terminal may determine valid slot(s) based on the number of PUCCH repetitions, and may repeatedly transmit the PUCCH in the valid slot(s).

The repeated PUCCH transmission may be performed based on an intra-slot frequency hopping scheme or an inter-slot frequency hopping scheme. For example, the terminal may transmit the HARQ-ACK for the Msg4 based on an intra-slot frequency hopping scheme or inter-slot frequency hopping scheme. Since the terminal transmits a PUCCH format 0 or PUCCH format 1 including the HARQ-ACK, a frequency resource of the PUCCH may be represented as one PRB or two PRBs. When frequency hopping is performed, the frequency resource of the PUCCH may be represented as two PRBs.

In the frequency resource of the PUCCH, a first PRB may indicate a frequency resource in one half of a slot in which the PUCCH is transmitted. In the frequency resource of the PUCCH, a second PRB may indicate a frequency resource in the other half of the slot in which the PUCCH is transmitted. Frequency resources of the PUCCH in odd slots (e.g., odd indexes of physical slots) and frequency resources of the PUCCH in even slots (e.g., even indexes of physical slots) may be distinguished. The odd-numbered slots may be associated with the first PRB, and the even-numbered slots may be associated with the second PRB. Alternatively, the odd-numbered slots may be associated with the second PRB and the even-numbered slots may be associated with the first PRB. Frequency resources of the PUCCH in odd-numbered transmissions and frequency resources of the PUCCH in even-numbered transmissions may be distinguished. The odd-numbered transmissions may be associated with the first PRB, and the even-numbered transmissions may be associated with the second PRB. Alternatively, the odd-numbered transmissions may be associated with the second PRB, and the even-numbered transmissions may be associated with the first PRB. The terminal may transmit PUCCH in the time and frequency resources.

According to a proposed method, one frequency resource may be used in slots as many as a half value of the repetition factor indicated to the terminal, and another frequency resource may be used in slots as many as the half value of the repetition factor. When the value of the repetition factor is odd, the number of slots allocated to one hop may be greater than the number of slots allocated to another hop. In other words, the number of slots allocated to one hop may be calculated based on a ceiling function or a floor function.

Figure 23:
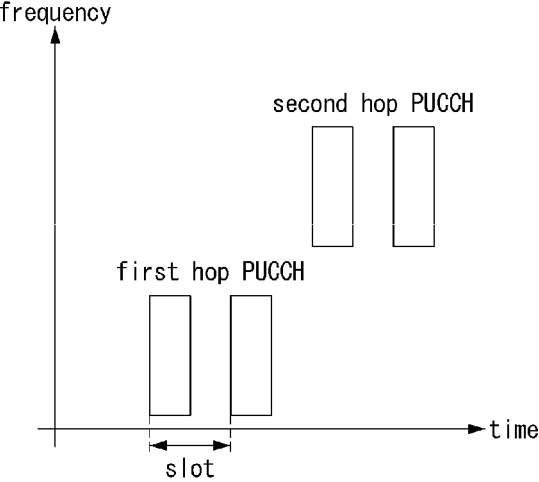
FIG. 23 is a conceptual diagram illustrating a first exemplary embodiment of a frequency hopping method in repeated transmission of HARQ-ACK for Msg4.

FIG. 23 is a conceptual diagram illustrating a first exemplary embodiment of a frequency hopping method in repeated transmission of HARQ-ACK for Msg4.

Referring to FIG. 23, a repetition factor may be 4. Transmission according to one frequency hop may be performed in the first two slots (e.g., a first slot and a second slot), and transmission according to another frequency hop may be performed in the remaining two slots. In a TDD system, consecutive slots may not be slots consecutive in the time domain according to a slot pattern. The terminal may transmit PUCCHs in two consecutive slots, and phase continuity and/or power consistency may be maintained in the two consecutive slots.

The base station may signal a frequency hopping boundary to the terminal separately from the repetition factor. The frequency hopping boundary may be indicated by the number of slots (e.g., an absolute number or a relative number) of the first frequency hop.

Signaling of a frequency hopping scheme (e.g., intra-slot frequency hopping scheme or inter-slot frequency hopping scheme) applied to repeated PUCCH transmission may be required. For example, the base station may indicate a frequency hopping scheme to the terminal using at least one of system information (e.g., SIB1), Msg2, Msg4, or DCI allocating Msg4. Alternatively, the inter-slot frequency hopping scheme may always be used in repeated transmission of HARQ-ACK for Msg4.

Figure 24:
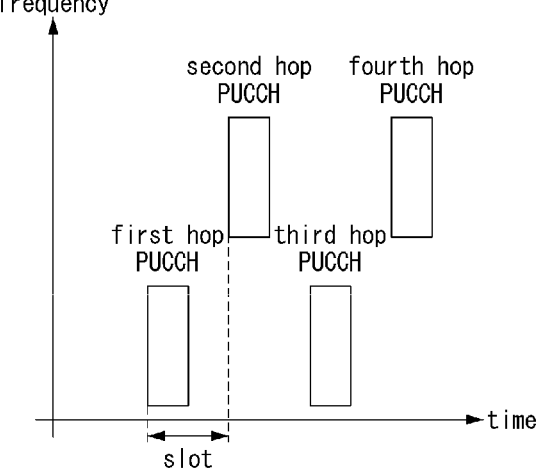
FIG. 24 is a conceptual diagram illustrating a second exemplary embodiment of a frequency hopping method in repeated transmission of HARQ-ACK for Msg4.

FIG. 24 is a conceptual diagram illustrating a second exemplary embodiment of a frequency hopping method in repeated transmission of HARQ-ACK for Msg4.

Referring to FIG. 24, a repetition factor may be 4. PUCCH (e.g., HARQ-ACK) transmission in the first and third slots may be performed on a first frequency resource, and PUCCH transmission in the second and fourth slots may be performed on a second frequency resource. In a TDD system, consecutive slots may not be slots consecutive in the time domain according to a slot pattern.

5.2 UL Signal/Channel Transmission for Subband Full Duplex (SBFD)

In order to extend a coverage of a UL signal/channel, some DL resources among DL resources may be used for UL transmission. In this case, in the same symbol, a first subband may be used for DL transmission, and a second subband may be used for UL transmission. The same symbol may be referred to as an SBFD symbol.

The base station may signal to the terminal information on frequency locations of the DL subband and/or UL subband in the SBFD symbol. The terminal may identify the frequency locations indicated by the base station. According to a proposed method, the terminal may receive a DL signal/channel from the base station, and apply a PRB index of a BWP as it is to transmit a UL signal/channel.

The terminal may assume two or more bandwidths in one BWP. The base station may signal BWP configuration information including bandwidth indication information and/or SBFD information to the terminal. The terminal may receive the BWP configuration information from the base station, and may identify the bandwidth indication information and/or SBFD information included in the BWP configuration information. Here, PRB numbering may be maintained as it is. In a repeated PDSCH reception procedure, the terminal may receive a PDSCH not only in DL symbol(s) and/or FL symbol(s) but also in SBFD symbol(s). A frequency resource (e.g., PRB index(es)) for a PDSCH received in non-SBFD symbol(s) may be the same as a frequency resource for a PDSCH received in SBFD symbol(s). The non-SBFD symbol(s) may be DL symbol(s), UL symbol(s), or FL symbol(s). When all frequency resources for receiving the PDSCH belong to the DL subband, the terminal may receive the PDSCH and perform decoding on the PDSDH. When some frequency resources for receiving the PDSCH do not belong to the DL subband, the terminal may not receive the PDSCH in the some frequency resources. The reception operation of the PDSCH may be equally applied to a reception operation of CSI-RS(s).

Figure 25:
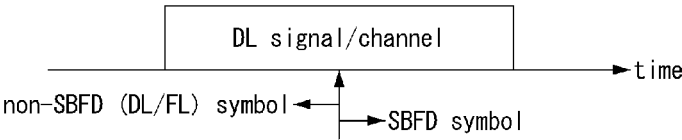
FIG. 25 is a conceptual diagram illustrating a first exemplary embodiment of a method for receiving a DL signal/channel.

FIG. 25 is a conceptual diagram illustrating a first exemplary embodiment of a method for receiving a DL signal/channel.

Referring to FIG. 25, the terminal may receive a DL signal/channel in non-SBFD symbol(s) and SBFD symbol(s). The exemplary embodiment of FIG. 25 may be applied to a repetitive reception operation and/or a non-repetitive reception operation. For reception of one DL signal/channel, SBFD symbol(s) and non-SBFD symbol(s) may be allocated to the terminal. The terminal may assume that frequency resources and/or sequence resources do not change. The terminal may assume the same antenna port in resource elements (REs) to which the DL signal/channel belongs.

Figure 26:
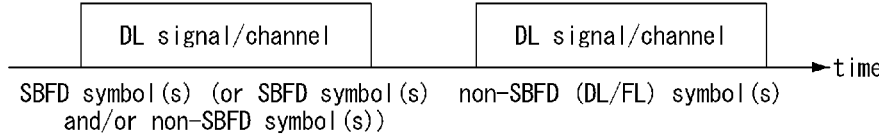
FIG. 26 is a conceptual diagram illustrating a second exemplary embodiment of a method for receiving a DL signal/channel.

FIG. 26 is a conceptual diagram illustrating a second exemplary embodiment of a method for receiving a DL signal/channel.

Referring to FIG. 26, the base station may repeatedly transmit a DL signal/channel, and the terminal may receive the DL signal/channel repeatedly transmitted from the base station. One DL signal/channel may be received in SBFD symbol(s), and another DL signal/channel may be received in non-SBFD symbol(s). The terminal may assume that frequency resources and/or sequence resources for DL signals/channels do not change. The terminal may receive DL signal/channel(s) in the same PRB(s). A reception interval (or transmission interval) of DL signals/channels may be 14 symbols based on the first symbol at which the DL signal/channel is received.

In a repeated PUSCH transmission procedure, the terminal may transmit a PUSCH in SBFD symbol(s) as well as non-SBFD symbol(s). A frequency resource (e.g., PRB index(es)) for a PUSCH transmitted in non-SBFD symbol(s)

may be the same as a frequency resource for a PUSCH transmitted in SBFD symbol(s). When all frequency resources for PUSCH transmission belong to the UL subband, the base station may receive the PUSCH and perform a decoding operation on the PUSDH. When some frequency resources for PUSCH transmission do not belong to the UL subband, the base station may not receive the PUSCH in the some frequency resources. The reception operation of the PUSCH may be equally applied to a reception operation of SRS(s).

Figure 27:
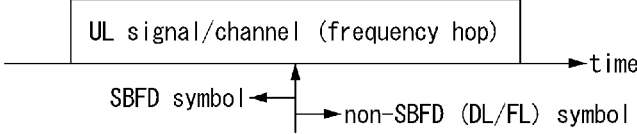
FIG. 27 is a conceptual diagram illustrating a first exemplary embodiment of a method for transmitting a UL signal/channel.

FIG. 27 is a conceptual diagram illustrating a first exemplary embodiment of a method for transmitting a UL signal/channel.

Referring to FIG. 27, the terminal may transmit a UL signal/channel in non-SBFD symbol(s) and SBFD symbol(s). The exemplary embodiment of FIG. 27 may be applied to a repetitive transmission operation and/or a non-repetitive transmission operation. For transmission of one UL signal/channel, SBFD symbol(s) and non-SBFD symbol(s) may be allocated to the terminal. In the same frequency hop, the terminal may assume that frequency resources and/or sequence resources for the UL signal/channel do not change. The terminal may maintain the same antenna port in REs to which the UL signal/channel belongs. When the UL signal/channel is transmitted based on a frequency hopping scheme, the terminal may maintain the same antenna port for the same frequency hop.

Figure 28:
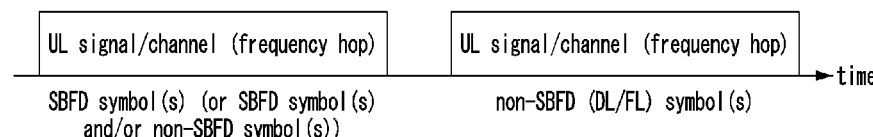
FIG. 28 is a conceptual diagram illustrating a second exemplary embodiment of a method for transmitting a UL signal/channel.

FIG. 28 is a conceptual diagram illustrating a second exemplary embodiment of a method for transmitting a UL signal/channel.

Referring to FIG. 28, the terminal may repeatedly transmit a UL signal/channel. One UL signal/channel may be transmitted in SBFD symbol(s), and another UL signal/channel may be transmitted in non-SBFD symbol(s). The terminal may assume that frequency resources and/or sequence resources for UL signals/channels belonging to the same frequency hop are not changed. The terminal may transmit UL signal/channel(s) in the same PRB(s). A transmission interval (or reception interval) of UL signals/channels may be 14 symbols based on the first symbol in which the UL signal/channel is transmitted. The transmission interval may be applied to frequency hops according to the intra-slot frequency hopping scheme or frequency hops belonging to different slots according to the inter-slot frequency hopping scheme. When the intra-slot frequency hopping scheme is used, different frequency hops belonging to the same slot may be consecutively arranged. Alternatively, when a repetition type A or repetition type B is indicated, different frequency hops may be arranged consecutively. When frequency hops are different, a gap may occur between successive frequency hops. The gap may be one or more symbols. When a UL signal/channel is transmitted based on the frequency hopping scheme, the same antenna port may be maintained for the same frequency hop.

In order to determine a frequency resource of the PUCCH, the first index of control channel elements (CCEs) that schedules the PDSCH and/or a PUCCH resource index (PM) may be used. The index of CCEs and the PRI may be interpreted in a UL BWP. Since a bandwidth may be different in the SBFD symbol, other resources may be derived. For example, an index 16 based on a value using the bandwidth of BWP may be added to Table 13.

When a PUCCH is repeatedly transmitted, PUCCH resources in SBFD symbol(s) may be different from PUCCH resources in non-SBFD symbol(s). In this case, a processing gain for repeated PUCCH transmission in the base station may decrease. In a proposed method, frequency resources and/or sequence resources may not be changed in the repeated PUCCH transmissions (e.g., repeated PUCCH transmissions in SBFD symbol(s) and/or non-SBFD symbol(s)).

The index 16 based on the value using the bandwidth of the BWP to which the non-SBFD symbol(s) belong may be added to Table 13.

The above exemplary embodiment may be equally applied to UL signals/channels that are not repeatedly transmitted. When one UL signal/channel is transmitted, some SBFD symbols and some non-SBFD symbols may be allocated to the terminal. In this case, the terminal may assume that frequency resources and/or sequence resources do not change.

5.2.1 Exemplary Embodiment of Configuring Different Resources

Considering transmission of a UL signal/channel, separate resources may be applied to SBFD symbols and non-SBFD symbols. According to technical specifications, resources that are distinguished from each other may not be applied to symbols in which UL signals/channels are transmitted. Even when a symbol set 1 and a symbol set 2 are distinguished, the same rule may be applied to UL signals/channels within one resource, and a transmission operation or dropping operation for the UL signals/channels may be performed. According to a proposed method, when full-duplex communication is supported, the symbol set 1 (e.g., SBFD symbols) and the symbol set 2 (e.g., non-SBFD symbols) may be distinguished, and a UL signal/channel configuration 1 may be applied, and a UL signal/channel configuration 2 may be applied. In a proposed method, PUCCH resource sets may be distinguished from each other.

UL signal/channel transmission in a period including SBFD symbol(s) and non-SBFD symbol(s) may not be indicated to the terminal. The terminal may not expect the UL signal/channel transmission. Alternatively, when the UL signal/channel transmission is indicated, the terminal may drop the UL signal/channel transmission.

If the first symbol in which a UL signal/channel is transmitted is an SBFD symbol, the terminal may transmit the UL signal/channel using the same (frequency) resource even in non-SBFD symbol(s). In this case, at least a sequence, DM-RS, and PRB allocation for the UL signal/channel may be maintained identically. For PUCCH transmission, a resource index may be selected by scheduling DCI. Accordingly, the terminal may dynamically select a resource. Repeated PUCCH transmission may be performed in a period including SBFD symbol(s) and/or non-SBFD symbol(s). The repeated PUCCH transmission may be preferably performed in the same resource.

For SRS transmission, a resource index may not be dynamically selected. The SRS may be transmitted based on a frequency hopping scheme. The frequency hopping for SRS may not be performed outside a bandwidth of a BWP or a bandwidth of a UL subband. In a proposed method, resource sets of SRSs may be distinguished from each other. An SRS resource set 1 for SRSs transmitted in SBFD symbols and an SRS resource set 2 for SRSs transmitted in non-SBFD symbols may be separately distinguished. The SRS resource set 1 and the SRS resource set 2 may indicate different bandwidths (e.g., bandwidths to which frequency hopping is applied).

When an SRS resource (e.g., SRS resource set) includes two or more symbols, the terminal may transmit an SRS in an SRS resource including SBFD symbol(s) and non-SBFD symbol(s). When an SRS resource includes two or more symbols, repeated SRS transmission and/or multi-port SRS transmission may be performed. In this case, the terminal may operate according to one of the following schemes. The scheme(s) may be applied to a PUCCH and/or a PUSCH. In other words, the above scheme(s) may be applied to transmission of a UL signal/channel.

Figures 29, 30:
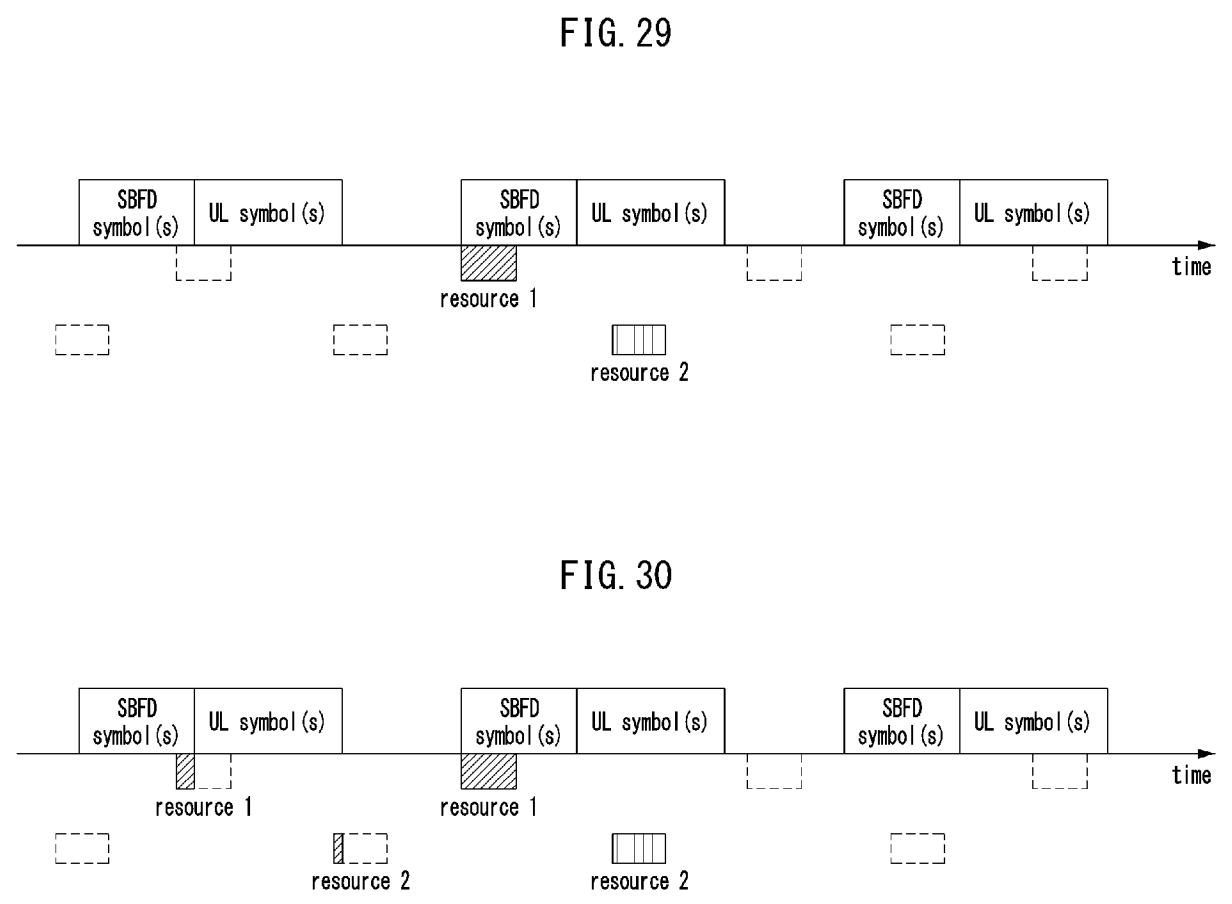

FIG. 29 is a conceptual diagram illustrating a third exemplary embodiment of a method for transmitting a UL signal/channel.

Referring to FIG. 29, a resource for transmission of a UL signal/channel may include SBFD symbol(s) and non-SBFD symbol(s) (e.g., UL symbol(s)), and the terminal may transmit a UL signal/channel when all symbols belonging to the resource are valid. If one or more symbols belonging to the resource are not valid, transmission of the UL signal/channel may be dropped. In other words, when all symbols belonging to the resource are determined to be valid, the UL signal/channel may be transmitted.

A resource 1 including SBFD symbol(s) and a resource 2 including UL symbol(s) may be valid resources. When a UL subband exists in SBFD symbol(s), a resource including the SBFD symbol(s) may be determined as a valid resource. The terminal may transmit a UL signal/channel once in SBFD symbol(s) and may transmit a UL signal/channel once in UL symbol(s). The terminal may not transmit a UL signal/channel in the remaining symbol(s).

FIG. 30 is a conceptual diagram illustrating a fourth exemplary embodiment of a method for transmitting a UL signal/channel.

Referring to FIG. 30, a resource for transmission of a UL signal/channel may include SBFD symbol(s) and non-SBFD symbol(s), and some symbols belonging to the resource may be valid. In this case, the terminal may transmit a UL signal/channel in some valid symbols. A resource 1 may be available in SBFD symbol(s). A resource 2 may be available in UL symbol(s). The UE may transmit a UL signal/channel in the SBFD symbol(s) of the resource 1 and transmit a UL signal/channel in UL symbol(s) of the resource 2.

According to technical specifications, the terminal may transmit an SRS in some symbols of an SRS resource according to a slot format indicated by a DCI format 2_0. A UL signal/channel (e.g., SRS, PUCCH, PUSCH) may be transmitted in some symbols, and SBFD symbol(s) and non-SBFD symbol(s) may be distinguished. For repeated SRS transmission and/or multi-port SRS transmission, the SBFD symbol(s) and non-SBFD symbol(s) may be regarded as different slot formats. The terminal may determine whether to transmit the UL signal/channel on a slot basis.

According to another method, when the first symbol in the transmission resource of the UL signal/channel is valid, the terminal may transmit the UL signal/channel in the transmission resource (e.g., a period from the first symbol to the last symbol of the transmission resource). If the transmission of the UL signal/channel starts in an SBFD symbol, the UL signal/channel may also be transmitted in non-SBFD symbol(s). Information on a transmission resource of a UL signal/channel (e.g., PRB numbering, RS sequence initialization, and orthogonal cover code (OCC) indexing) may be equally expressed in SBFD symbols and non-SBFD symbols. Alternatively, even when the information on the transmission resource of the UL signal/channel is not expressed identically in SBFD symbol(s) and non-SBFD symbol(s), it may be preferable for the terminal to use symbol(s) occupied by the SBFD symbol(s) as they are in the non-SBFD symbol(s).

Figure 31:
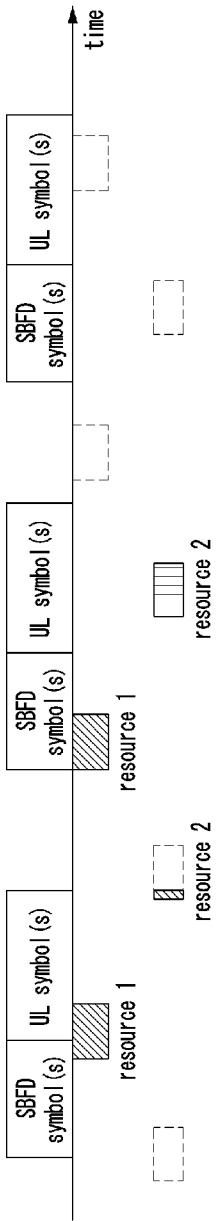
FIG. 31 is a conceptual diagram illustrating a fifth exemplary embodiment of a method for transmitting a UL signal/channel.

FIG. 31 is a conceptual diagram illustrating a fifth exemplary embodiment of a method for transmitting a UL signal/channel.

Referring to FIG. 31, a resource for transmission of a UL signal/channel may include SBFD symbol(s) and non-SBFD symbol(s). The terminal may transmit a UL signal/channel in the resource when the first symbol of the resource is valid. The first symbol of a resource 1 for a UL signal/channel may be an SBFD symbol, and the last symbol of the resource 1 may be a UL symbol. The terminal may transmit a UL signal/channel in the resource 1. The first symbol of a resource 2 for a UL signal/channel may be a UL symbol, and the last symbol of the resource 2 may be a DL symbol. In this case, the terminal may drop transmission of the UL signal/channel. Alternatively, the terminal may transmit a UL signal/channel in some symbols (e.g., valid symbols).

When transmission of a UL signal/channel is possible in a resource including SBFD symbol(s) and non-SBFD symbol(s), power control and/or beam control for the UL signal/channel may need to be changed. In this case, a gap time between the SBFD symbol(s) and the non-SBFD symbol(s) may be required. The gap time may be configured as a gap symbol. A previous symbol of the SBFD symbol, some OFDM samples of the previous symbol, a later symbol of the SBFD symbol, and/or some OFDM samples of the later symbol may be used as the gap time. A previous symbol of the non-SBFD symbol, some OFDM samples of the previous symbol, a later symbol of the non-SBFD symbol, and/or some OFDM samples of the later symbol may be used as the gap time.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A method of a terminal, comprising:
receiving, from a base station, system information including: information of a first random access channel (RACH) occasion (RO) group corresponding to a first number of transmissions of a random access (RA) preamble, information of a second RO group corresponding to a second number of transmissions of the RA preamble, and a threshold set including one or more threshold values;
comparing a measurement result of a synchronization signal block (SSB) received from the base station with one threshold value of the threshold set;
determining a number of transmissions from the first number of transmissions and the second number of transmissions of the RA preamble based on a result of comparison between the measurement result and the one threshold value; and
transmitting the RA preamble to the base station based on the determined number of transmissions,
wherein the first number and the second number are different natural numbers, the first RO group is a group of ROs in which repeated transmission of the RA preamble is performed, and the second RO group is a group of ROs in which repeated transmission of the RA preamble is not performed.

2. The method according to claim 1, wherein each of the first RO group and the second RO group includes ROs belonging to a same physical random access channel (PRACH) association period.

3. The method according to claim 1, further comprising:
when the determined number of transmissions is the first number of transmissions, determining the first RO group corresponding to the first number of transmissions from the first RO group and the second RO group; and
selecting ROs corresponding to the first number of transmissions from the first RO group,
wherein the RA preamble is repeatedly transmitted in the ROs.

4. The method according to claim 3, further comprising receiving, from the base station, a random access response (RAR) for the RA preamble, wherein the RAR is associated with one RO among the ROs.

5. The method according to claim 1, wherein the system information includes a PRACH configuration index 1 indicating a first resource in which repeated transmission of the RA preamble is performed and a PRACH configuration index 2 indicating a second resource in which repeated transmission of the RA preamble is not performed, and the RA preamble is repeatedly transmitted in the first resource indicated by the PRACH configuration index 1.

6. The method according to claim 1, wherein the terminal selects different beams or a same beam as beam(s) used for transmission of the RA preamble, and the RA preamble is transmitted using the selected beam(s).

7. The method according to claim 1, wherein the system information further includes information on a RA preamble set for repeated transmission of the RA preamble, and the RA preamble is selected from the RA preamble set.

8. The method according to claim 1, wherein the system information further includes a PRACH mask index, a first RO for transmission of the RA preamble is determined based on the PRACH mask index.

9. A method of a base station, comprising:

generating system information including: a threshold set including one or more threshold values, information on a first random access channel (RACH) occasion (RO) group corresponding to a first number of transmissions of a random access (RA) preamble, and information on a second RO group corresponding to a second number of transmissions of the RA preamble;

transmitting the system information; and performing an operation for receiving RA preambles repeated based on the first number of transmissions in ROs belonging to the first RO group, wherein the first RO group is a group of ROs in which repeated transmission of the RA preamble is performed, and the second RO group is a group of ROs in which repeated transmission of the RA preamble is not performed.

10. The method according to claim 9, wherein each of the first RO group and the second RO group includes ROs belonging to a same physical random access channel (PRACH) association period.

11. The method according to claim 9, wherein when a measurement result of a synchronization signal block (SSB) transmitted by the base station is less than one threshold value of the threshold set, the first RO group is used for repeated transmission of the RA preamble, and when the measurement result of the SSB transmitted by the base station is greater than or equal to the one threshold value, the second RO group is used for non-repetitive transmission of the RA preamble.

12. The method according to claim 9, further comprising transmitting a random access response (RAR) associated with one of the ROs in which the repeated RA preambles are received.

13. The method according to claim 9, wherein the system information further includes information on a physical random access channel (PRACH) mask index, and a first RO for transmission of the RA preamble is indicated by the PRACH mask index.

14. A terminal comprising a processor, wherein the processor causes the terminal to perform:

receiving, from a base station, system information including: information of a first random access channel (RACH) occasion (RO) group corresponding to a first number of transmissions of a random access (RA) preamble, information of a second RO group corresponding to a second number of transmissions of the RA preamble, and a threshold set including one or more threshold values;

comparing a measurement result of a synchronization signal block (SSB) received from the base station with one threshold value of threshold set;

determining a number of transmissions from the first number of transmissions and the second number of transmissions of the RA preamble based on a result of comparison between the measurement result and the one threshold value; and repeatedly transmitting the RA preamble to the base station based on the determined number of transmissions, wherein the first number and the second number are different natural numbers, the first RO group is a group of ROs in which repeated transmission of the RA preamble is performed, and the second RO group is a group of ROs in which repeated transmission of the RA preamble is not performed.

15. The terminal according to claim 14, wherein the processor further causes the terminal to perform:

when the determined number of transmissions is the first number of transmissions, identifying the first RO group corresponding to the first number of transmissions from the first RO group and the second RO group; and selecting ROs corresponding to the first number of transmissions from the first RO group, wherein the RA preamble is repeatedly transmitted in the ROs.

16. The terminal according to claim 14, wherein the system information further includes a PRACH mask index, a first RO for transmission of the RA preamble is determined based on the PRACH mask index.

* * * * *